United States Patent
Farag et al.

(10) Patent No.: US 12,549,314 B2
(45) Date of Patent: Feb. 10, 2026

(54) TA INDICATION AND APPLICATION WITH MULTIPLE TRANSMISSION AND RECEPTION POINTS

(71) Applicant: Samsung Electronics Co., Ltd., Suwon-si (KR)

(72) Inventors: Emad N. Farag, Flanders, NJ (US); Kyoungmin Park, Seoul (KR); Dalin Zhu, Richardson, TX (US); Eko Onggosanusi, Coppell, TX (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 18/177,753

(22) Filed: Mar. 2, 2023

(65) Prior Publication Data
US 2024/0235781 A1    Jul. 11, 2024

Related U.S. Application Data

(60) Provisional application No. 63/432,916, filed on Dec. 15, 2022, provisional application No. 63/339,296, (Continued)

(51) Int. Cl.
*H04J 3/00* (2006.01)
*H04L 5/00* (2006.01)
*H04W 72/0446* (2023.01)

(52) U.S. Cl.
CPC .......... *H04L 5/0053* (2013.01); *H04L 5/0035* (2013.01); *H04W 72/0446* (2013.01)

(58) Field of Classification Search
CPC .............. H04W 72/0446; H04W 72/24; H04L 5/0053; H04L 5/0035
See application file for complete search history.

(56) References Cited

U.S. PATENT DOCUMENTS

2015/0031410 A1* 1/2015 Lim .................... H04W 52/146
455/522
2020/0100201 A1* 3/2020 Farmanbar ........ H04W 56/0045
(Continued)

FOREIGN PATENT DOCUMENTS

EP    3852466 A1    7/2021

OTHER PUBLICATIONS

International Search Report and Written Opinion issued Jun. 9, 2023 regarding International Application No. PCT/KR2023/003368, 12 pages.

(Continued)

*Primary Examiner* — Abdelnabi O Musa

(57) ABSTRACT

Methods and apparatuses for methods and apparatuses for facilitating signaling of multiple timing advance (TA) values to a user equipment (UE), facilitating the use of multiple TA values by a UE for communication with multiple transmission and reception points (TRPs), and facilitating updating of TA values in a wireless communications network. A UE comprises a transceiver and a processor operably coupled to the transceiver. The transceiver is configured to receive a first TA command that includes a first TA value and a first TA group (TAG) identifier (ID) associated with a first entity, and a second TA value and a second TAG ID associated with a second entity. The processor is configured to identify a TAG ID associated with an uplink (UL) transmission, and identify, based on the TAG ID, a TA value. The transceiver is further configured to transmit the UL transmission using the TA value.

18 Claims, 36 Drawing Sheets

Related U.S. Application Data filed on May 6, 2022, provisional application No. 63/336,167, filed on Apr. 28, 2022, provisional application No. 63/335,085, filed on Apr. 26, 2022, provisional application No. 63/323,629, filed on Mar. 25, 2022, provisional application No. 63/320,088, filed on Mar. 15, 2022.

(56)　　　　　　References Cited

U.S. PATENT DOCUMENTS

| | | | | |
|---|---|---|---|---|
| 2020/0260398 | A1* | 8/2020 | Jiang | H04W 76/27 |
| 2021/0195491 | A1 | 6/2021 | Zhang et al. | |
| 2021/0259040 | A1 | 8/2021 | Babaei | |
| 2023/0087223 | A1* | 3/2023 | Jang | H04L 1/1896 370/329 |
| 2023/0113784 | A1* | 4/2023 | Cha | H04W 72/1268 370/329 |
| 2023/0189345 | A1* | 6/2023 | Khoshkholgh Dashtaki | H04B 7/1851 370/329 |
| 2023/0239823 | A1* | 7/2023 | Liu | H04W 56/0045 370/350 |
| 2023/0284287 | A1* | 9/2023 | Kung | H04L 5/0023 370/329 |
| 2023/0362853 | A1* | 11/2023 | Kung | H04W 36/0072 |
| 2024/0039587 | A1* | 2/2024 | Liu | H04B 7/0478 |
| 2024/0188015 | A1* | 6/2024 | Comsa | H04W 56/0045 |
| 2025/0106714 | A1* | 3/2025 | Farag | H04W 36/06 |
| 2025/0119909 | A1* | 4/2025 | Xiong | H04W 76/38 |

OTHER PUBLICATIONS

Intel Corporation, "Enhancements to Multi-Beam Operation", 3GPP TSG RAN WG1 #106-e, R1-2107570, Aug. 2021, 22 pages.
"3rd Generation Partnership Project; Technical Specification Group Radio Access Network; NR; Physical channels and modulation (Release 17)", 3GPP TS 38.211 V17.1.0, Mar. 2022, 135 pages.
"3rd Generation Partnership Project; Technical Specification Group Radio Access Network; NR; Multiplexing and channel coding (Release 17)", 3GPP TS 38.212 V17.1.0, Mar. 2022, 197 pages.
"3rd Generation Partnership Project; Technical Specification Group Radio Access Network; NR; Physical layer procedures for control (Release 17)", 3GPP TS 38.213 V17.1.0, Mar. 2022, 245 pages.
"3rd Generation Partnership Project; Technical Specification Group Radio Access Network; NR; Physical layer procedures for data (Release 17)", 3GPP TS 38.214 V17.1.0, Mar. 2022, 225 pages.
"5G; NR; Medium Access Control (MAC) protocol specification (3GPP TS 38.321 version 17.1.0 Release 17)", ETSI TS 138 321 V17.1.0 , Aug. 2022, 244 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.
Samsung (Moderator), "New WID: MIMO Evolution for Downlink and Uplink", 3GPP TSG RAN Meeting #94e, RP-213598, Dec. 2021, 6 pages.
"5G; NR; Physical channels and modulation (3GPP TS 38.211 version 16.7.0 Release 16)", ETSI TS 138 211 V16.7.0, Oct. 2021, 138 pages.
"5G; NR; Multiplexing and channel coding (3GPP TS 38.212 version 16.7.0 Release 16)", ETSI TS 138 212 V16.7.0, Oct. 2021, 157 pages.
"5G; NR; Physical layer procedures for control (3GPP TS 38.213 version 16.7.0 Release 16)", ETSI TS 138 213 V16.7.0, Oct. 2021, 191 pages.
"5G; NR; Physical layer procedures for data (3GPP TS 38.214 version 16.7.0 Release 16)", ETSI TS 138 214 V16.7.0, Oct. 2021, 176 pages.
"5G; NR; Medium Access Control (MAC) protocol specification (3GPP TS 38.321 version 16.6.0 Release 16)", ETSI TS 138 321 V16.6.0, Oct. 2021, 160 pages.
"5G; NR; Radio Resource Control (RRC); Protocol specification (3GPP TS 38.331 version 16.6.0 Release 16)", ETSI TS 138 331 V16.6.0, Oct. 2021, 948 pages.
Samsung, "Revised WID: Further enhancements on MIMO for NR", 3GPP TSG RAN Meeting #89e, RP-202024, Sep. 2020, 5 pages.
Extended European Search Report issued Apr. 17, 2025 regarding Application No. 23771052.0, 10 pages.

* cited by examiner

| R | Timing Advance Command1 (TAC1) | TAC 2 | Oct 1 |
|---|---|---|---|
| Timing Advance Command2 (TAC2) | | UL Grant | Oct 2 |
| UL Grant | | | Oct 3 |
| UL Grant | | | Oct 4 |
| UL Grant | | | Oct 5 |
| Temporary C-RNTI | | | Oct 6 |
| Temporary C-RNTI | | | Oct 7 |

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |
| R \| Channel Access-CPext \| TPC \| HARQ Feedback Timing Indicator | Oct 7 |
| PUCCH Resource Indicator \| Timing Advance Command1 (TAC1) | Oct 8 |
| Timing Advance Command1 (TAC1) \| Diff Timing Advance Command2 (DTAC2) | Oct 9 |
| C-RNTI | Oct 10 |
| C-RNTI | Oct 11 |

FIG. 29

DL and UL timings at UE for TRP A and TRP B

DL and UL timings at UE for TRP A and TRP B

DL and UL timings at UE for TRP A and TRP B

MAC CE PDU with a list of TA_IDs

MAC CE PDU with a list of Activated TCI State IDs, TA_IDs or TAG IDs

MAC CE PDU with a list of TA_IDs

MAC CE PDU with a list of Activated TCI State IDs or TA_IDs

| Timing Advance Command 0 for entity 0 | Timing Advance Command 1 for entity 1 |

Example of absolute timing advance MAC CE

FIG. 43

| Index of entity | Timing Advance Command for one entity |

Example of absolute timing advance MAC CE

FIG. 44

| TAG ID | Timing Advance Command 0 for entity 0 | Timing Advance Command 1 for entity 1 |

Example of timing advance MAC CE

FIG. 45

| TAG ID | Index of entity | Timing Advance Command for one entity |

Example of timing advance MAC CE

FIG. 46

Example of absolute timing advance MAC CE

Example of absolute timing advance MAC CE

Example of timing advance MAC CE

Example of timing advance MAC CE

TA INDICATION AND APPLICATION WITH MULTIPLE TRANSMISSION AND RECEPTION POINTS

CROSS-REFERENCE TO RELATED APPLICATION AND CLAIM OF PRIORITY

This application claims priority under 35 U.S.C. § 119(e) to U.S. Provisional Patent Application No. 63/320,088 filed on Mar. 15, 2022; U.S. Provisional Patent Application No. 63/323,629 filed on Mar. 25, 2022; U.S. Provisional Patent Application No. 63/335,085 filed on Apr. 26, 2022; U.S. Provisional Patent Application No. 63/336,167 filed on Apr. 28, 2022; U.S. Provisional Patent Application No. 63/339,296 filed on May 6, 2022; and U.S. Provisional Patent Application No. 63/432,916 filed on Dec. 15, 2022, which are hereby incorporated by reference in their entirety.

TECHNICAL FIELD

This disclosure relates generally to interference mitigation in cellular wireless communications systems. Embodiments of this disclosure relate to methods and apparatuses for facilitating signaling of multiple timing advance values to a user equipment, facilitating the use of multiple timing advance values by a user equipment for communication with multiple transmission and reception points, and facilitating updating of timing advance values in a wireless communications network.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

SUMMARY

Embodiments of the present disclosure provide methods and apparatuses for facilitating signaling of multiple timing advance values to a user equipment, facilitating the use of multiple timing advance values by a user equipment for communication with multiple transmission and reception points, and facilitating updating of timing advance values in a wireless communications network.

In one embodiment, a UE is provided. The UE comprises a transceiver and a processor operably coupled to the transceiver. The transceiver is configured to receive a first TA command that includes a first TA value and a first TA group (TAG) identifier (ID) associated with a first entity, and a second TA value and a second TAG ID associated with a second entity. The processor is configured to identify a TAG ID associated with a UL transmission, and identify, based on the TAG ID, a TA value. The transceiver is further configured to transmit the UL transmission using the TA value.

In another embodiment, a base station (BS) is provided. The BS comprises a transceiver and a processor operably coupled to the transceiver. The transceiver is configured to transmit a first TA command that includes a first TA value and a first TAG ID associated with a first entity, and a second TA value and a second TAG ID associated with a second entity. The processor is configured to identify a TAG ID associated with a UL transmission, and identify, based on the TAG ID, a TA value. The transceiver is further configured to receive the UL transmission using the TA value.

In another embodiment, a method of operating a UE is provided, comprising the step of receiving a first TA command that includes a first TA value and a first TAG ID associated with a first entity, and a second TA value and a second TAG ID associated with a second entity. The method further comprises the steps of identifying a TAG ID associated with a UL transmission, identifying, based on the TAG ID, a TA value, and transmitting the UL transmission using the TA value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "and/or" is inclusive, meaning or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] 3GPP TS 38.211 v17.1.0, "NR; Physical channels and modulation."
[2] 3GPP TS 38.212 v17.1.0, "NR; Multiplexing and Channel coding."
[3] 3GPP TS 38.213 v17.1.0, "NR; Physical Layer Procedures for Control."
[4] 3GPP TS 38.214 v17.1.0, "NR; Physical Layer Procedures for Data."
[5] 3GPP TS 38.321 v17.0.0, "NR; Medium Access Control (MAC) protocol specification."
[6] 3GPP TS 38.331 v17.0.0, "NR; Radio Resource Control (RRC) Protocol Specification."
[7] 3GPP RP-213598, "MIMO Evolution for Downlink and Uplink".
[8] 3GPP TS 38.211 v16.7.0, "NR; Physical channels and modulation."
[9] 3GPP TS 38.212 v16.7.0, "NR; Multiplexing and Channel coding."
[10] 3GPP TS 38.213 v16.7.0, "NR; Physical Layer Procedures for Control."
[11] 3GPP TS 38.214 v16.7.0, "NR; Physical Layer Procedures for Data."
[12] 3GPP TS 38.321 v16.6.0, "NR; Medium Access Control (MAC) protocol specification."
[13] 3GPP TS 38.331 v16.6.0, "NR; Radio Resource Control (RRC) Protocol Specification."
[14] 3GPP RP-202024, "Revised WID: Further enhancements on MIMO for NR".

Abbreviations

ACK Acknowledgement
BW Bandwidth
BWP Bandwidth Part
CORESET Control Resource Set
C-RNTI Cell RNTI
CSI Channel State Information
CSI-RS Channel State Information Reference Signal
DCI Downlink Control Information
DL Downlink
DMRS Demodulation Reference Signal
FDD Frequency Division Duplexing
gNB Base Station
HARQ Hybrid ARQ
MCS Modulation and Coding Scheme
NR New Radio
PBCH Primary Broadcast Channel
PCell Primary Cell
PDCCH Physical Downlink Control Channel
PDSCH Physical Downlink Shared Channel
PUCCH Physical Uplink Control Channel
PUSCH Physical Uplink Shared Channel
RB Resource Block
RNTI Radio Network Temporary Identifier
RS Reference Signal
SC Sub-carrier
SCell Secondary Cell
SCS Sub-carrier spacing
SINR Signal to Interference and Noise Ratio
SRS Sounding Reference Signal
SS Synchronization Signals
TB Transport Block
TCI Transmission Configuration Indication
TDD Time Division Duplexing
TPC Transmit Power Control
TRP Transmit-Receive Point
UCI Uplink Control Information
UE User Equipment
UL Uplink In the below disclosure, both FDD and TDD are considered as a duplex method for DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

In the present disclosure, the term "activation" describes an operation in which a UE (i.e., a wireless communication device) receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation in which a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms are used for illustrative purposes and therefore are not normative. Other terms that refer to the same functions can also be used.

A "reference RS" corresponds to a set of characteristics of a DL beam or a UL TX beam, such as a direction, a precoding/beamforming, a number of ports, and so on.

In the following components, a TCI state is used for beam indication. It can refer to a DL TCI state for downlink channels (e.g. PDCCH and PDSCH) or downlink signals (e.g., CSI-RS), an uplink TCI state for uplink channels (e.g. PUSCH or PUCCH) or uplink signals (e.g., SRS), a joint TCI state for downlink and uplink channels or signals, or separate TCI states for uplink and downlink channels or signals. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 29 illustrates an example of a success RAR of a Type 2 random access procedure that includes a Timing Advance Command and a differential Timing Advance Command that have 12 bits total according to embodiments of the present disclosure;

FIG. 43 illustrates an example absolute timing advance MAC CE command that includes a timing advance command for each entity according to embodiments of the present disclosure;

FIG. 44 illustrates an example an example absolute timing advance MAC CE command that includes a timing advance command for one entity along with the index of the entity according to embodiments of the present disclosure;

FIG. 45 illustrates an example timing advance MAC CE command that includes a timing advance command for each entity according to embodiments of the present disclosure;

FIG. 46 illustrates an example timing advance MAC CE command that includes a timing advance command for one entity along with the index of the entity according to embodiments of the present disclosure;

DETAILED DESCRIPTION

Figure 1:
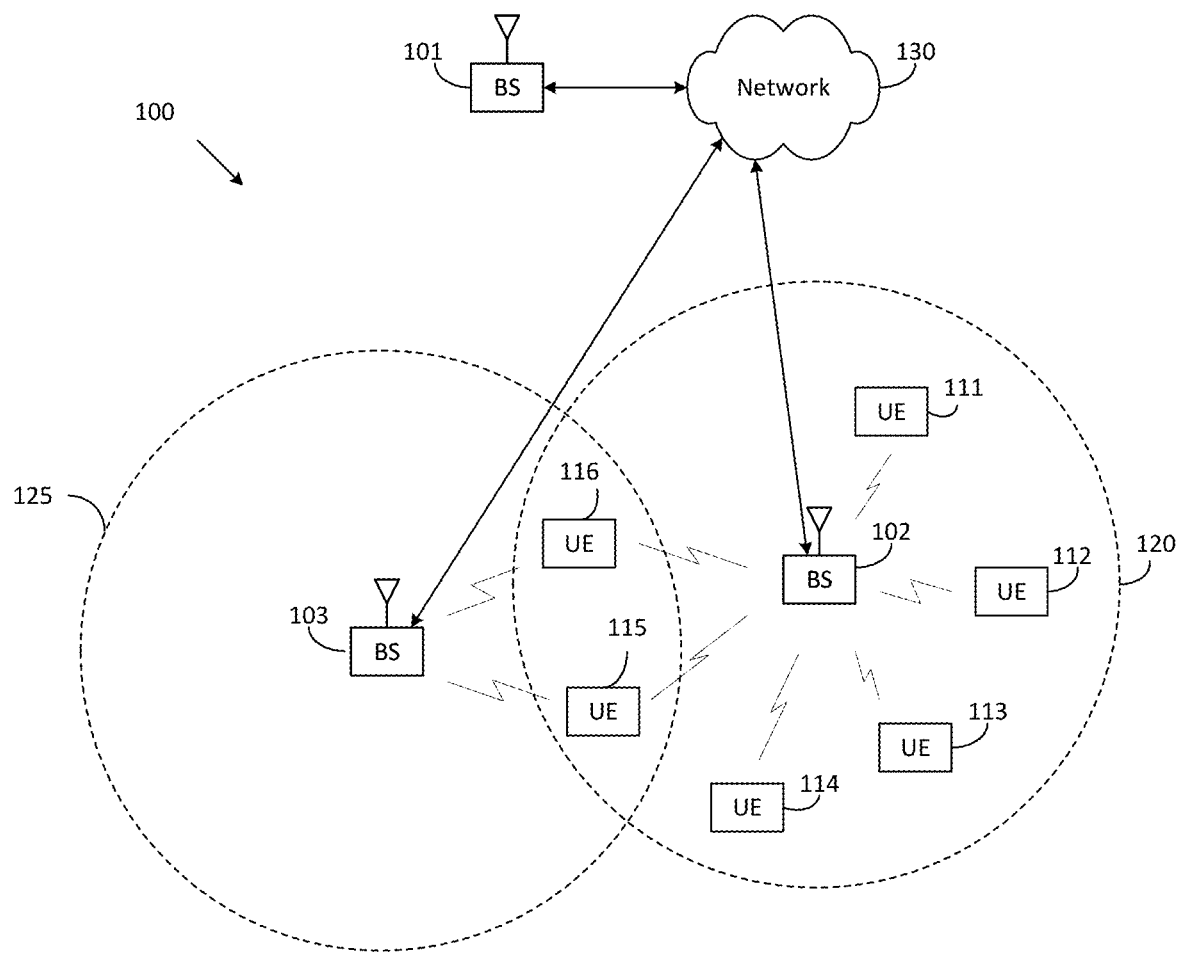
FIG. 1 illustrates an example wireless network according to embodiments of the present disclosure.

FIGS. 1 through 51, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a UE may be communicating with the network through two or more spatial filters (or spatial relations, or spatial relationships)—referred to herein as beams—for transmission and receptions. The beams are determined by a TCI state, for example, a joint TCI state for UL and DL beams, or a DL TCI state for DL beams and a UL TCI state for UL beams. The beams can be associated with a single TRP or, alternatively, the beams can be associated with multiple (two or more) TRPs, in which case the TRPs can have a same physical cell identity (PCI) (i.e., transmitting SS/PBCH blocks (SSBs) associated with the same PCI), or can have different PCIs (i.e., transmitting SSBs associated with different PCIs).

When a UE is communicating with multiple TRPs, the distances between the UE and each TRP can be different. As a result, the round trip propagation delay, or round trip propagation time (RTT) on each beam can be different. This can also be due to different propagation paths due to different reflections. If the UE were to use a common UL transmission time for transmitting to all TRPs, the UE reception would be aligned to the receive reference time of one TRP but misaligned (by more than a cyclic prefix, or CP or ±CP/2) to the receive reference times of the other TRPs, leading to inter-symbol interference (ISI) and loss of orthogonality at the other TRPs. One way to avoid this issue is to allow for multiple UL transmit times from the UE, where each transmit time corresponds to a respective TRP.

As described herein below, the UL signal from the UE should arrive at each TRP at that TRP's reference time. Accordingly, embodiments of the present disclosure introduce schemes to ensure the alignment of UL transmission timing when communicating across beams with different round trip propagation delays (different round trip times (RTTs)). To achieve this, the transmission on each beam (e.g., to a corresponding TRP) would need to have a different transmission time, and hence a different TA value, to arrive at the corresponding TRP at that TRP's reference time.

Accordingly, embodiments of the present disclosure provide methods and apparatuses to facilitate signaling multiple TA values to the UE using differential TA signaling. Embodiments include, for example, schemes to indicate multiple TA values in RAR, the fallback RAR, the Success RAR, the Timing Advance Command MAC CE and the Absolute Timing Advance Command MAC CE.

Additionally, embodiments of the present disclosure provide methods and apparatuses to facilitate measuring the round trip time (RTT) difference between different beams, and signaling, application, and determination of TAs for different beams with different RTTs based on the measured RTT difference. Embodiments include, for example, autonomous updating of TAs by a UE, and network-controlled updating of TAs, e.g., via indication of TA updates from the network. For example, the TA of a second TRP can be determined based on measurement of differential DL propagation delay measurements at the UE of reference signals from a first TRP and the second TRP, or the TA of the second TRP can be determined through a random access procedure towards the second TRP. For example, the UE can be signaled one or two TA values, and the UE determines the UL transmission time towards each TRP based on the one or two signaled TA values. The UE can determine the UL transmission timing to use based on the transmission configuration indication (TCI) state (e.g., a beam) of the UL transmission and an association with a TA group (TAG) ID or a TA position within the TAG.

Figure 2:
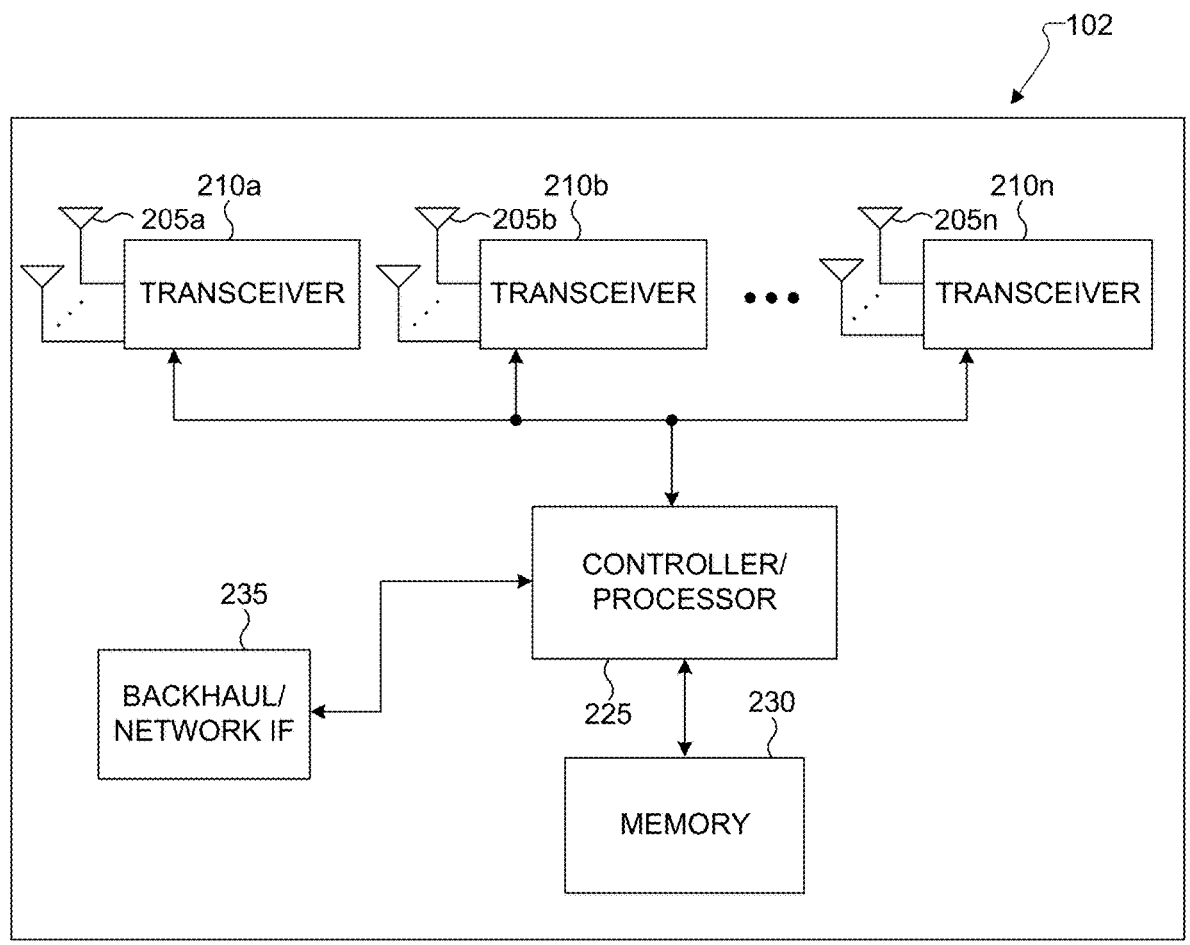
FIG. 2 illustrates an example gNB according to embodiments of the present disclosure.
Figure 3:
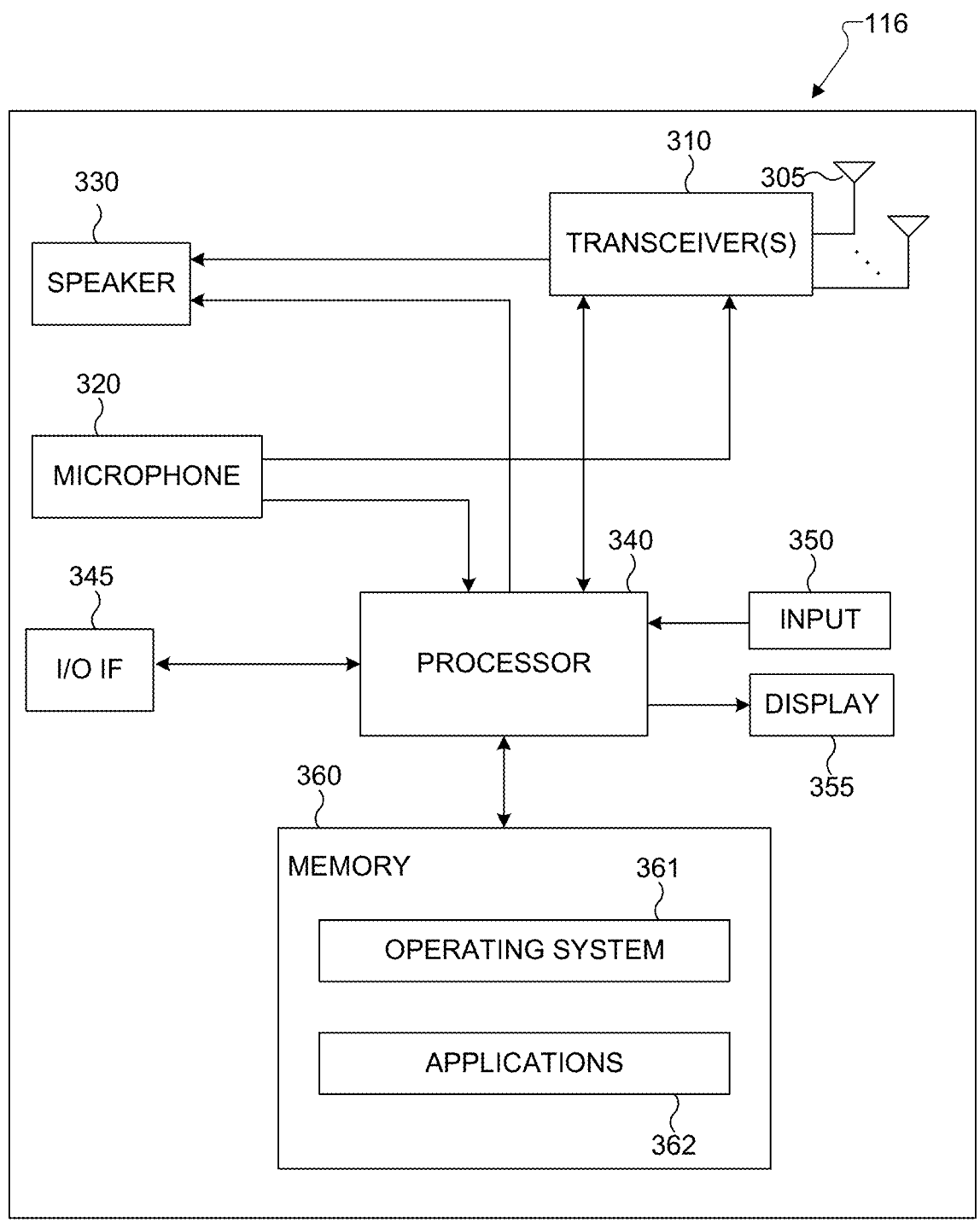
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX or Rx) processing circuitry in the transceivers 210a-210n or controller/processor 225, which generates processed baseband signals by filtering, decoding, or digitizing the baseband or IF signals. The controller/processor 225 may further process the baseband signals.

Transmit (TX or Tx) processing circuitry in the transceivers 210a-210n or controller/processor 225 receives analog or digital data (such as voice data, web data, e-mail, or interactive video game data) from the controller/processor 225. The TX processing circuitry encodes, multiplexes, or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 or processor 340, which generates a processed baseband signal by filtering, decoding, or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 or processor 340 receives analog or digital voice data from the microphone 320 or other outgoing baseband data (such as web data, e-mail, or interactive video game data) from the processor 340. The TX processing circuitry encodes, multiplexes, or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A time unit for DL signaling or UL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as a physical RB (PRB) and includes a number of resource elements (REs). A slot can be either a full DL slot, a full UL slot, or a hybrid slot similar to a special subframe in time division duplex (TDD) systems.

Figure 4:
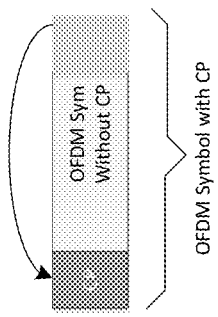
FIG. 4 illustrates an example OFDM symbol according to embodiments of the present disclosure.
Figure 5:
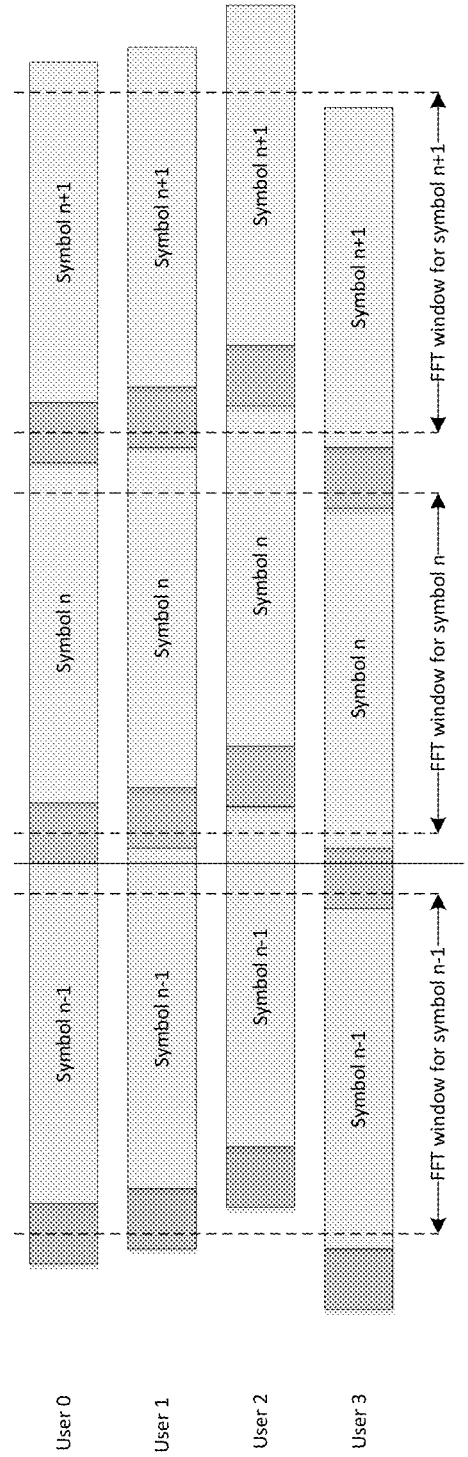
FIG. 5 illustrates an example timing diagram of symbols arriving at a TRP with different propagation delays according to embodiments of the present disclosure.

NR uses CP-OFDM and DTF-s-OFDM waveforms for uplink transmissions [1], i.e. for Physical Uplink Shared Channel (PUSCH) and Physical Uplink Control Channel (PUCCH). Both waveforms include a cyclic prefix (CP) appended to the front of each symbol as illustrated in FIG. 4. The CP is the last few samples of the OFDM symbol appended to the front of the symbol. The base station estimates the round-trip-time (RTT), or round-trip-delay, between the UE and the base station. For example, this can be initially estimated using the PRACH channel during random access. The base station signals a timing advance (TA) command to advance the UE's uplink transmission time by a duration equivalent to the round-trip-delay such that an uplink transmission from the UE, e.g. PUSCH or PUCCH, arrives aligned to the base station reference timing as illustrated in FIG. 5. All users are synchronized to the same reference time; this retains orthogonality between users. In FIG. 5, User 0's start time for symbol n (symbol n can correspond to symbol zero of a radio frame) is exactly aligned to the reference time of the base station. For User 1, the start time of symbol n is slightly delayed from the base station's reference time. For User 2, the start time of symbol n is delayed even more from the base station's reference time. This can be, for example, due to a time alignment error. For User 3, the start time of symbol n is advanced by a large duration from the base station's reference time. This can be, for example, due to a time alignment error.

The first stage of an NR baseband receiver is the removal of the CP followed by a Fast Fourier Transform (FFT) operation that converts the OFDM symbol from time domain to frequency domain. An example of the FFT window is illustrated in FIG. 5. In this example the FFT window of symbol n starts CP/2 after the base station's reference time, where CP is the duration of the cyclic prefix. The duration of the FFT window is large enough to include all of the samples required for FFT operation. Note that in this example, as the FFT window is starting halfway through the CP rather than at the end of the CP, a timing adjustment of CP/2 can be done in the frequency domain (after the FFT) to compensate the CP/2 offset. If the user's misalignment is within the CP range, i.e., in the range of [−CP/2, CP/2] for the example illustrated in FIG. 5, the signal of user i is cyclically delayed by $\tau_i$ as long as $\tau_i$ is within the CP range. For example, User 1 is delayed by $\tau_1$<CP/2, hence within the FFT window of symbol n all the samples belong to symbol n, and there is no inter-symbol interference in this case. The delay $\tau_i$ when within the CP range is converted into a phasor after the FFT and can be easily estimated and compensated. If $\tau_i$ is greater than the CP range then inter-symbol interference can occur, as illustrated in FIG. 5 for Users 2 and 3. For User 2, $\tau_2$ exceeds CP/2, hence in the FFT window of symbol n there are samples from symbol n−1 leading to inter-symbol interference and thus degrading performance. For User 3, $\tau_3$ is less than −CP/2, hence in the FFT window of symbol n there are samples from symbol n+1 leading to inter-symbol interference and thus degrading performance.

In the present disclosure a beam is determined by either of: a transmission configuration indication (TCI) state that establishes a quasi co-location (QCL) relationship or spatial relation between a source reference signal (e.g., a synchronization signal block (SSB) or channel state information reference signal (CSI-RS)) and a target reference signal, or spatial relationship information that establishes an association to a source reference signal, such as an SSB, CSI-RS, or sounding reference signal (SRS). In either case, the ID of the source reference signal identifies the beam.

The TCI state and/or the spatial relationship reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

Figure 6A:
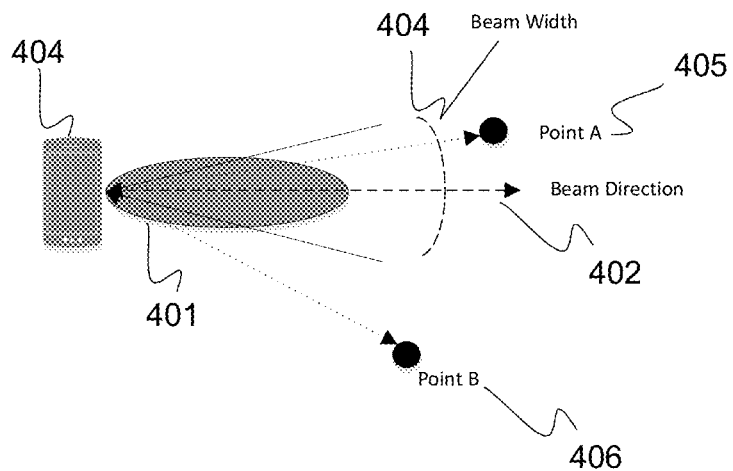
FIG. 6A illustrates an example of a beam according to embodiments of the present disclosure.

As illustrated in FIG. 6A, in a wireless system a beam 401, for a device 404, can be characterized by a beam direction 402 and a beam width 403. For example, a device 404 transmits radio frequency (RF) energy in a beam direction 404 and within a beam width. A device 404 receives RF energy in a beam direction and within a beam width. As illustrated in FIG. 6A, a device at point A 405 can receive from and transmit to device 404 as Point A is within a beam width and direction of a beam from device 404. As illustrated in FIG. 6A, a device at point B 406 cannot receive from and transmit to device 404 as Point B is outside a beam width and direction of a beam from device 404. While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
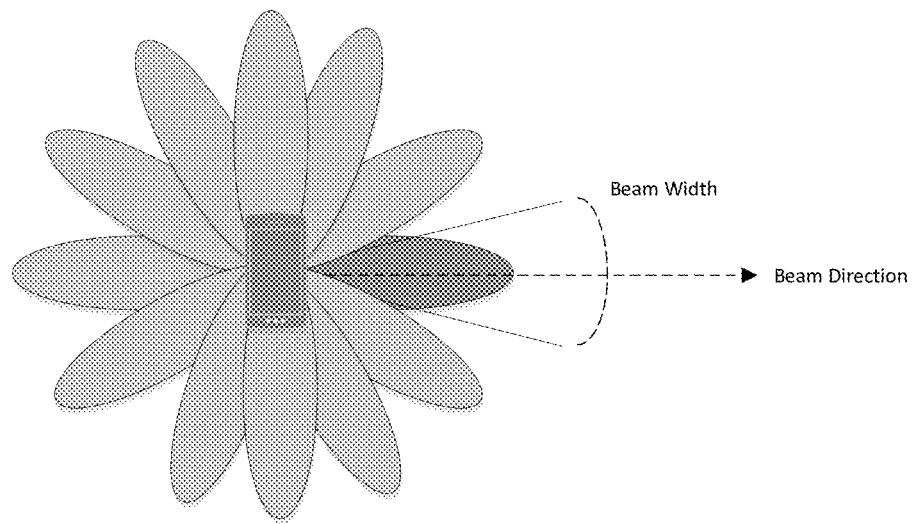
FIG. 6B illustrates an example of multi-beam operation according to embodiments of the present disclosure.

In a wireless system, a device can transmit or receive on multiple beams. This is known as "multi-beam operation" and is illustrated in FIG. 6B. While in FIG. 6B, for illustrative purposes, beams are only illustrated in 2D, it should be apparent to those skilled in the art that a beam can be 3D, where a beam can be transmitted to or received from any direction in space.

Figure 7:
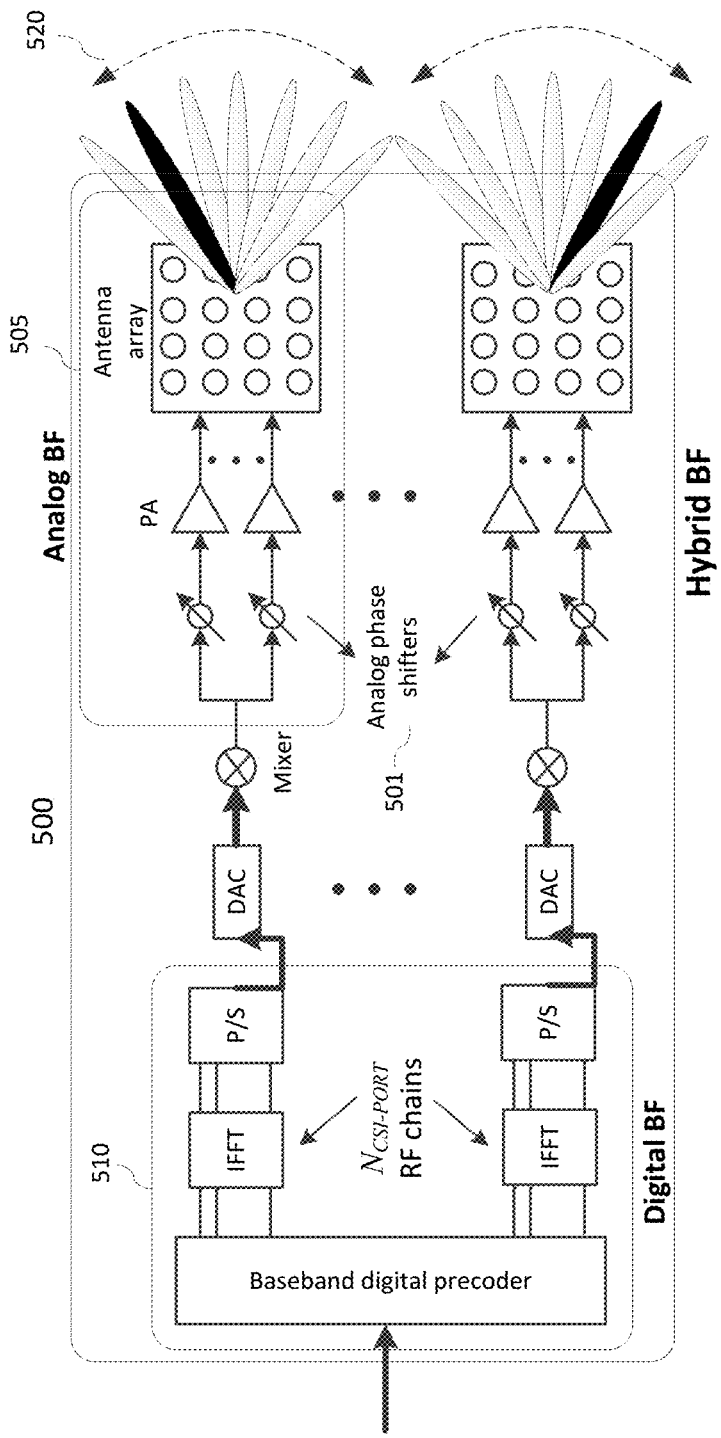
FIG. 7 illustrates an example hybrid beamformer according to embodiments of the present disclosure.

Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of ADCs/DACs at mmWave frequencies) as illustrated in FIG. 7. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is same as the number of CSI-RS ports $N_{CSI-PORT}$. A digital beamforming unit 510 performs a linear combination across $N_{CSI-PORT}$ analog beams to further increase a precoding gain. While analog beams are wide-band (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The above system is also applicable to higher frequency bands such as those above 52.6 GHz. In this case, the system can employ only analog beams. Due to the $O_2$ absorption loss around 60 GHz frequency (~10 dB additional loss per 100 m distance), a larger number and narrower analog beams (hence larger number of radiators in the array) are needed to compensate for the additional path loss.

Rel-17 introduced the unified TCI framework, wherein a unified or master or main or indicated TCI state is signaled to the UE also referred to as an indicated TCI state. The unified or master or main or indicated TCI state can be one of the following: In the case of joint TCI state indication, wherein a same beam is used for DL and UL channels, a joint TCI state that can be used at least for UE-dedicated DL channels and UE-dedicated UL channels. In the case of separate TCI state indication, wherein different beams are used for DL and UL channels, a DL TCI state that can be used at least for UE-dedicated DL channels. In the case of separate TCI state indication, wherein different beams are used for DL and UL channels, a UL TCI state that can be used at least for UE-dedicated UL channels. The unified (or master or main or indicated) TCI state is TCI state of UE-dedicated reception on PDSCH/PDCCH and CSI-RS when following the unified TCI state or transmission on dynamic-grant/configured-grant based PUSCH and all of dedicated PUCCH resources and SRS when following the unified TCI state.

The unified TCI framework applies to intra-cell beam management, wherein, the TCI states have a source RS that is directly or indirectly associated, through a quasi co-location relationship, e.g., a spatial relationship, with an SSB of a serving cell. The unified TCI state framework also applies to inter-cell beam management, wherein a TCI state can have a source RS that is directly or indirectly associated, through a quasi co-location relationship, e.g., a spatial relationship, with an SSB of cell that has a PCI different from the PCI of the serving cell.

The quasi-co-location (QCL) relationship between reference signals can be defined with respect to one or more of the following QCL types (see [4], section 5.1.5): Type A, {Doppler shift, Doppler spread, average delay, delay spread}. Type B, {Doppler shift, Doppler spread}. Type C, {Doppler shift, average delay}. Type D, {Spatial Rx parameter}.

In addition, the QCL relationship can also provide a spatial relationship for UL channels, e.g., a DL source reference signal provides information on the spatial domain filter to be used for UL transmissions, or the UL source reference signal provides the spatial domain filter to be used for UL transmissions, e.g., the same spatial domain filter for UL source reference signal and UL transmissions.

The unified (master or main or indicated) TCI state applies at least to UE dedicated DL and UL channels. The unified (master or main or indicated) TCI can also apply to other DL or UL channels or signals, e.g., non-UE dedicated channel and sounding reference signal (SRS).

In NR, the round trip propagation time (or RTT) corresponds to a TA offset value $N_{TA}$, which can be indicated via a "timing advance command" in a random access response (RAR) of a Type 1 random access procedure or MSGB response of a Type 2 random access procedure. The value signaled is a 12-bit timing advance command absolute value $T_A$ in the range of 0 to 3846. The TA offset $N_{TA}$, in units of $T_c$ (wherein $T_c=1/(\Delta f_{max} \cdot N_f)$, where $\Delta f_{max}=480$ kHz and $N_f=4096$), is calculated as:

$$N_{TA} = \frac{T_A \cdot 16 \cdot 64}{2^\mu} \quad (1)$$

where μ is the sub-carrier spacing configuration (or numerology).

Figure 8:
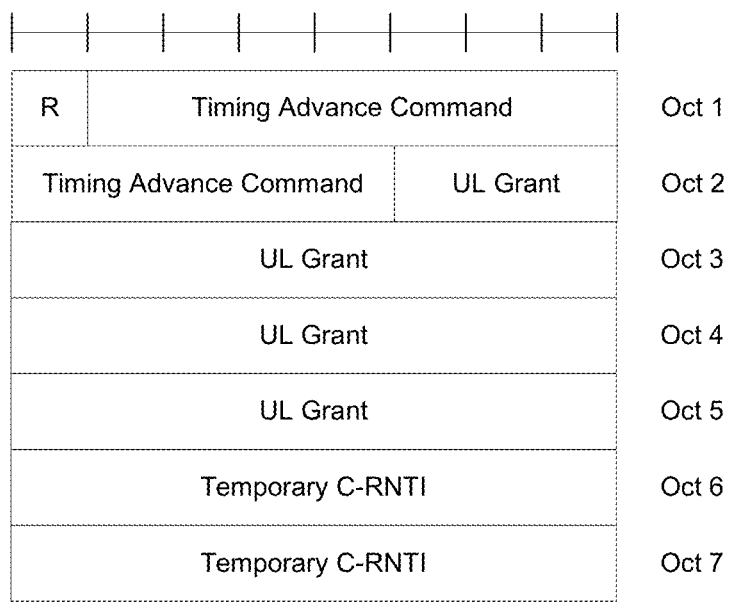
FIG. 8 illustrates an example Timing Advance command in a MAC RAR for Type 1 random access procedure according to embodiments of the present disclosure.

The MAC RAR (for Type 1 random access procedure) that includes the 12-bit Timing Advance command is as illustrated in FIG. 8 (see also [5], FIG. 6.2.3-1). The fallback RAR (for Type 2 random access procedure), which is used when MSGA PRACH is successfully received but MSGA PUSCH is not decoded correctly, includes the 12-bit Timing Advance command as illustrated in FIG. 8 (see also [5d,] FIG. 6.2.3a-1).

Figure 9:
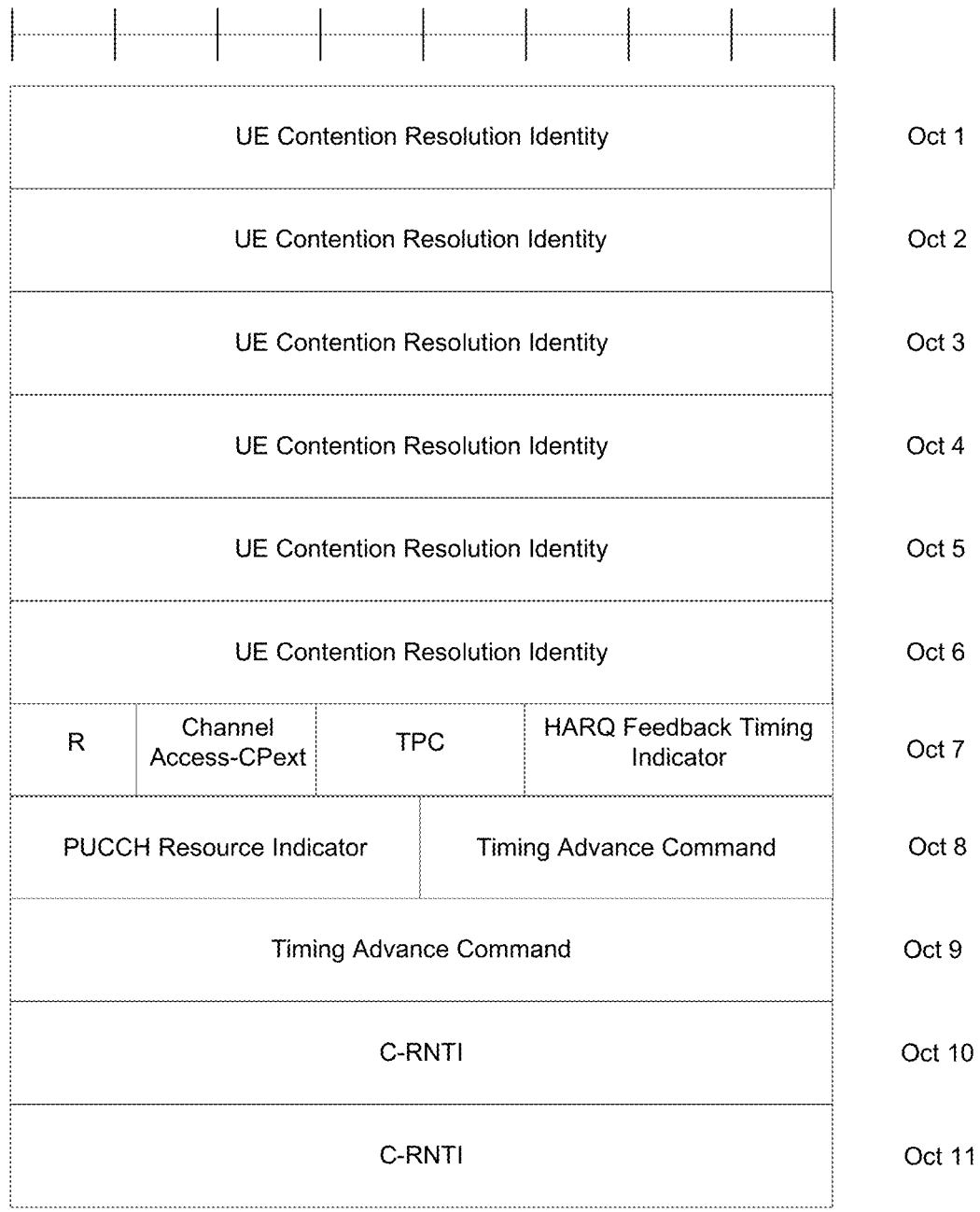
FIG. 9 illustrates an example Timing Advance command in a success RAR for Type 2 random access procedure according to embodiments of the present disclosure.

The success RAR (for Type 2 random access procedure), which is used when MSGA PRACH is successfully received and MSGA PUSCH is decoded correctly, includes the 12-bit Timing Advance command as illustrated in FIG. 9 (see also [5], FIG. 6.2.3a-2).

The timing advance command can also be indicated in a Timing Advance MAC Control Element (CE) (see also [5], clause 6.1.3.4), wherein the change in value of $N_{TA}$ can be indicated by a "Timing Advance Command" in the MAC CE. For example, the Timing Advance MAC CE indicates a timing advance command value $T_A$ in the range of 0 to 63 (i.e., a 6-bit value). The updated (new) $N_{TA}$ value relative to the previous (old) $N_{TA}$ value, in units of $T_c$ (where $T_c=1/(\Delta f_{max} \cdot N_f)$, $\Delta f_{max}=480$ kHz, and $N_f=4096$), is given by:

$$N_{TA,new} = N_{TA,old} + \frac{(T_A - 31) \cdot 16 \cdot 64}{2^\mu} \quad (2)$$

Figure 10:
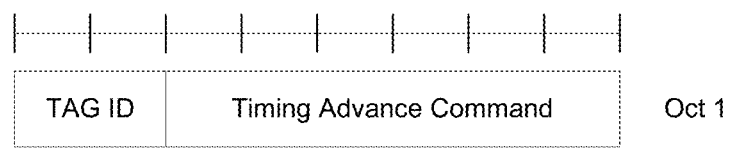
FIG. 10 illustrates an example Timing Advance Command MAC CE that includes the 6-bit Timing Advance Command according to embodiments of the present disclosure.

The Timing Advance Command MAC CE includes the 6-bit Timing Advance Command as illustrated in FIG. 10 (see also [5], FIG. 6.1.3.4-1). Also included is the associated TAG-ID.

The absolute TA value can also be indicated by an absolute timing advance MAC CE (see also [5], clause 6.1.3.4a) (e.g., included in or associated with MSGB of the Type-2 random access procedure), wherein the value signaled is a 12-bit timing advance command value $T_A$. The TA offset $N_{TA}$, in units of $T_c$, is calculated as:

$$N_{TA} = \frac{T_A \cdot 16 \cdot 64}{2^\mu} \quad (3)$$

Figure 11:
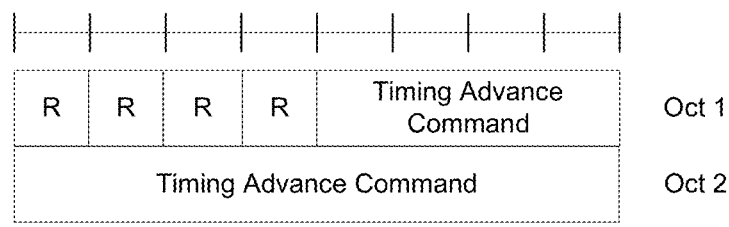
FIG. 11 illustrates an example Absolute Timing Advance Command MAC CE that includes the 12-bit Timing Advance Command according to embodiments of the present disclosure.

The Absolute Timing Advance Command MAC CE includes the 12-bit Timing Advance Command as illustrated in FIG. 11 (see also [5], FIG. 6.1.3.4a-1). Also included is the associated TAG-ID.

As discussed herein above, in the examples of this disclosure a UE can communicate with the network using different beams. The different beams can be used at different times (e.g., switching from one beam to another beam), or can be used simultaneously, (e.g., simultaneously receiving from the network on multiple beams or simultaneously transmitting to the network on multiple beams). In the former example, two or more TAs can be active in the UE but only one TA is used at a time, depending on the beam used for UL transmission. In the latter example, two or more TAs can be active in the UE and more than one TA is simultaneously used when the UE transmits on multiple UL beams simultaneously.

In one example 0.1, the UE communicates to the same TRP on two or more different beams. The different beams have different round trip delays. For example, the different round trip delays can be due to different reflections.

In another example 0.2, the UE communicates with two or more different TRPs with the same physical cell identity (PCI). The UE uses at least one beam to communicate with each TRP. The round-trip delay to each TRP can be different. The TRPs can be synchronized or unsynchronized.

Figure 12:
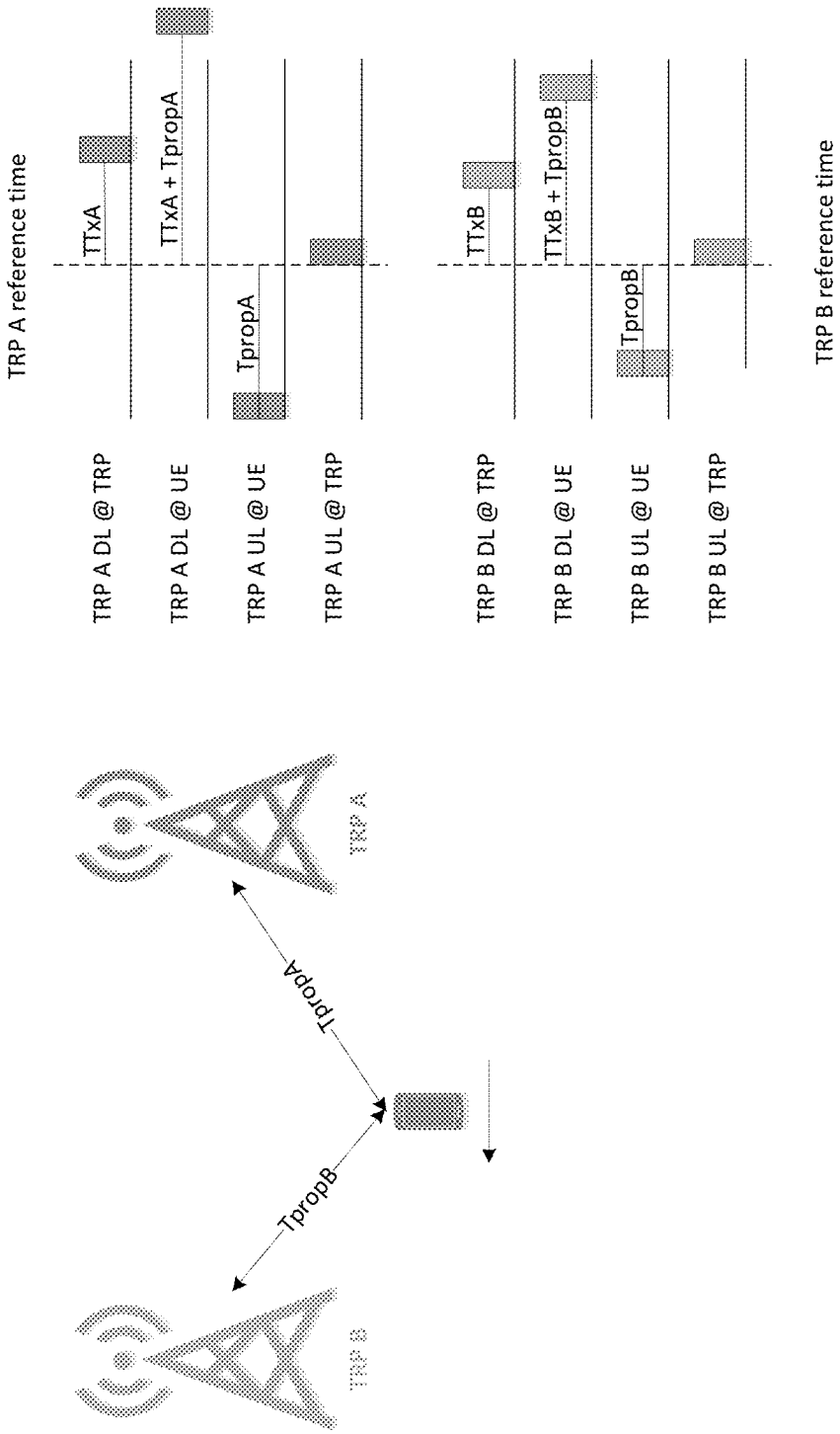
FIG. 12 illustrates an example of a UE communicating with a first TRP and a second TRP according to embodiments of the present disclosure.

FIG. 12 illustrates an example of a UE communicating with a first TRP (TRP A) and a second TRP (TRP B) according to embodiments of the present disclosure. When communicating with TRP A, the uplink PUSCH transmission is synchronized such that it arrives at TRP A at its reference time, within the CP range as described previously. TRP A and TRP B are synchronized such that TRP A has the same reference time as TRP B (i.e., TRP A and TRP B reference times are aligned) and the UE's uplink transmission is initially synchronized with TRP A. The UE observes DL Tx from TRP A and TRP B at times TTxA+TpropA and TTxB+TpropB, respectively, and determines TpropA−TpropB. The UE delays its uplink transmission by TpropA−TpropB to be synchronized with TRP B.

Figure 13:
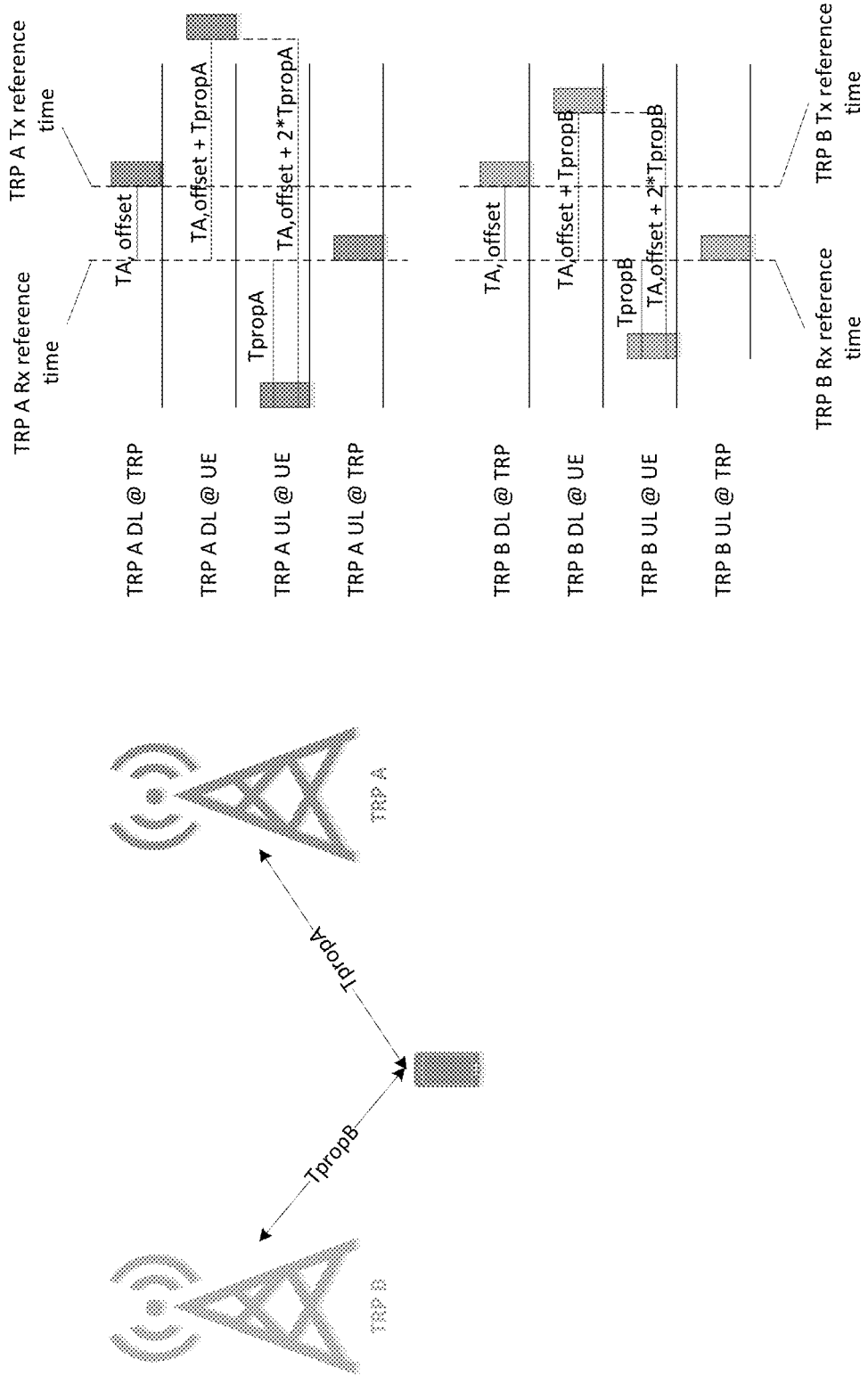
FIG. 13 illustrates a further example of a UE communicating with a first TRP and a second TRP according to embodiments of the present disclosure.

FIG. 13 illustrates a further example of a UE communicating with a first TRP (TRP A) and a second TRP (TRP B) according to embodiments of the present disclosure. At each TRP the DL transmissions are synchronized to a transmission (Tx) reference time and the UL receptions are synchronized to receive (Rx) reference time. The difference between the Tx reference time and the Rx reference time is denoted TA,offset. TA,offset can be the time in units of time (μs, ms, or sec) that corresponds to n-TimingAdvanceOffset ($N_{TA,offset}$), where $N_{TA,offset}$ can be in units of $T_c$. In one example $N_{TA,offset}=0$. In one example $N_{TA,offset}=25600$. In one example $N_{TA,offset}=39936$. In one example, $N_{TA,offset}=13792$.

In FIG. 13, the gNB transmits the DL signal at the TRP's Tx reference time, which can be after the TRP's Rx reference time by TA,offset. The DL signal undergoes a DL propagation delay of Tprop, where Tprop is the one-way propagation delay between the UE and the TRP. The DL signal arrives at the UE at Tprop after the TRP's Tx reference time, or at TA,offset+Tprop after the TRP's Rx reference time. The UE advances the UL transmission time relative to the DL reception time by TA,offset+round-trip-time (RTT), where the round-trip-time is the sum of the DL propagation delay and UL propagation delay, which is 2*Tprop. Hence the UL transmission at the UE is TA,offset+Tprop before the TRP's Tx reference time or Tprop before the TRP's Rx reference time. The UL transmission undergoes a UL propagation delay of Tprop. The UL reception at the base station arrives at the TRP's Rx reference time, or TA,offset before the TRP's Tx reference time.

As described above, the UE advances the UL transmission time relative to the DL reception time by TA,offset+round-trip-time (RTT) which can be expressed by $T_{TA}=(N_{TA}+N_{TA,offset}) \cdot T_c$ (see [1]), where $N_{TA}$ can be derived from the timing advance command value $T_A$ according to equations (1)-(3).

Figure 14:
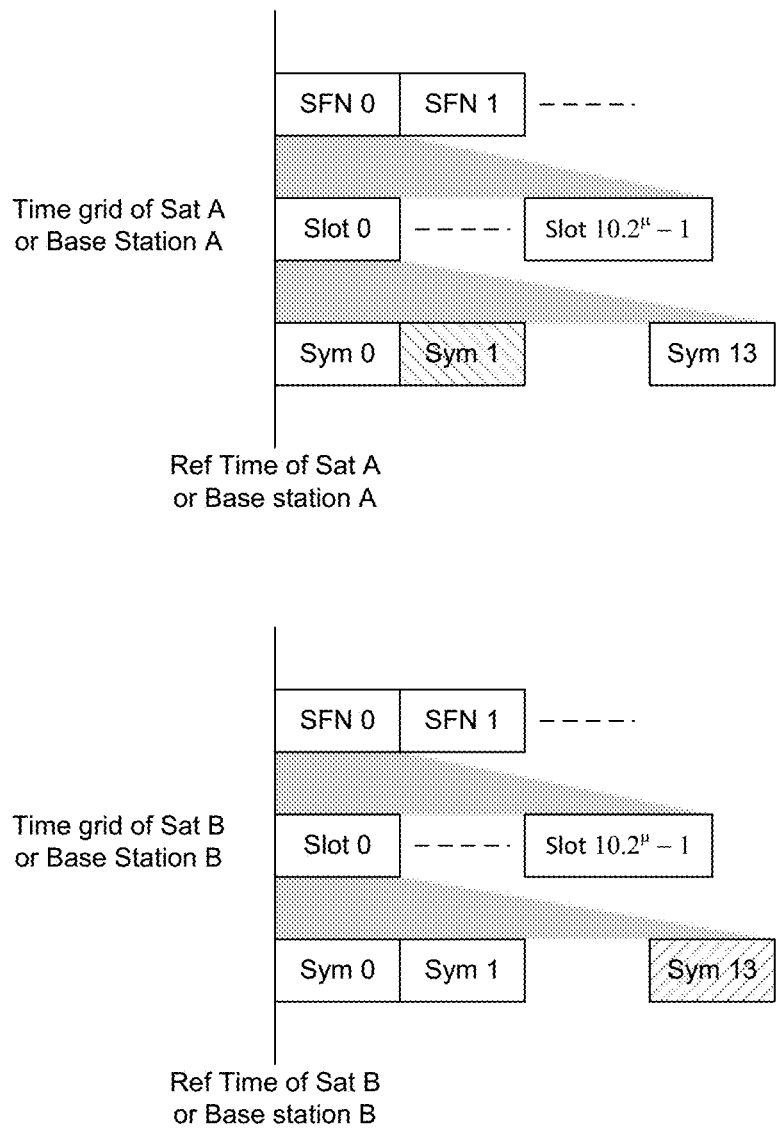
FIG. 14 illustrates an example of time grids of first and second TRPs with aligned reference times according to embodiments of the present disclosure.

In one example 0.2.1, TRP A and TRP B are synchronized such that TRP A has the same reference time as TRP B, as illustrated in FIG. 12. The reference time within each TRP can be the start of System Frame Number 0 (SFN 0) as shown in FIG. 14. The TRP establishes its time grid which determines the transmission time of each SFN, each slot within the SFN, and each symbol within each slot within each SFN relative to this reference time. In FIG. 12 and in FIG. 14, the reference time of TRP A is the same as the reference time of TRP B. In FIG. 14, μ is the Sub-Carrier Spacing Configuration (or numerology), which determines the sub-carrier spacing (SCS). For example, μ=0 is for SCS 15 kHz, μ=1 is for SCS=30 kHz. In general for SCS configuration μ the SCS is $2^\mu \cdot 15$ kHz. TRP A transmits a downlink signal at time $T_{TxA}$ relative to its reference time.

In the example of FIG. 14, the reference signal from TRP A is in Symbol 1 of Slot 0 of SFN 0. In this case, $T_{TxA}$ is the start of Symbol 1 of Slot 0 of SFN 0. For example, the reference signal can be an SS/PBCH block. In another example, the reference signal can be an NZP CSI-RS. In another example, the reference signal can be a PDCCH DM-RS or a PDSCH DM-RS. The signal from TRP A undergoes a propagation delay $T_{PropA}$. The signal is received at the UE at a time (relative to the reference time):

$$T_{DL_{UE_A}} = T_{TxA} + T_{PropA} \qquad (4)$$

TRP B transmits a downlink signal at time $T_{TxB}$ relative to its reference time. In the example of FIG. 14, the reference signal from TRP B is in Symbol 13 of Slot 0 of SFN 0, in this case, $T_{TxB}$ is the start of Symbol 13 of Slot 0 of SFN 0. For example, the reference signal can be an SS/PBCH block. In another example, the reference signal can be an NZP CSI-RS. In another example, the reference signal can be a PDCCH DM-RS or a PDSCH DM-RS. The signal from TRB B undergoes a propagation delay $T_{PropB}$. The signal is received at the UE at time (relative to the reference time):

$$T_{DL_{UE_B}} = T_{TxB} + T_{PropB} \qquad (5)$$

The UE can determine the difference in propagation delay from the two TRPs, i.e.:

$$T_{PropA} - T_{PropB} = \left(T_{DL_{UE_A}} - T_{TxA}\right) - \left(T_{DL_{UE_B}} - T_{TxB}\right) \qquad (6)$$

Figure 15:
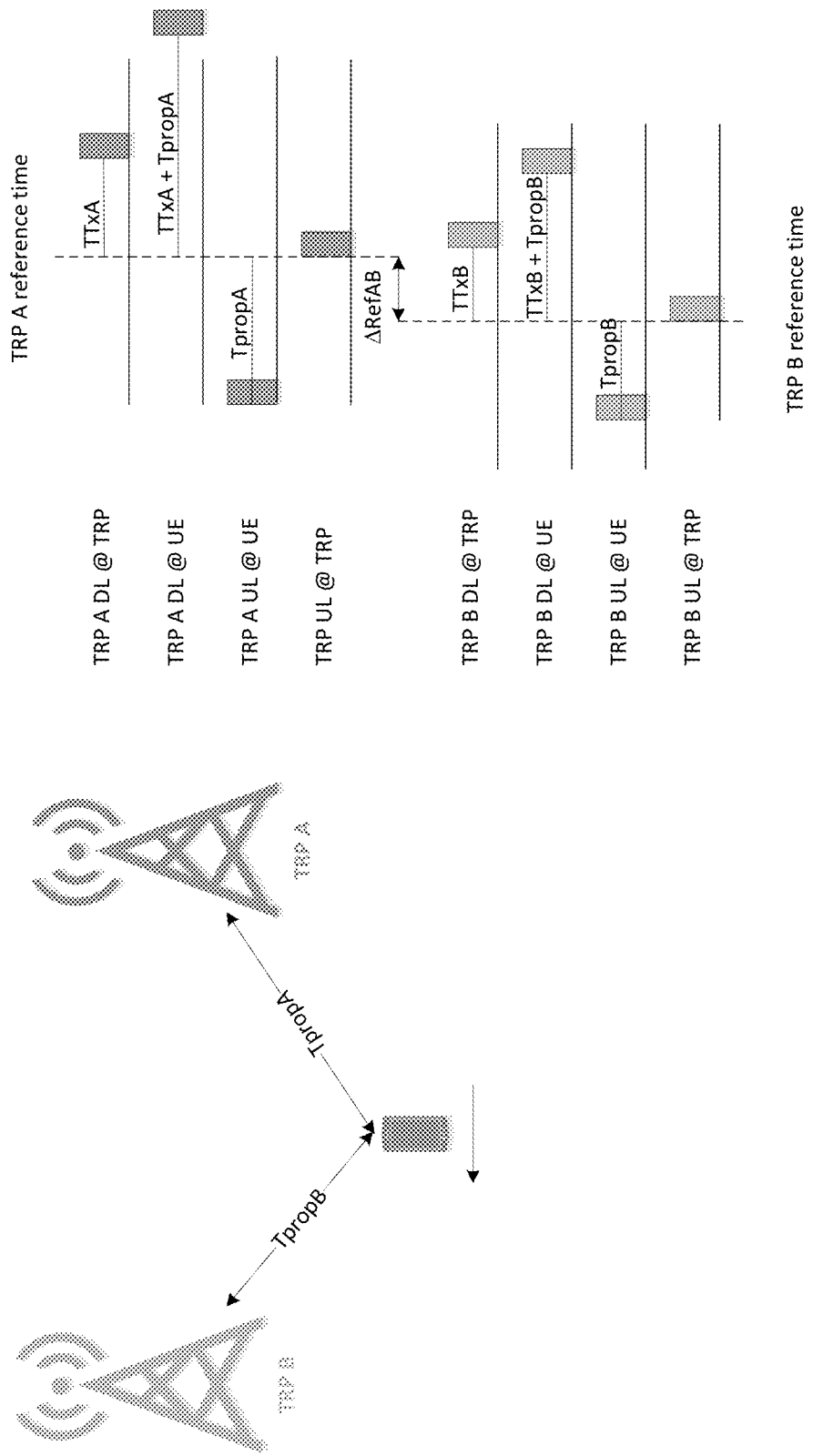
FIG. 15 illustrates an example of a UE communicating with a first TRP and a second TRP that have different reference times according to embodiments of the present disclosure.

In another example 0.2.2, TRP A and TRB B have different reference times, as illustrated in FIG. 15. In this example, TRP A and TRP B reference times are not aligned with a delta $\Delta_{RefAB}$. The UE is configured with the difference in reference time. The UE's uplink transmission is initially synchronized with TRP A. The UE observes DL Tx from TRP A and TRP B at times TTxA+TpropA+TRefA and TTxB+TpropB+TRefB, respectively, and determines TpropA−TpropB. The UE delays its uplink transmission by TpropA−TpropB and advances its uplink transmission by $\Delta_{RefAB}$ to be synchronized with TRP B.

A variant of FIG. 15 is to have a different reference time for DL transmit and UL receive for each TRP similar to the illustration in FIG. 13. TRP A's reference time is $T_{RefA}$ and TRP B's reference time is $T_{RefB}$. The difference between the two reference times is:

$$\Delta_{RefAB} = T_{RefA} - T_{RefB} \quad (7)$$

Figure 16:
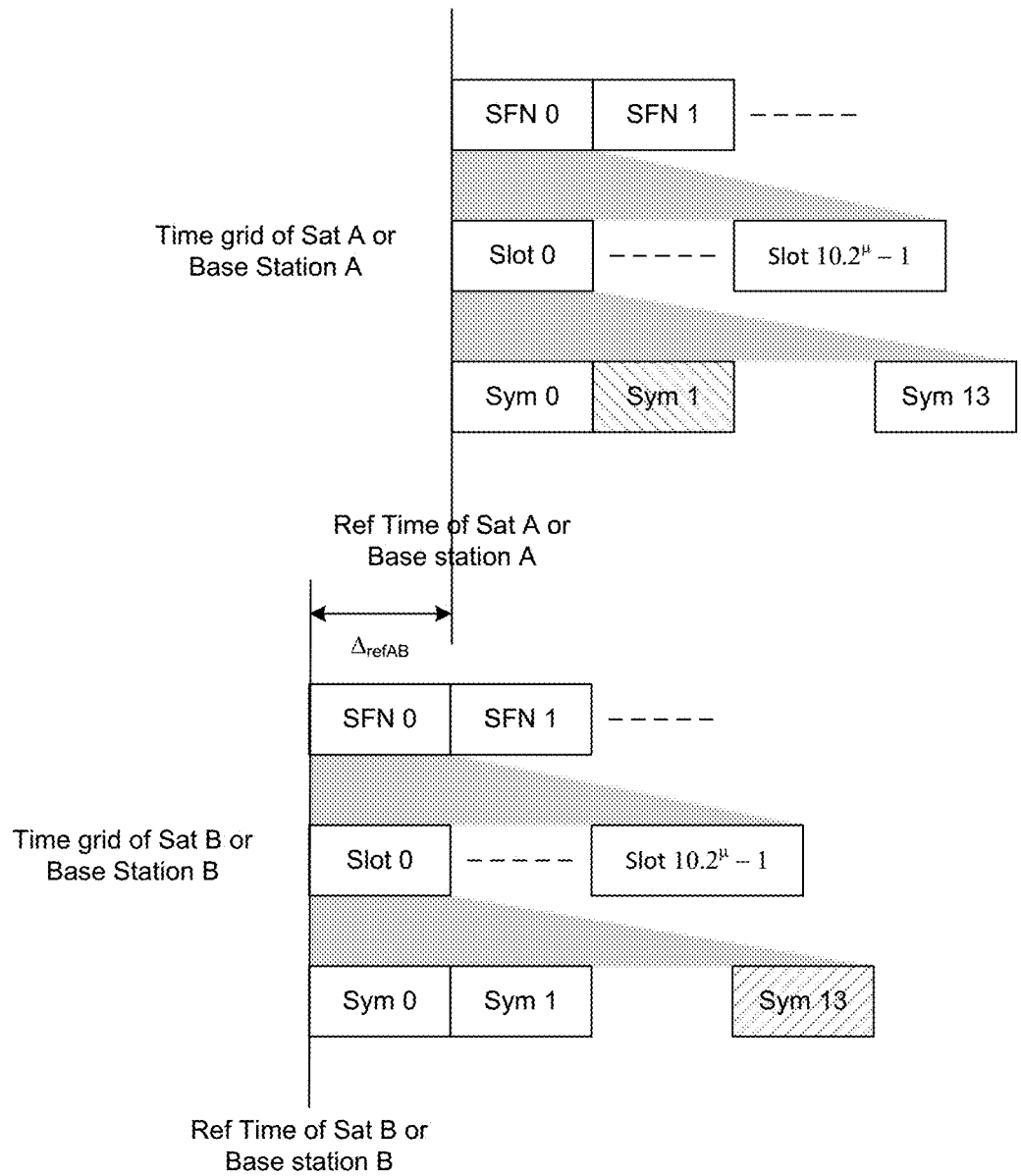
FIG. 16 illustrates an example of time grids of first and second TRPs with different reference times according to embodiments of the present disclosure.

The reference time within each TRP can be the start of SFN 0 as shown in FIG. 16. The TRP establishes its time grid which determines the transmission time of each SFN, each slot within the SFN, and each symbol within each slot within each SFN relative to this reference time. In FIG. 16 the reference time of TRP A is after the reference time of TRP B by $\Delta_{RefAB}$. In FIG. 16, μ is the Sub-Carrier Spacing Configuration, as in FIG. 14.

TRP A transmits a downlink signal at time $T_{TxA}$ relative to its reference time. In the example of FIG. 16, the reference signal from TRP A is in Symbol 1 of Slot 0 of SFN 0. In this case, $T_{TxA}$ is the start of Symbol 1 of Slot 0 of SFN 0. The reference signal can be an SS/PBCH block, a CSI-RS, a PDCCH DM-RS or a PDSCH DM-RS. The signal from TRP A undergoes a propagation delay $T_{PropA}$. The signal is received at the UE at time:

$$T_{DL_{UE_A}} = T_{RefA} + T_{TxA} + T_{PropA} \quad (8)$$

TRP B transmits a downlink signal at time $T_{TxB}$ relative to its reference time. In the example of FIG. 16, the reference signal from TRP B is in Symbol 13 of Slot 0 of SFN 0. In this case, $T_{TxB}$ is the start of Symbol 13 of Slot 0 of SFN 0. The reference signal can be an SS/PBCH block, a CSI-RS, a PDCCH DM-RS or a PDSCH DM-RS. The signal from TRP B undergoes a propagation delay $T_{PropB}$. The signal is received at the UE at time:

$$T_{DL_{UE_B}} = T_{RefB} + T_{TxB} + T_{PropB} \quad (9)$$

The UE can determine the difference in propagation delay between the two TRPs as:

$$T_{PropA} - T_{PropB} = \quad (10)$$
$$\left(T_{DL_{UE_A}} - T_{TxA} - T_{RefA}\right) - \left(T_{DL_{UE_B}} - T_{TxB} - T_{RefB}\right) =$$
$$(T_{DL\_UE\_A} - T_{TxA}) - (T_{DL\_UE\_B} - T_{TxB}) - \Delta_{RefAB}$$

In another example. 0.3, the UE communicates with two or more different TRPs with the same physical cell identity (PCI). The UE uses at least one beam to communicate with each TRP. The round-trip delay to each TRP can be different. The TRPs can be synchronized or unsynchronized. Example 0.2.1 and 0.2.2 can apply to example 0.3.

In one example 1, the UE is signaled two TA values. A first TA value for a first TRP or a first TRP-panel or a first beam or a first UE panel and a second TA value for a second TRP or a second TRP-panel or a second beam or a second UE panel.

In one example 1.1, the first TA and the second TA are included in the random access response (RAR) of a Type 1 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:

a. One random access response (RAR) is sent, the random access response includes: (1) a first Timing Advance Command for the first TRP or the first TRP-panel or the first beam or the first UE panel; (2) a second Timing Advance Command for the second TRP or the second TRP-panel or the second beam or the second UE panel.

b. Two random access responses (RARs) are sent, one associated with each preamble. Each random access response includes: (1) a first Timing Advance Command for the first TRP or the first TRP-panel or the first beam or the first UE panel; (2) a second Timing Advance Command for the second TRP or the second TRP-panel or the second beam or the second UE panel.

c. Two random access responses (RARs) are sent, one associated with each preamble. Each random access response includes a Timing Advance Command for the corresponding random access procedure.

Figure 17:
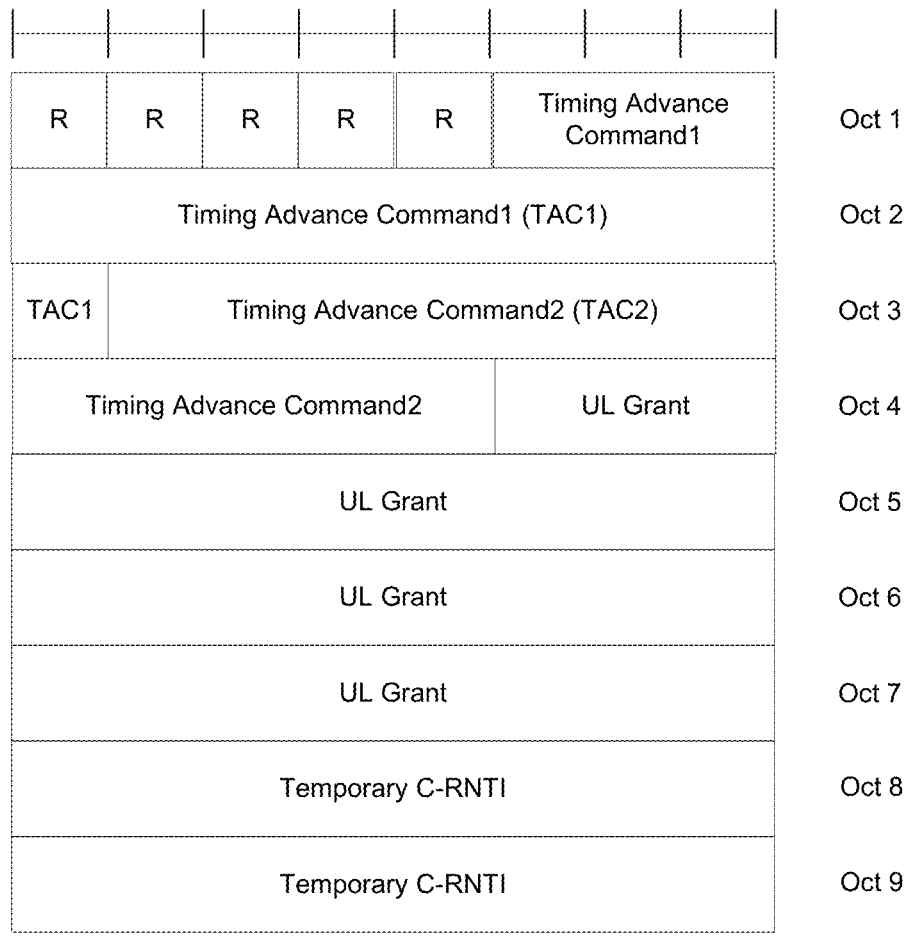
FIG. 17 illustrates an example of a RAR of a Type 1 random access procedure that includes two Timing Advance commands that each have 12 bits according to embodiments of the present disclosure.

When a random access response includes two Timing Advance commands, the random access response can be as illustrated in FIG. 17. In one example 1.1.1, the first Timing Advance Command (TAC1) and the second Timing Advance Command (TAC2), each has 12 bits as illustrated in FIG. 17. In a variant example, if TAC1 or TAC2 is set to a pre-defined value, this value indicates that the corresponding TAC doesn't include a valid Timing Advance Command.

Figure 18:
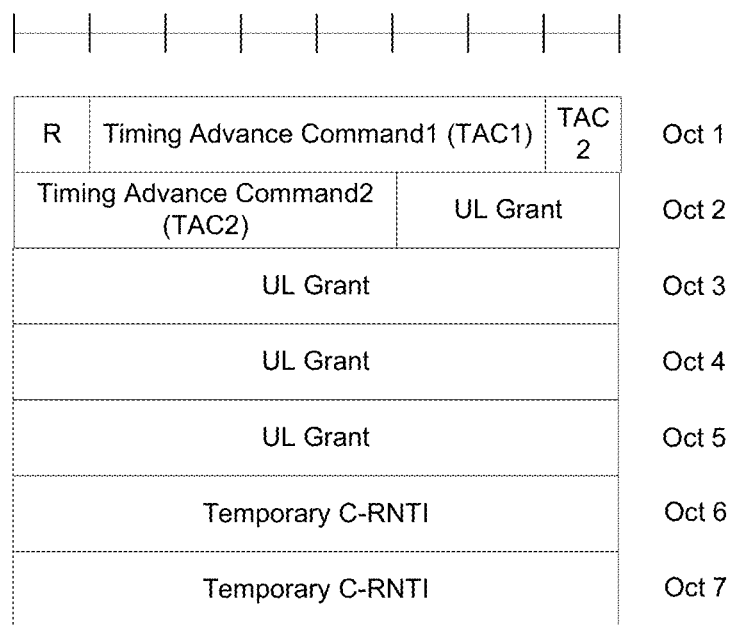
FIG. 18 illustrates an example of a RAR of a Type 1 random access procedure that includes two Timing Advance commands that have 12 bits total according to embodiments of the present disclosure.

In one example 1.1.2, the first Timing Advance Command (TAC1) and the second Timing Advance Command (TAC2) both have 12 bits total as illustrated in FIG. 18. For example, TAC1 is 6 bits and TAC2 is 6 bits. In a variant example, if TAC1 or TAC2 is set to a pre-defined value, this value indicates that the corresponding TAC doesn't include a valid Timing Advance Command. In a variant example, "R" is a flag, wherein if R=0, RAR includes TAC1 and TAC2, if R=1, RAR includes one TAC only with 12 bits. In a variant example, "R" is a flag, wherein if R=1, RAR includes TAC1 and TAC2, if R=0, RAR includes one TAC only with 12 bits.

In one example 1.1.3, the first Timing Advance Command (TAC1) has $N_1$ bits and the second Timing Advance Command (TAC2) has $N_2$ bits. In one example $N_1=N_2$. In a variant example, if TAC1 or TAC2 is set to a pre-defined value, this value indicates that the corresponding TAC doesn't include a valid Timing Advance Command.

In one example 1.2, the first TA and the second TA are included in the fallback random access response (RAR) of a Type 2 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:

a. One fallback back is sent, the random access response includes: (1) a first Timing Advance Command for the first TRP or the first TRP-panel or the first beam or the first UE panel; (2) a second Timing Advance Command for the second TRP or the second TRP-panel or the second beam or the second UE panel.
b. Two random access responses are sent, one associated with each preamble, and at least one of which is a fallback RAR. Each random access response includes: (1) a first Timing Advance Command for the first TRP or the first TRP-panel or the first beam or the first UE panel; (2) a second Timing Advance Command for the second TRP or the second TRP-panel or the second beam or the second UE panel.
c. Two random access responses are sent, one associated with each preamble. Each random access response includes a Timing Advance Command for the corresponding random access procedure.

Figure 19:
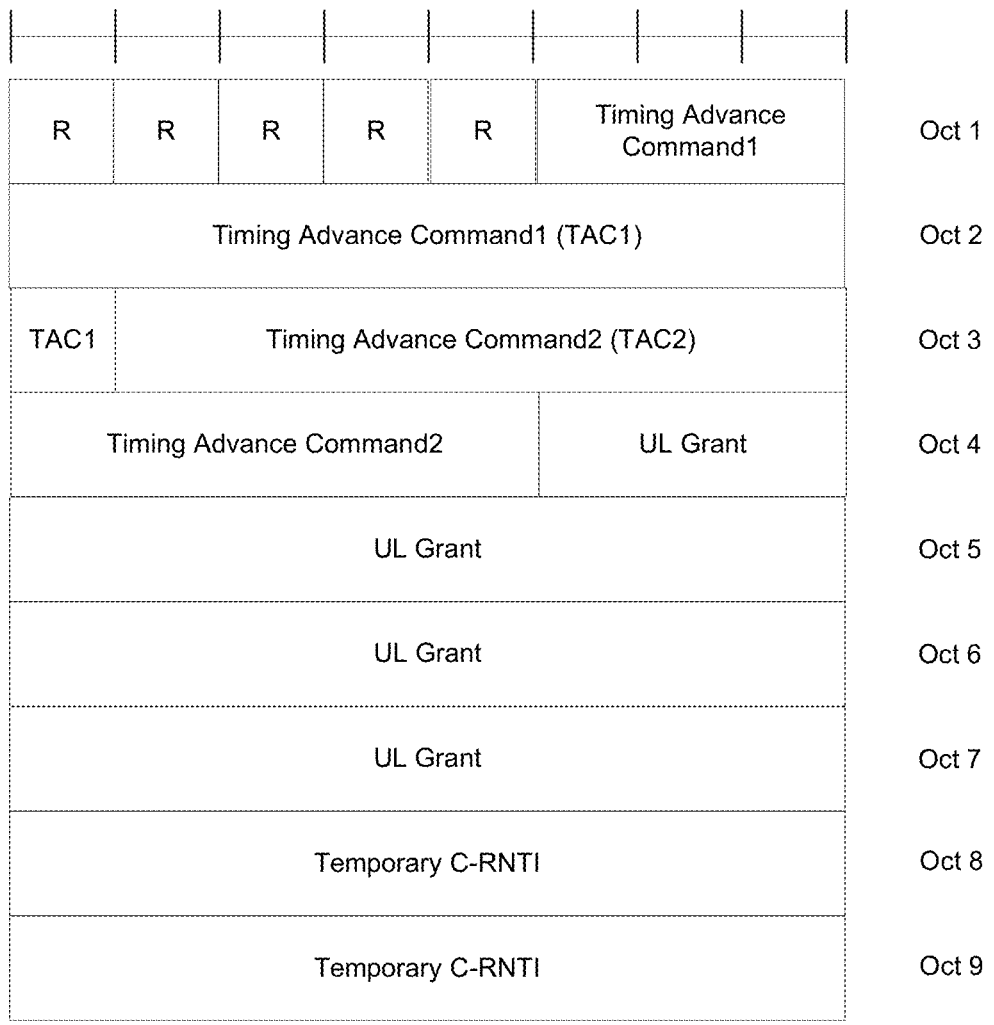
FIG. 19 illustrates an example of a fallback RAR of a Type 2 random access procedure that includes two Timing Advance commands that each have 12 bits according to embodiments of the present disclosure.

When a random access response includes two Timing Advance Commands, the random access response can be as illustrated in FIG. 19. In one example 1.2.1, the first Timing Advance Command (TAC1) and the second Timing Advance Command (TAC2) each have 12 bits as illustrated in FIG. 19. In a variant example, if TAC1 or TAC2 is set to a pre-defined value, this value indicates that the corresponding TAC doesn't include a valid Timing Advance Command.

Figure 20:
FIG. 20 illustrates an example of a fallback RAR of a Type 2 random access procedure that includes two Timing Advance commands that have 12 bits total according to embodiments of the present disclosure.

In one example 1.2.2, the first Timing Advance Command (TAC1) and the second Timing Advance Command (TAC2) have 12 bits total as illustrated in FIG. 20. For example, TAC1 is 6 bits and TAC2 is 6 bits. In a variant example, if TAC1 or TAC2 is set to a pre-defined value, this value indicates that the corresponding TAC doesn't include a valid Timing Advance Command. In a variant example, "R" is a flag, wherein if R=0, RAR includes TAC1 and TAC2, if R=1, RAR includes one TAC only with 12 bits. In a variant example, "R" is a flag, wherein if R=1, RAR includes TAC1 and TAC2, if R=0, RAR includes one TAC only with 12 bits.

In one example 1.2.3, the first Timing Advance Command (TAC1) has $N_1$ bits and the second Timing Advance Command (TAC2) has $N_2$ bits. In one example $N_1=N_2$. In a variant example, if TAC1 or TAC2 is set to a pre-defined value, this value indicates that the corresponding TAC doesn't include a valid Timing Advance Command.

In one example 1.3, the first TA and the second TA are included in the success random access response (RAR) of a Type 2 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:

a. One success RAR is sent, the random access response includes: (1) a first Timing Advance Command for the first TRP or the first TRP-panel or the first beam or the first UE panel; (2) a second Timing Advance Command for the second TRP or the second TRP-panel or the second beam or the second UE panel.
b. Two random access responses are sent, one associated with each preamble, and at least one of which is a success RAR. Each random access response includes: (1) a first Timing Advance Command for the first TRP or the first TRP-panel or the first beam or the first UE panel; (2) a second Timing Advance Command for the second TRP or the second TRP-panel or the second beam or the second UE panel.
c. Two random access responses are sent, one associated with each preamble. Each random access response includes a Timing Advance Command for the corresponding random access procedure.

Figure 21:
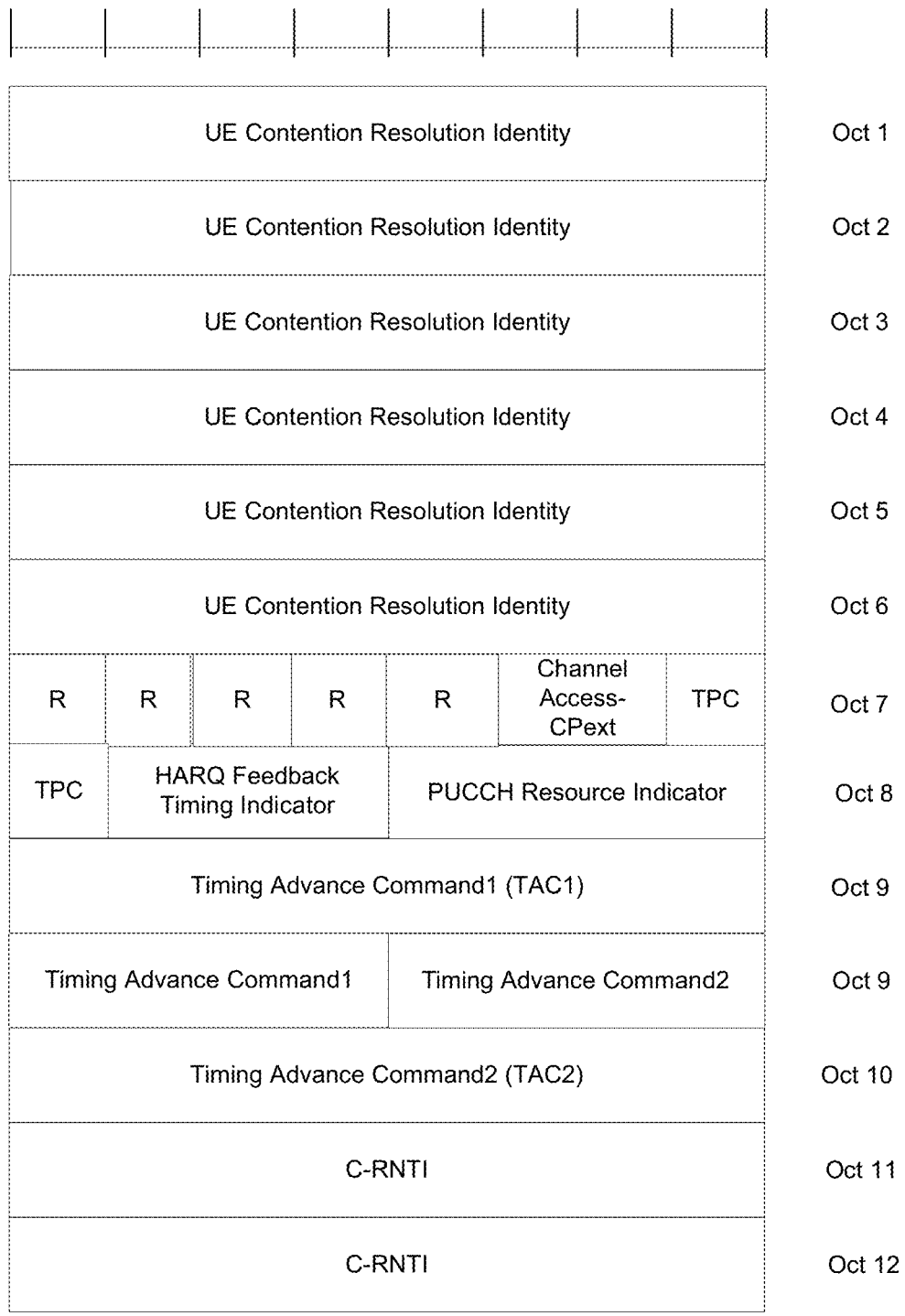
FIG. 21 illustrates an example of a success RAR of a Type 2 random access procedure that includes two Timing Advance commands that each have 12 bits according to embodiments of the present disclosure.

When a random access response includes two Timing Advance Commands, the random access response can be as illustrated in FIG. 21. In one example 1.3.1, the first Timing Advance Command (TAC1) and the second Timing Advance Command (TAC2) each have 12 bits as illustrated in FIG. 21. In a variant example, if TAC1 or TAC2 is set to a pre-defined value, this value indicates that the corresponding TAC doesn't include a valid Timing Advance Command.

Figure 22:
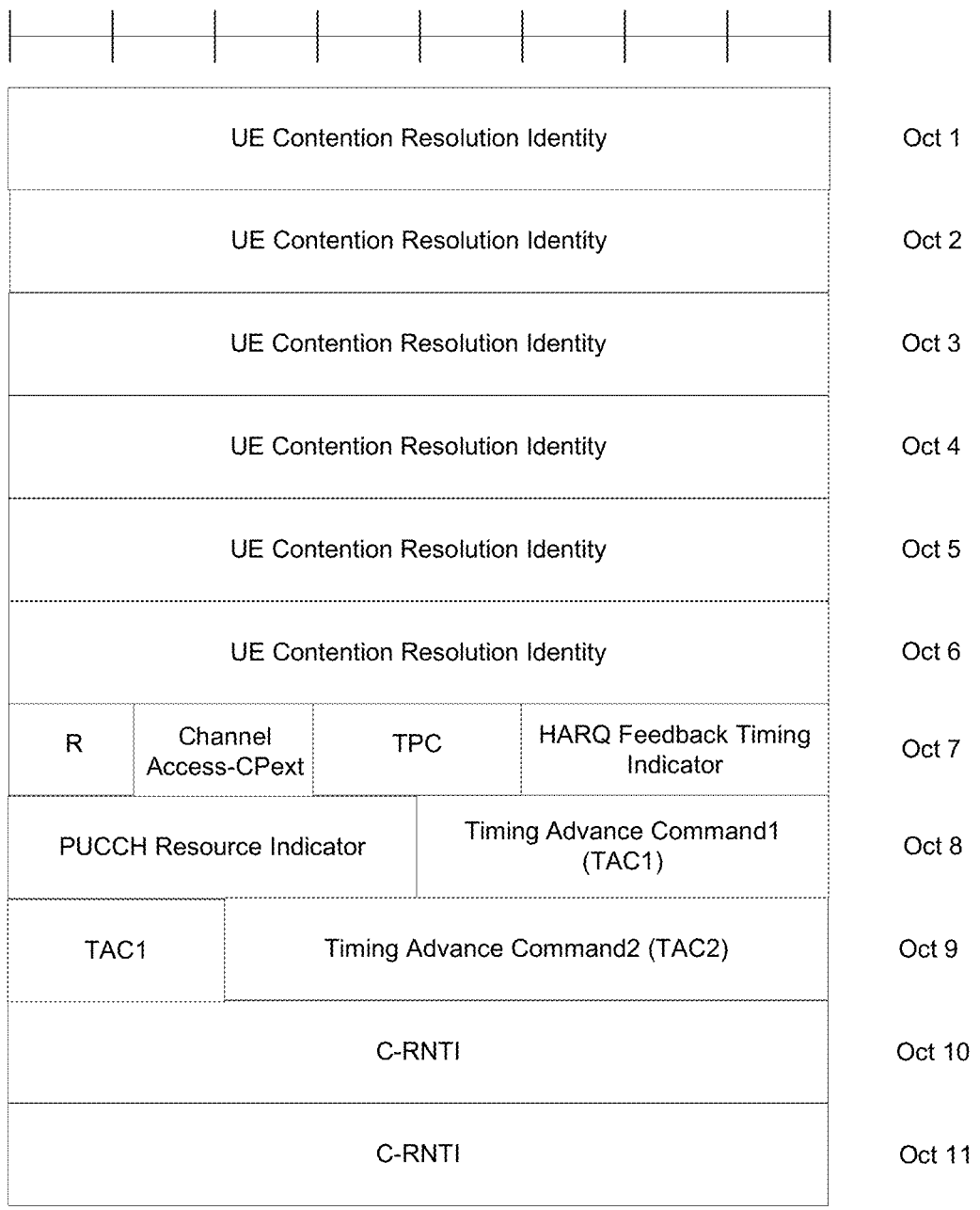
FIG. 22 illustrates an example of a success RAR of a Type 2 random access procedure that includes two Timing Advance commands that have 12 bits total according to embodiments of the present disclosure.

In one example 1.3.2, the first Timing Advance Command (TAC1) and the second Timing Advance Command (TAC2) have 12 bits total as illustrated in FIG. 22. For example, TAC1 is 6 bits and TAC2 is 6 bits. In a variant example, if TAC1 or TAC2 is set to a pre-defined value, this value indicates that the corresponding TAC doesn't include a valid Timing Advance Command. In a variant example, "R" is a flag, wherein if R=0, RAR includes TAC1 and TAC2, if R=1, RAR includes one TAC only with 12 bits. In a variant example, "R" is a flag, wherein if R=1, RAR includes TAC1 and TAC2, if R=0, RAR includes one TAC only with 12 bits.

In one example 1.3.3, the first Timing Advance Command (TAC1) has $N_1$ bits and the second Timing Advance Command (TAC2) has $N_2$ bits. In one example $N_1=N_2$. In a variant example, if TAC1 or TAC2 is set to a pre-defined value, this value indicates that the corresponding TAC doesn't include a valid Timing Advance Command.

In examples 1.1, 1.2, 1.3, one of the random access procedure can be a Type 1 random access procedure and other can be a type 2 random access procedure, or both can be a type 1 random access procedure or both can be a type 2 random access procedure. Possible examples are shown in TABLE 1.

TABLE 1

| First random access procedure | Second random access procedure | Outcome of first random access procedure | Outcome of second random access procedure | Transmitted RAR |
|---|---|---|---|---|
| Type 1 | Type 1 | Preamble received | Preamble received | One RAR with 2 TACs |
| Type 1 | Type 1 | Preamble received | Preamble received | RAR1 with 2 TACs RAR2 with 2 TACs |
| Type 2 | Type 2 | MSGA PRACH received MSGA PUSCH not decoded | MSGA PRACH received MSGA PUSCH not decoded | One Fallback RAR with 2 TACs |

TABLE 1-continued

| First random access procedure | Second random access procedure | Outcome of first random access procedure | Outcome of second random access procedure | Transmitted RAR |
|---|---|---|---|---|
| Type 2 | Type 2 | MSGA PRACH received<br>MSGA PUSCH not decoded | MSGA PRACH received<br>MSGA PUSCH not decoded | Fallback RAR1 with 2 TACs<br>Fallback RAR2 with 2 TACs |
| Type 2 | Type 2 | MSGA PRACH received<br>MSGA PUSCH decoded | MSGA PRACH received<br>MSGA PUSCH decoded | One Success RAR with 2 TACs |
| Type 2 | Type 2 | MSGA PRACH received<br>MSGA PUSCH decoded | MSGA PRACH received<br>MSGA PUSCH decoded | Success RAR1 with 2 TACs<br>Success RAR2 with 2 TACs |
| Type 2 | Type 2 | MSGA PRACH received<br>MSGA PUSCH not decoded | MSGA PRACH received<br>MSGA PUSCH decoded | One Success RAR with 2 TACs |
| Type 2 | Type 2 | MSGA PRACH received<br>MSGA PUSCH not decoded | MSGA PRACH received<br>MSGA PUSCH decoded | Fallback RAR1 with 2 TACs<br>Success RAR2 with 2 TACs |
| Type 1 | Type 2 | Preamble received | MSGA PRACH received<br>MSGA PUSCH not decoded | Fallback RAR (or RAR) with 2 TACs |
| Type 1 | Type 2 | Preamble received | MSGA PRACH received<br>MSGA PUSCH not decoded | RAR1 with 2 TACs<br>Fallback RAR2 with 2 TACs |
| Type 1 | Type 2 | Preamble received | MSGA PRACH received<br>MSGA PUSCH decoded | One Success RAR with 2 TACs |
| Type 1 | Type 2 | Preamble received | MSGA PRACH received<br>MSGA PUSCH decoded | RAR1 with 2 TACs<br>Success RAR2 with 2 TACs |

In one example 1.4, the first TA and the second TA are included in the Timing Advance Command MAC CE. When a Timing Advance Command MAC CE includes two Timing Advance Commands, the Timing Advance Command MAC CE can be as illustrated in FIG. 23.

Figure 23:
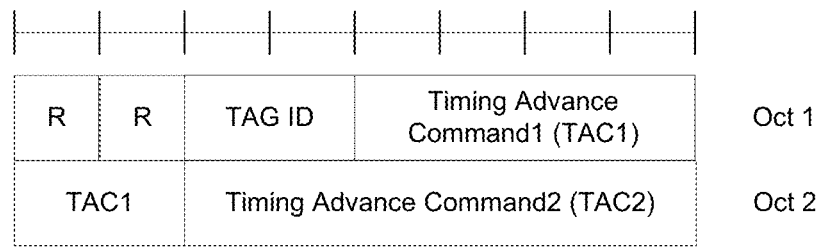
FIG. 23 illustrates an example Timing Advance Command MAC CE that includes two Timing Advance Commands that each have 6 bits according to embodiments of the present disclosure.

In one example 1.4.1, the first Timing Advance Command (TAC1) and the second Timing Advance Command (TAC2) each have 6 bits as illustrated in FIG. 23. In a variant example, if TAC1 or TAC2 is set to a pre-defined value, this value indicates that the corresponding TAC doesn't include a valid Timing Advance Command.

Figure 24:
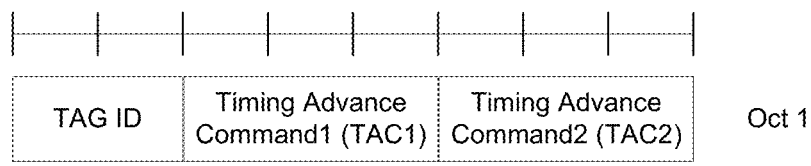
FIG. 24 illustrates an example Timing Advance Command MAC CE that includes two Timing Advance Commands that have 6 bits total according to embodiments of the present disclosure.

In one example 1.4.2, the first Timing Advance Command (TAC1) and the second Timing Advance Command (TAC2) have 6 bits total as illustrated in FIG. 24. For example, TAC1 is 3 bits and TAC2 is 3 bits. In a variant example, if TAC1 or TAC2 is set to a pre-defined value, this value indicates that the corresponding TAC doesn't include a valid Timing Advance Command.

In one example 1.4.3, the first Timing Advance Command (TAC1) has $N_1$ bits and the second Timing Advance Command (TAC2) has $N_2$ bits. In one example $N_1=N_2$. In a variant example, if TAC1 or TAC2 is set to a pre-defined value, this value indicates that the corresponding TAC doesn't include a valid Timing Advance Command.

In one example 1.5, the first TA and the second TA are included in the absolute Timing Advance Command MAC CE. When an absolute Timing Advance Command MAC CE includes two Timing Advance Commands, the absolute Timing Advance Command MAC CE can be as illustrated in FIG. 25.

Figure 25:
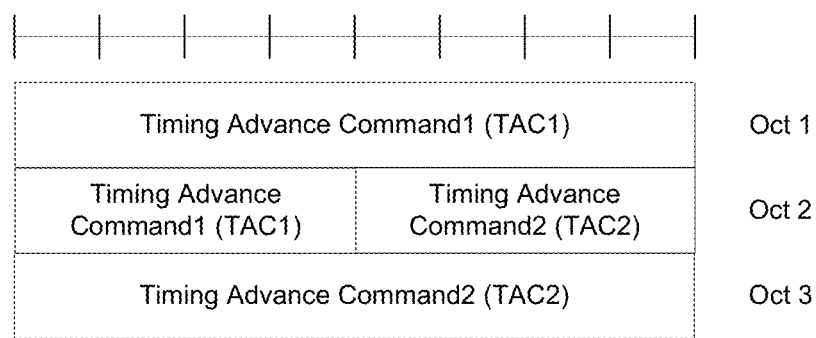
FIG. 25 illustrates an example absolute Timing Advance Command MAC CE that includes two Timing Advance Commands that each have 12 bits according to embodiments of the present disclosure.

In one example 1.5.1, the first Timing Advance Command (TAC1) and the second Timing Advance Command (TAC2) each have 12 bits as illustrated in FIG. 25. In a variant example, if TAC1 or TAC2 is set to a pre-defined value, this value indicates that the corresponding TAC doesn't include a valid Timing Advance Command.

Figure 26:
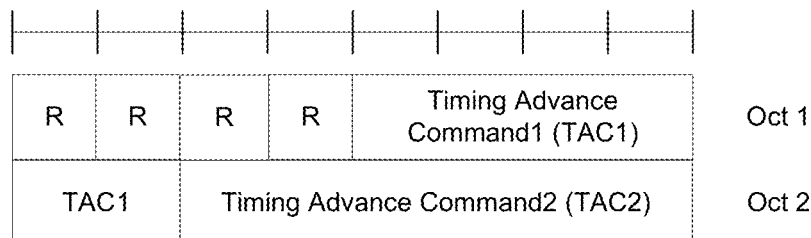
FIG. 26 illustrates an example absolute Timing Advance Command MAC CE that includes two Timing Advance Commands that have 12 bits total according to embodiments of the present disclosure.

In one example 1.5.2, the first Timing Advance Command (TAC1) and the second Timing Advance Command (TAC2) have 12 bits total as illustrated in FIG. 26. For example, TAC1 is 6 bits and TAC2 is 6 bits. In a variant example, if TAC1 or TAC2 is set to a pre-defined value, this value indicates that the corresponding TAC doesn't include a valid Timing Advance Command. In a variant example one of "R" is a flag, wherein if R=0, RAR includes TAC1 and TAC2, if R=1, RAR includes one TAC only with 12 bits. In a variant example one of "R" is a flag, wherein if R=1, RAR includes TAC1 and TAC2, if R=0, RAR includes one TAC only with 12 bits.

In one example 1.5.3, the first Timing Advance Command (TAC1) has $N_1$ bits and the second Timing Advance Command (TAC2) has $N_2$ bits. In one example $N_1=N_2$. In a variant example, if TAC1 or TAC2 is set to a pre-defined value, this value indicates that the corresponding TAC doesn't include a valid Timing Advance Command.

In one example 2, the UE is signaled two TA values. A first TA value for a first TRP or a first TRP-panel or a first beam or a first UE panel and a second differential TA value for a second TRP or a second TRP-panel or a second beam or a second UE panel. The second TA value=The first TA value+the second differential TA value.

In one example 2.1, the first TA and the second differential TA are included in the random access response (RAR) of a Type 1 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:
  a. One random access response (RAR) is sent, the random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.
  b. Two random access response (RAR) are sent, one associated with each preamble. Each random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.
  c. Two random access response (RAR) are sent, one associated with each preamble. Each random access response includes a Timing Advance Command for the corresponding random access procedure.

Figure 27:
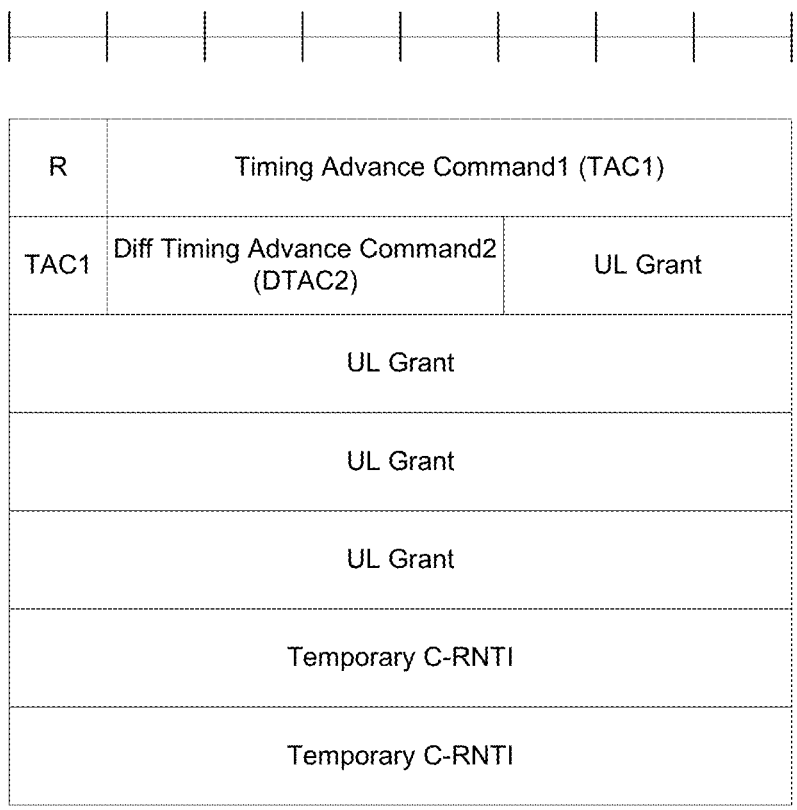
FIG. 27 illustrates an example of a RAR of a Type 1 random access procedure that includes a Timing Advance Command and a differential Timing Advance Command that have 12 bits total according to embodiments of the present disclosure.

When a random access response includes two Timing Advance Commands, the random access response can be as illustrated in FIG. 27.

In one example 2.1.1, the first Timing Advance Command (TAC1) has $N_1$ bits and the second differential Timing Advance Command (TAC2) has $N_2$ bits. In one example $N_1=N_2$. In one example $N_1>N_2$. In a variant example, if DTAC2 is set to a pre-defined value, this value indicates that the corresponding TAC doesn't include a valid Timing Advance Command.

In one example 2.1.2, the first Timing Advance Command (TAC1) and the second differential Timing Advance Command (DTAC2) have 12 bits total as illustrated in FIG. 27. For example, TAC1 is 6 bits and DTAC2 is 6 bits. In another example, TAC1 is 8 bits and DTAC2 is 4 bits. In another example, TAC1 is 9 bits and DTAC2 is 3 bits. In a variant example, if DTAC2 is set to a pre-defined value, this value indicates that the corresponding TAC doesn't include a valid Timing Advance Command. In a variant example, "R" is a flag, wherein if R=0, RAR includes TAC1 and DTAC2, if R=1, RAR includes one TAC only with 12 bits. In a variant example, "R" is a flag, wherein if R=1, RAR includes TAC1 and DTAC2, if R=0, RAR includes one TAC only with 12 bits.

In one example 2.2, the first TA and the second differential TA are included in the fallback random access response (RAR) of a Type 2 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:
  a. One fallback back is sent, the random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.
  b. Two random access responses are sent, one associated with each preamble, and at least one of which is a fallback RAR. Each random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.
  c. Two random access responses are sent, one associated with each preamble. Each random access response includes a Timing Advance Command for the corresponding random access procedure.

Figure 28:
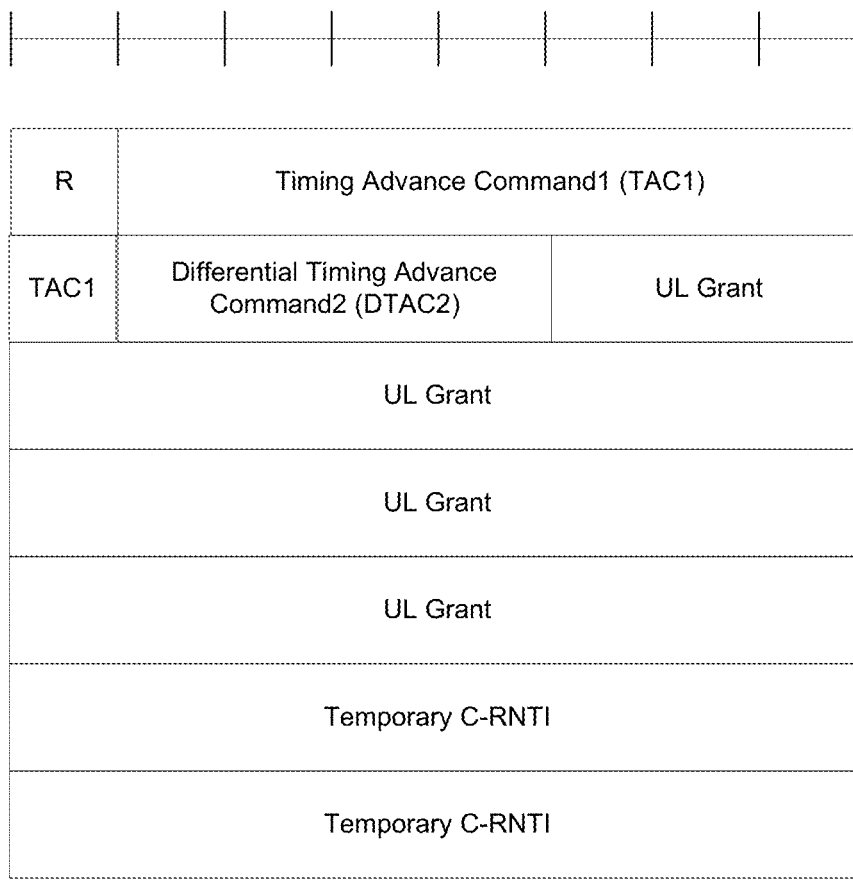
FIG. 28 illustrates an example of a fallback RAR of a Type 2 random access procedure that includes a Timing Advance Command and a differential Timing Advance Command that have 12 bits total according to embodiments of the present disclosure.

When a random access response includes two Timing Advance Commands, the random access response can be as illustrated in FIG. 28.

In one example 2.2.1, the first Timing Advance Command (TAC1) has $N_1$ bits and the second differential Timing Advance Command (DTAC2) has $N_2$ bits. In one example $N_1=N_2$. In one example $N_1>N_2$. In a variant example, if DTAC2 is set to a pre-defined value, this value indicates that the corresponding TAC doesn't include a valid Timing Advance Command.

In one example 2.2.2, the first Timing Advance Command (TAC1) and the second differential Timing Advance Command (DTAC2) have 12 bits total as illustrated in FIG. 28. For example, TAC1 is 6 bits and DTAC2 is 6 bits. In another example, TAC1 is 8 bits and DTAC2 is 4 bits. In another example, TAC1 is 9 bits and DTAC2 is 3 bits. In a variant example, if DTAC2 is set to a pre-defined value, this value indicates that the corresponding TAC doesn't include a valid Timing Advance Command. In a variant example, "R" is a flag, wherein if R=0, RAR includes TAC1 and DTAC2, if R=1, RAR includes one TAC only with 12 bits. In a variant example, "R" is a flag, wherein if R=1, RAR includes TAC1 and DTAC2, if R=0, RAR includes one TAC only with 12 bits.

In one example 2.3, the first TA and the second differential TA are included in the success random access response (RAR) of a Type 2 random access procedure. Wherein, a first random access procedure is performed using a first TRP or a first TRP-panel or a first beam or a first UE panel. A second random access procedure is performed using a second TRP or a second TRP-panel or a second beam or a second UE panel. The first random access procedure and the second random access procedure can be linked. In response to the preamble of the first random access procedure and the preamble of the second random access procedure, one of the following can occur:
  a. One success RAR is sent, the random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.
  b. Two random access responses are sent, one associated with each preamble, and at least one of which is a success RAR. Each random access response includes: (1) a first Timing Advance Command for the first TRP or the first TRP-panel or the first beam or the first UE panel; (2) a second Differential Timing Advance Command for the second TRP or the second TRP-panel or the second beam or the second UE panel.

c. Two random access responses are sent, one associated with each preamble. Each random access response includes a Timing Advance Command for the corresponding random access procedure.

When a random access response includes two Timing Advance Commands, the random access response can be as illustrated in FIG. 29.

In one example 2.3.1, the first Timing Advance Command (TAC1) has $N_1$ bits and the second differential Timing Advance Command (DTAC2) has $N_2$ bits. In one example $N_1=N_2$. In one example $N_1>N_2$. In a variant example, if DTAC2 is set to a pre-defined value, this value indicates that the corresponding TAC doesn't include a valid Timing Advance Command.

In one example 2.3.2, the first Timing Advance Command (TAC1) and the second time differential advance command (DTAC2) have 12 bits total as illustrated in FIG. 29. For example, TAC1 is 6 bits and TAC2 is 6 bits. In another example, TAC1 is 8 bits and DTAC2 is 4 bits. In another example, TAC1 is 9 bits and DTAC2 is 3 bits. In a variant example, if DTAC2 is set to a pre-defined value, this value indicates that the corresponding TAC doesn't include a valid Timing Advance Command. In a variant example, "R" is a flag, wherein if R=0, RAR includes TAC1 and DTAC2, if R=1, RAR includes one TAC only with 12 bits. In a variant example, "R" is a flag, wherein if R=1, RAR includes TAC1 and DTAC2, if R=0, RAR includes one TAC only with 12 bits.

In examples 2.1, 2.2, 2.3, one of the random access procedure can be a Type 1 random access procedure and other can be a type 2 random access procedure, or both can be a type 1 random access procedure or both can be a type 2 random access procedure. Possible examples are shown in TABLE 2.

TABLE 2

| First random access procedure | Second random access procedure | Outcome of first random access procedure | Outcome of second random access procedure | Transmitted RAR |
|---|---|---|---|---|
| Type 1 | Type 1 | Preamble received | Preamble received | One RAR with TAC1 + DTAC2 |
| Type 1 | Type 1 | Preamble received | Preamble received | RAR1 with TAC1 + DTAC2 RAR2 with 2 TACs |
| Type 2 | Type 2 | MSGA PRACH received MSGA PUSCH not decoded | MSGA PRACH received MSGA PUSCH not decoded | One Fallback RAR with TAC1 + DTAC2 |
| Type 2 | Type 2 | MSGA PRACH received MSGA PUSCH not decoded | MSGA PRACH received MSGA PUSCH not decoded | Fallback RAR1 with TAC1 + DTAC2 Fallback RAR2 with TAC1 + DTAC2 |
| Type 2 | Type 2 | MSGA PRACH received MSGA PUSCH decoded | MSGA PRACH received MSGA PUSCH decoded | One Success RAR with TAC1 + DTAC2 |
| Type 2 | Type 2 | MSGA PRACH received MSGA PUSCH decoded | MSGA PRACH received MSGA PUSCH decoded | Success RAR1 with TAC1 + DTAC2 Success RAR2 with TAC1 + DTAC2 |
| Type 2 | Type 2 | MSGA PRACH received MSGA PUSCH not decoded | MSGA PRACH received MSGA PUSCH decoded | One Success RAR with TAC1 + DTAC2 |
| Type 2 | Type 2 | MSGA PRACH received MSGA PUSCH not decoded | MSGA PRACH received MSGA PUSCH decoded | Fallback RAR1 with TAC1 + DTAC2 Success RAR2 with TAC1 + DTAC2 |
| Type 1 | Type 2 | Preamble received | MSGA PRACH received MSGA PUSCH not decoded | Fallback RAR (or RAR) with TAC1 + DTAC2 |
| Type 1 | Type 2 | Preamble received | MSGA PRACH received MSGA PUSCH not decoded | RAR1 with 2 TACs Fallback RAR2 with TAC1 + DTAC2 |
| Type 1 | Type 2 | Preamble received | MSGA PRACH received MSGA PUSCH decoded | One Success RAR with TAC1 + DTAC2 |

TABLE 2-continued

| First random access procedure | Second random access procedure | Outcome of first random access procedure | Outcome of second random access procedure | Transmitted RAR |
|---|---|---|---|---|
| Type 1 | Type 2 | Preamble received | MSGA PRACH received MSGA PUSCH decoded | RAR1 with 2 TACs Success RAR2 with TAC1 + DTAC2 |

In one example 2.4, the first TA and the second differential TA are included in the Timing Advance Command MAC CE. When a Timing Advance Command MAC CE includes two Timing Advance Commands, the Timing Advance Command MAC CE can be as illustrated in FIG. 30.

In one example 2.4.2, the first Timing Advance Command (TAC1) has $N_1$ bits and the second differential Timing Advance Command (DTAC2) has $N_2$ bits. In one example $N_1=N_2$. In one example $N_1>N_2$. In a variant example, if DTAC2 is set to a pre-defined value, this value indicates that the corresponding TAC doesn't include a valid Timing Advance Command.

Figure 30:
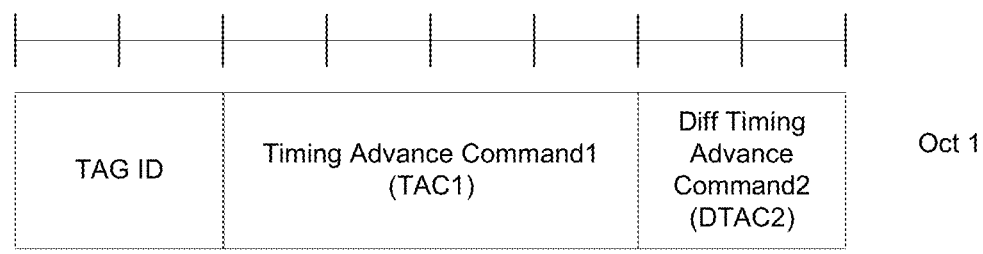
FIG. 30 illustrates an example an example Timing Advance Command MAC CE that includes a Timing Advance Command and a differential Timing Advance Command that have 6 bits total according to embodiments of the present disclosure.

In one example 2.4.2, the first Timing Advance Command (TAC1) and the second differential Timing Advance Command (DTAC2) have 6 bits total as illustrated in FIG. 30. For example, TAC1 is 3 bits and TAC2 is 3 bits. In another example, TAC1 is 4 bits and DTAC2 is 2 bits. In a variant example, if D TAC2 is set to a pre-defined value, this value indicates that the corresponding TAC doesn't include a valid Timing Advance Command.

In one example 2.5, the first TA and the second differential TA are included in the absolute Timing Advance Command MAC CE. When an absolute Timing Advance Command MAC CE includes two Timing Advance Commands, the absolute Timing Advance Command MAC CE can be as illustrated in FIG. 31.

In one example 2.5.2, the first Timing Advance Command (TAC1) has $N_1$ bits and the second differential Timing Advance Command (DTAC2) has $N_2$ bits. In one example $N_1=N_2$. In one example $N_1>N_2$. In a variant example, if DTAC2 is set to a pre-defined value, this value indicates that the corresponding TAC doesn't include a valid Timing Advance Command.

Figure 31:
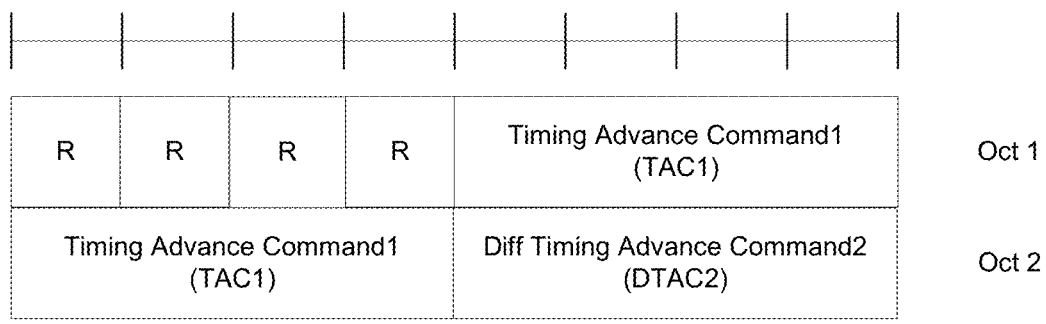
FIG. 31 illustrates an example absolute Timing Advance Command MAC CE that includes a Timing Advance Command and a differential Timing Advance Command that have 12 bits total according to embodiments of the present disclosure.

In one example 2.5.2, the first Timing Advance Command (TAC1) and the second differential Timing Advance Command (DTAC2) have 12 bits total as illustrated in FIG. 31. For example, TAC1 is 6 bits and TAC2 is 6 bits. In another example, TAC1 is 8 bits and DTAC2 is 4 bits. In another example, TAC1 is 9 bits and DTAC2 is 3 bits. In a variant example, if DTAC2 is set to a pre-defined value, this value indicates that the corresponding TAC doesn't include a valid Timing Advance Command. In a variant example one of "R" is a flag, wherein if R=0, RAR includes TAC1 and DTAC2, if R=1, RAR includes one TAC only with 12 bits. In a variant example one of "R" is a flag, wherein if R=1, RAR includes TAC1 and DTAC2, if R=0, RAR includes one TAC only with 12 bits.

In one example 3, the UE is signaled multiple TA values. A first TA value for a first TRP or a first TRP-panel or a first beam or a first UE panel, a second TA value for a second TRP or a second TRP-panel or a second beam or a second UE panel, a third TA value for a third TRP or a third TRP-panel or a third beam or a third UE panel, and so on.

In one example 3.1, the first TA, the second TA, the third TA, . . . are included in the random access response (RAR) of a Type 1 random access procedure. Example 1.1 and its sub-examples can be extended to include multiple TA values.

In one example 3.2, the first TA, the second TA, the third TA, . . . are included in the fallback random access response (RAR) of a Type 2 random access procedure. Example 1.2 and its sub-examples can be extended to include multiple TA values.

In one example 3.3, the first TA, the second TA, the third TA, . . . are included in the success random access response (RAR) of a Type 2 random access procedure. Example 1.3 and its sub-examples can be extended to include multiple TA values.

In one example 3.4, the first TA, the second TA, the third TA, . . . are included in the timing advance MAC CE command. Example 1.4 and its sub-examples can be extended to include multiple TA values.

In one example 3.5, the first TA, the second TA, the third TA, . . . are included in the absolute timing advance MAC CE command. Example 1.5 and its sub-examples can be extended to include multiple TA values.

In one example 4, the UE is signaled multiple TA values. A first TA value for a first TRP or a first TRP-panel or a first beam or a first UE panel, a second differential TA value for a second TRP or a second TRP-panel or a second beam or a second UE panel. The second TA value=The first TA value+the second differential TA value, a third differential TA value for a third TRP or a third TRP-panel or a third beam or a third UE panel. The third TA value=The first TA value+the third differential TA value, and so on.

In one example 4.1, the first TA, the second differential TA, the third differential TA, . . . are included in the random access response (RAR) of a Type 1 random access procedure. Example 2.1 and its sub-examples can be extended to include multiple TA values.

In one example 4.2, the first TA, the second differential TA, the third differential TA, . . . are included in the fallback random access response (RAR) of a Type 2 random access procedure. Example 2.2 and its sub-examples can be extended to include multiple TA values.

In one example 4.3, the first TA, the second differential TA, the third differential TA, . . . are included in the success random access response (RAR) of a Type 2 random access procedure. Example 2.3 and its sub-examples can be extended to include multiple TA values.

In one example 4.4, the first TA, the second differential TA, the third differential TA, . . . are included in the timing advance MAC CE command. Example 2.4 and its sub-examples can be extended to include multiple TA values.

In one example 4.5, the first TA, the second differential TA, the third differential TA, . . . are included in the absolute timing advance MAC CE command. Example 2.5 and its sub-examples can be extended to include multiple TA values.

In some embodiments the UE may autonomously update (or determine) TAs for different beams based on another beam's TA. In one embodiment, the UE is signaled a TA for a first beam (or for a beam associated with a first TRP). The UE determines the difference in downlink propagation delay between the first beam (or the beam associated with the first TRP) and a second beam (or the beam associated with a second TRP) as previously described. The UE advances the timing of the second beam (or the beam associated with the second TRP) relative to the uplink timing of the first beam (or the beam associated with the first TRP) by the determined difference in downlink propagation delay as described in this component.

In one example 5.1, the two TRPs are time aligned as illustrated in FIG. 8 or FIG. 8A. The propagation path delay difference is the same in the downlink and uplink directions. When transmitting to TRP B, the UE delays its uplink transmission by $T_{PropA}-T_{PropB}$ relative to the time it would have used when communicating with TRP A. This is to ensure that the uplink transmission is synchronized to TRP B's reference time. A positive value of $T_{PropA}-T_{PropB}$ indicates a delay of uplink transmissions to TRP B compared to that of TRP A. A negative value of $T_{PropA}-T_{PropB}$ indicates an advance of uplink transmissions to TRP B compared to that of TRP A. Alternatively, the UE advances its uplink transmission by $T_{PropB}-T_{PropA}$ relative to the time it would have used when communicating with TRP A.

In one example 5.1.1, the UE is signaled $T_A$ and determines $N_{TA}$ for TRP A (e.g., $N_{TA-A}$). $T_A$ is signaled as discussed herein above. That is, $T_A$ can be signaled by a random access response (RAR) for a Type 1 random access procedure, or by MsgB for a Type-2 random access procedure, by an absolute timing advance MAC CE command (where $N_{TA-A}$ is calculated according to equation (1)), or by a timing advance MAC CE command that signals a change in $N_{TA-A}$ from $N_{TA-A,old}$ to $N_{TA-A,new}$ (where $N_{TA-A,new}$ is calculated according to equation (2)).

Figure 32:
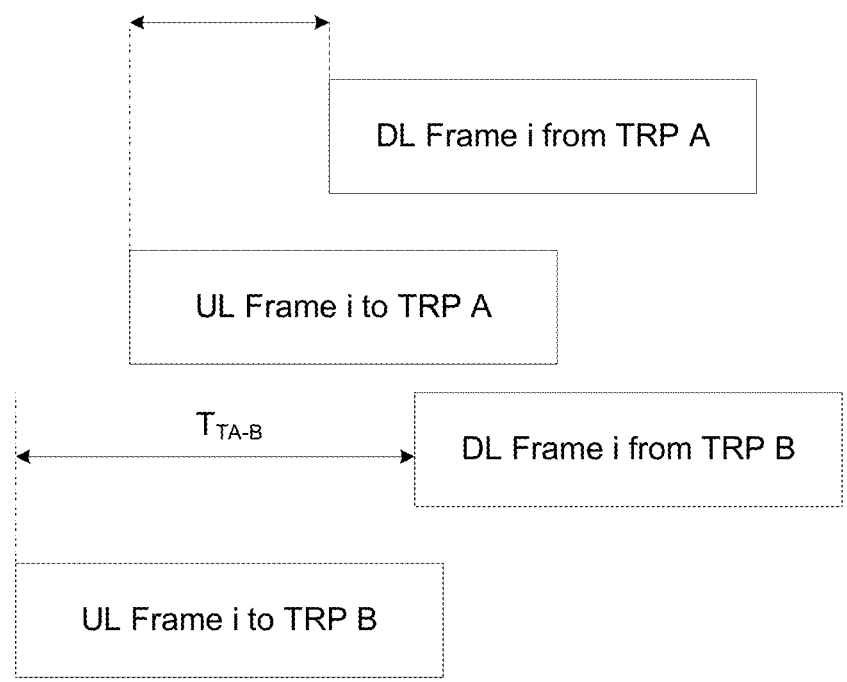
FIG. 32 illustrates an example of DL and UL timings at a UE for two TRPs according to embodiments of the present disclosure.

The UE calculates $T_{TA-A}$ as:

$$T_{TA-A} = (N_{TA-A} + N_{TA,offset}) \cdot T_c \quad (11)$$

where $T_{TA-A}$ is timing advance of the uplink transmission to TRP A relative to the DL reception from TRP A as illustrated in FIG. 32. The UE can calculate $T_{TA-B}$, which in this example is the timing advance of the uplink transmission to TRP B relative to the DL reception from TRP B as illustrated in FIG. 32, as:

$$T_{TA-B} = T_{TA-A} + 2 \cdot (T_{PropB} - T_{PropA}) \quad (12)$$

Figure 33:
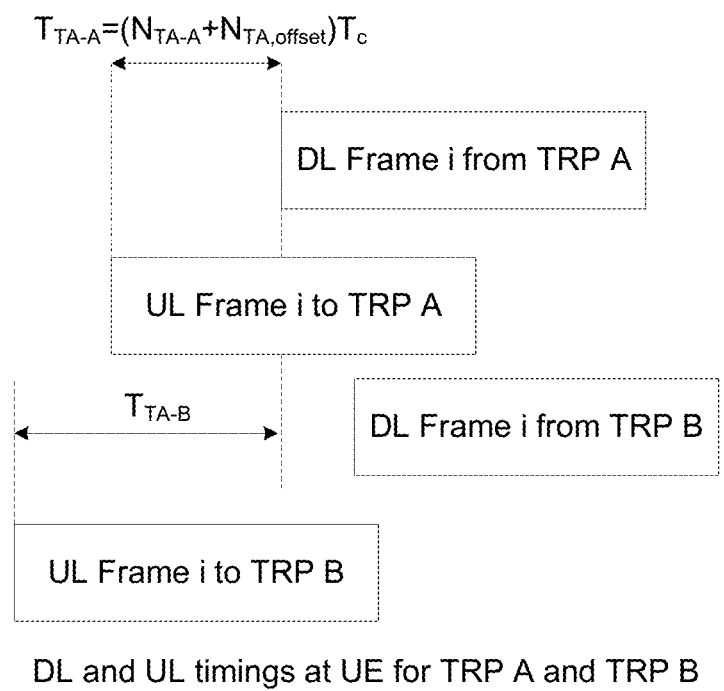
FIG. 33 illustrates another example of DL and UL timings at a UE for two TRPs according to embodiments of the present disclosure.

Alternatively, in one example 5.1.2, the UE can calculate $T_{TA-B}$, which in this example is the timing advance of the uplink transmission to TRP B relative to the DL reception from TRP A as illustrated in FIG. 33, as:

$$T_{TA-B} = T_{TA-A} + (T_{PropB} - T_{PropA}) \quad (13)$$

Figure 34:
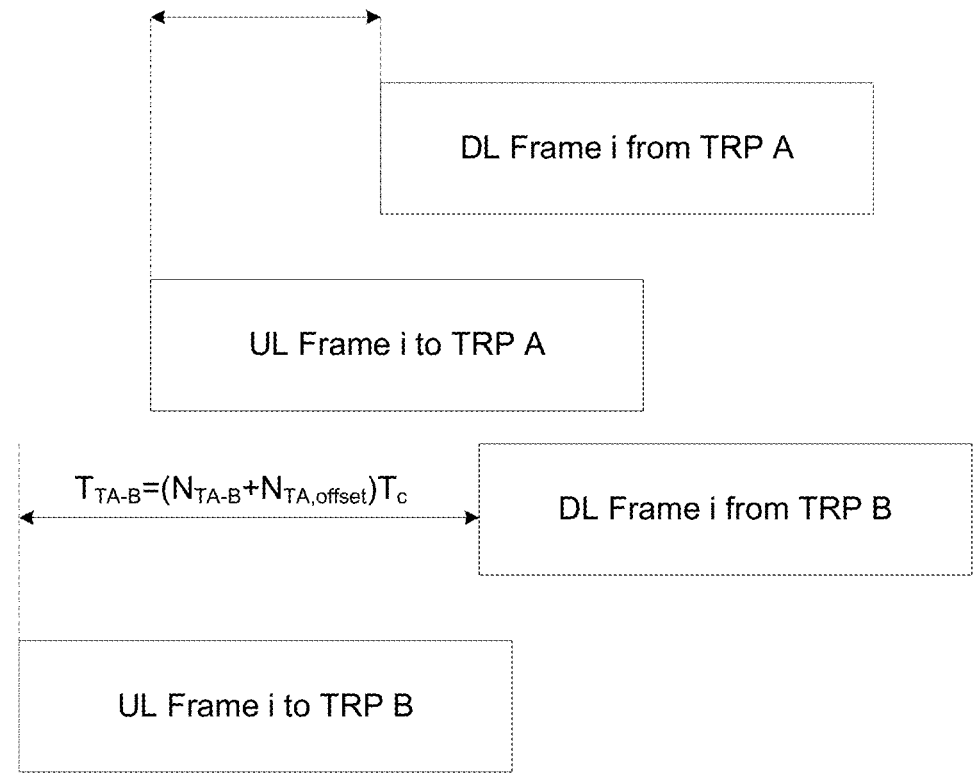
FIG. 34 illustrates another example of DL and UL timings at a UE for two TRPs according to embodiments of the present disclosure.

In one example 5.1.3, the UE is signaled $T_A$ and determines $N_{TA}$ for TRP A (e.g., $N_{TA-A}$) as above, according to equations (1) or (2). The UE then calculates $N_{TA-B}$ as:

$$N_{TA-B} = N_{TA-A} + 2 \cdot \frac{(T_{PropB} - T_{PropA})}{T_c} \quad (14)$$

or, alternatively, as:

$$N_{TA-B} = N_{TA-A} + f\left(2 \cdot \frac{(T_{PropB} - T_{PropA})}{T_c \cdot \left(16 \cdot \frac{64}{2^\mu}\right)}\right) \cdot \left(16 \cdot \frac{64}{2^\mu}\right) \quad (15)$$

where the function $f(x)$ is a rounding function to the nearest integer or a ceiling function or a floor function. The rationale for equation (15) is that $T_A$ is signaled in increments of $16 \cdot 64/2^\mu$ of $T_c$. The UE calculates $T_{TA-A}$ as above, according to equation (11). The UE calculates $T_{TA-B}$ as:

$$T_{TA-B} = (N_{TA-B} + N_{TA,offset}) \cdot T_c \quad (16)$$

where $T_{TA-B}$ is timing advance of the uplink transmission to TRP B relative to the DL reception from TRP B as illustrated in FIG. 34.

In one example 5.2, the two TRPs are not time aligned, as illustrated in FIG. 15. The difference in reference time between the two TRPs is $\Delta_{RefAB}=T_{RefA}-T_{RefB}$, where $T_{RefA}$ is the reference time of TRP A and $T_{RefB}$ is the reference time of TRP B. The propagation path delay difference is the same in the downlink and uplink directions. When transmitting to TRP B, the UE, relative to the time it would have used when communicating with TRP A, delays its uplink transmission by $T_{PropA}-T_{PropB}$ or advances its uplink transmission by $T_{PropB}-T_{PropA}$ to compensate for the propagation delay differences, and additionally advances its uplink transmission time by $\Delta_{RefAB}$ to compensate for difference in reference time between TRP A and TRP B. In aggregate, the UE delays its uplink transmission time by $T_{PropA}-T_{PropB}-\Delta_{RefAB}$ when transmitting to TRP B relative to the time it would have used to transmit to TRP A to ensure that the uplink transmission is synchronized to TRP B's reference receive time. A positive value of $T_{PropA}-T_{PropB}-\Delta_{RefAB}$ indicates a delay of uplink transmissions to TRP B compared to that of TRP A. A negative value of $T_{PropA}-T_{PropB}-\Delta_{RefAB}$ indicates an advance of uplink transmissions to TRP B compared to that of TRP A. Alternatively, the UE advances its uplink transmission time by $T_{PropB}-TpropA+\Delta_{RefAB}$ when transmitting to TRP B relative to the time it would have used to transmit to TRP A. The difference in time between the reference time of TRP A and that of TRP B (i.e., $\Delta_{RefAB}$) can be configured or updated by higher layer RRC signaling or MAC CE signaling or L1 control signaling.

In one example 5.2.1, the UE is signaled $T_A$ and determines $N_{TA}$ for TRP A (e.g., $N_{TA-A}$) according to equations (1) or (2). The UE then calculates $T_{TA-A}$ according to equation (11). In this example, the UE can then calculate $T_{TA-B}$ according to equation (12).

where $T_{TA-B}$ is the timing advance of the uplink transmission to TRP B relative to the DL reception from TRP B as illustrated in FIG. 32.

Alternatively, in one example 5.2.2, the UE can calculate $T_{TA-B}$, which in this example is the timing advance of the uplink transmission to TRP B relative to the DL reception from TRP A as illustrated in FIG. 33, as:

$$T_{TA-B} = T_{TA-A} + (T_{PropB} - T_{PropA}) + \Delta_{RefAB} \quad (17)$$

In one example 5.2.3, the UE is signaled $T_A$ and determines $N_{TA}$ for TRP A (e.g., $N_{TA-A}$) according to equations (1) or (2). The UE then calculates $N_{TA-B}$ according to equation (14) or (15). The UE calculates $T_{TA-A}$ according to equation (11). In this example, the UE can then calculate $T_{TA-B}$ according to equation (16).

Figure 35:
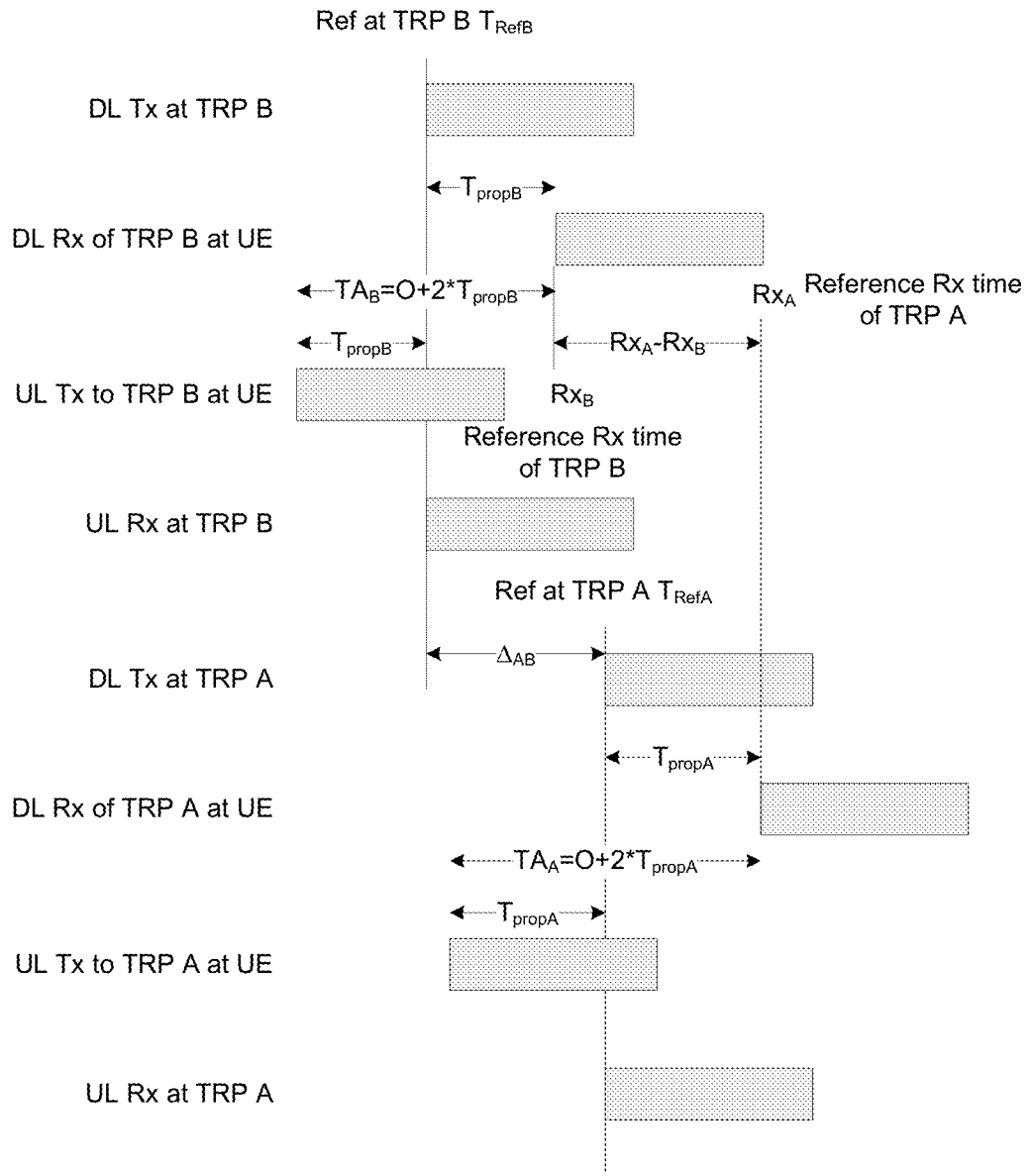
FIG. 35 illustrates an example of DL and UL timings at a UE and at two TRPs according to embodiments of the present disclosure.

In one example 5.2a, the two TRPs are not time aligned as illustrated in FIG. 15 and FIG. 35. The difference in reference time between the two TRPs is $\Delta_{RefAB}=T_{RefA}-T_{RefB}$, where $T_{RefA}$ is the reference time of TRP A and $T_{RefB}$ is the reference time of TRP B. The propagation path delay difference is the same in the downlink and uplink directions.

In this example, the UE is signaled $TA_A$ for TRP A and $TA_B$ for TRP B as aforementioned. The $T_A$ adjustment is twice the one-way propagation delay—assuming that the one-way propagation delay is the same in the DL and UL directions—plus an additional offset O to account for the difference in Tx and Rx reference time at the TRP. Therefore, $$TA_A = O + 2 \times T_{propA} \text{ and} \quad (18)$$

$$TA_B = O + 2 \times T_{propB}$$

as can be seen from equation (11), $T_{TA-A}=(N_{TA-A}+N_{TA,offset})\cdot T_c$, where $O=N_{TA,offset}\cdot T_c$ and $2\times T_{propA}=N_{TA-A}\cdot T_c$, and equation (16), $T_{TA-B}=(N_{TA-B}+N_{TA,offset})\cdot T_c$, where $O=N_{TA,offset}\cdot T_c$ and $2\times T_{propB}=N_{TA-B}\cdot T_c$.

The UE measures the difference in arrival time between a DL reference signal transmitted from TRP A and a DL reference signal transmitted from TRP B when assumed to be transmitted in the same slot and symbol. The arrival time difference is $Rx_B-Rx_A$ or $Rx_A-Rx_B$. The reference signals can be transmitted in different symbols or slots, but the receive time difference is measured and calculated assuming the same symbol and slot. As illustrated in FIG. 35, there is a difference in reference time between TRP A and TRP B. This difference is $\Delta_{RefAB}$. It can be seen that:

$$Rx_A - Rx_B = T_{RefA} + T_{propA} - (T_{RefB} + T_{propB}) \quad (20)$$

$$= (T_{RefA} - T_{RefB}) + (T_{propA} - T_{propB})$$

$$= \Delta_{RefAB} + (T_{propA} - T_{propB})$$

$$= \Delta_{RefAB} + \frac{(TA_A - TA_B)}{2}$$

$$\Delta_{RefAB} = (Rx_A - Rx_B) - \frac{(TA_A - TA_B)}{2}$$

Alternatively, if $\Delta_{RefBA}=T_{RefB}-T_{RefA}$, it can be shown that:

$$\Delta_{RefAB} = (Rx_B - Rx_A) - \frac{(TA_B - TA_A)}{2} \quad (21)$$

Therefore, when the UE is provided a $T_A$ value for each TRP, it can determine the misalignment in reference time between the two TRPs (i.e., $\Delta_{RefAB}$ or $\Delta_{RefBA}$) using the two TA values and the measured time of arrival difference between two reference signals assumed to be in the same symbol as aforementioned.

When the UE is signaled one TA value (e.g., TA for TRP A), it can determine the time of transmission to TRP A, e.g., when the UE's downlink reference time is determined from the reference signal of TRP A, the UL time to TRP A is advanced by the TA for TRP A (e.g., $TA_A$). The UE determines the time of transmission to TRP B relative to the time of transmission to TRP A by delaying its uplink transmission by $T_{PropA}-T_{PropB}$ or advancing its uplink transmission by $T_{PropB}-T_{PropA}$ to compensate for the propagation delay differences (where $T_{PropA}-T_{PropB}$ is the measured differential propagation delay), and additionally advancing its uplink transmission time by $\Delta_{RefAB}$ to compensate for the difference in reference time between TRP A and TRP B (where $\Delta_{RefAB}$ is calculated as aforementioned). In aggregate, the UE delays its uplink transmission time by $T_{PropA}-T_{PropB}-\Delta_{RefAB}$ when transmitting to TRP B relative to the time it would have used to transmit to TRP A to ensure that the uplink transmission is synchronized to TRP B's reference receive time. A positive value of $T_{PropA}-T_{PropB}-\Delta_{RefAB}$ indicates a delay of uplink transmissions to TRP B compared to that of TRP A. A negative value of $T_{PropA}-T_{PropB}-\Delta_{RefAB}$ indicates an advance of uplink transmissions to TRP B compared to that of TRP A. Alternatively, the UE advances its uplink transmission time by $T_{PropB}-T_{PropA}+\Delta_{RefAB}$ when transmitting to TRP B relative to the time it would have used to transmit to TRP A.

Alternatively, when the UE is signaled one TA value, e.g., $TA_A$, The UE calculates $TA_B$ as:

$$TA_B = 2\Delta_{RefAB} - 2(Rx_A - Rx_B) + TA_A \quad (22)$$

where $(Rx_A-Rx_B)$ is measured based on a received signal from TRP A and a received signal from TRP B, wherein $Rx_A$ is the receive time or time of arrival from TRP A and $Rx_B$ is the receive time or time of arrival from TRP B. $\Delta_{RefAB}$ is then calculated according to equation (20) the same as if the UE received two $T_A$ values, one for TRP A (e.g., $TA_A$) and the second for TRP B (e.g., $TA_B$). The UE can determine a reference time for TRP A reception based on a reference signal received from TRP A and advance its transmit time relative to this reference by the signaled $TA_A$, and can determine a reference time for TRP B reception based on a reference signal received from TRP B and advance its transmit time relative to this reference by the determined $TA_B$.

Figure 36:
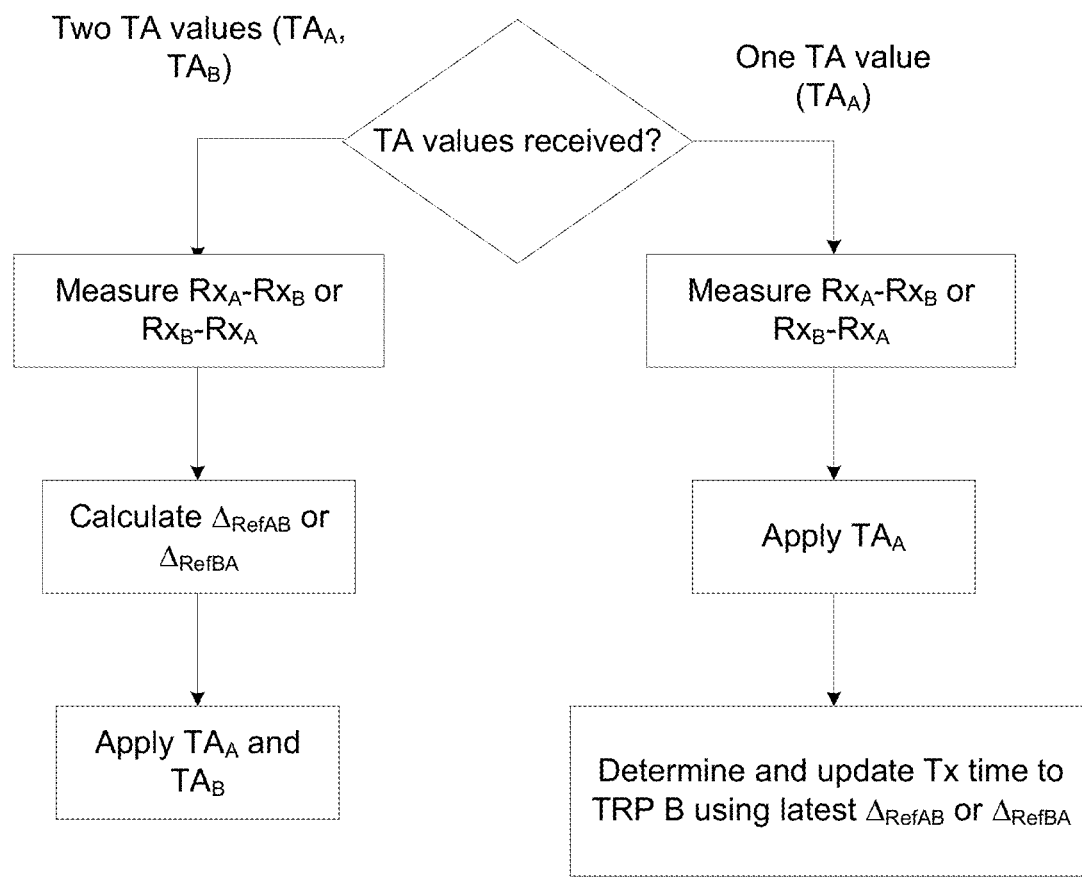
FIG. 36 illustrates an example process performed by a UE for using one or two signaled TA values to update its UL transmission time to two TRPs according to embodiments of the present disclosure.

As illustrated in FIG. 36, when a UE is signaled a TA for TRP A (e.g., $TA_A$) and a TA for TRP B (e.g., $TA_B$), the UE measures $Rx_A-Rx_B$ or $Rx_B-Rx_A$, and can update the difference in reference time between TRP A and TRP B, $\Delta_{RefAB}$ (or $\Delta_{RefBA}$), as aforementioned and subsequently use the updated $\Delta_{RefAB}$ (or $\Delta_{RefBA}$) value. The UE updates the uplink transmission times to TRP A and TRP B based on the signaled $TA_A$ and $TA_B$ values respectively.

Alternatively, when a UE is only signaled a $T_A$ for a first TRP (e.g., TRP A or TRP B), the UE measures $Rx_A-Rx_B$ or $Rx_B-Rx_A$, and then updates the uplink transmission time to the first TRP (e.g., TRP A or TRP B) based on the signaled $T_A$ value and determines and updates the transmission time to the other TRP (e.g., TRP B or TRP A) as follows. The UE determines the uplink transmission time of the first TRP (e.g., TRP A or TRP B) based on the received TA value and the downlink reference time for the first TRP. The UE further determines the uplink transmission time of the other TRP (e.g., TRP B or TRP A) as aforementioned relative to the first TRP (e.g., TRP A or TRP B). The UE calculates the TA for the other TRP (e.g., TRP B or TRP A) as aforementioned. The UE determines a reference receive time for each TRP using a reference signal transmitted from each TRP. When transmitting to a TRP, the UE advances its UL transmit time relative to the corresponding reference receive time by the corresponding TA value.

In a variant example, the UE is not signaled a TA for the first TRP (e.g., TRP A or TRP B). Instead, it measures $Rx_A-Rx_B$ or $Rx_B-Rx_A$ and determines that the uplink transmission time to the other TRP (e.g., TRP B or TRP A) changes using the aforementioned methods—and in one example, the change exceeds a threshold which can be specified in system specification or configured/updated by RRC or MAC CE or L1 control signaling. The UE updates the transmission time of the other TRP (e.g., TRP B or TRP A) using the latest TA received for the first TRP (e.g., TRP A or TRP B).

In one example 5.3, the network can indicate to the UE whether it can autonomously adjust the TA for a second beam based on the TA received for a first beam and a measured "DL delta propagation delay" between a RS associated with the first beam and a RS associated with the second beam as described earlier in this disclosure. This indication (to autonomously adjust the team), can be configured/updated by RRC configuration or MAC CE signaling or L1 control (DCI) signaling.

In one example 5.3.1, the network can configure/indicate to the UE which entities the second beam should belong to so that TA for the second beam can be autonomously adjusted based on the TA received for a first beam and measured "DL delta propagation delay" between a RS associated with the first beam and a RS associated with the second beam as described earlier in this disclosure. The list of entities can be for one of: TRP index, PCI, CORESET-POOL index, SSB index, TA group (TAG), or second TA in TA group (TAG). The list of entities for which autonomous TA update is allowed can be configured/updated by RRC configuration or MAC CE signaling or L1 control (DCI) signaling.

In one example 5.4, the network can indicate to the UE a TA threshold Y. The TA threshold can be in units of $T_s$ or $T_c$ or $16 T_s$ or $16 T_s 2^{-\mu}$, etc. When the UE measures a "DL delta propagation delay" between a RS associated with a first beam (or TCI state), and a RS associated with a second beam (or TCI state) that is greater than (or greater than or equal to) Y. The UE may autonomously adjust the TA of the second beam based on the TA received for the first beam and measured "DL delta propagation delay" between the first beam and the second beam as described earlier in this disclosure. When the UE measures a "DL delta propagation delay" between the RS associated with a first beam (or TCI state), and a RS associated with a second beam (or TCI state) that is less than or equal to (or less than) Y. The UE may not autonomously adjust the TA of the second beam. This threshold Y can be configured/updated by RRC configuration or MAC CE signaling or L1 control (DCI) signaling.

In one example 5.5, when more than one TA is active, e.g., TAs that correspond to active TCI states, or TAs that correspond to entities associated with beams the UE can use, the delay between the earliest TA value (or TA offset) and the latest TA value (or TA offset) is limited to be less than (or less than or equal to) Z, as represented by:

$$\max(TA\ \text{offset}) < Z \text{ or } \max(TA\ \text{offset}) \le Z$$

$$\text{abs}(\min(TA\ \text{offset}) < Z) \text{ or abs } (\min(TA\ \text{offset}) \le Z)$$

$$\max(TA\ \text{offset}) - \min(TA\ \text{offset}) <$$
$$Z \text{ or } \max(TA\ \text{offset}) - \min(TA\ \text{offset}) \le Z$$

$$\max(TA\ \text{value}) - \min(TA\ \text{value}) <$$
$$Z \text{ or } \max(TA\ \text{value}) - \min(TA\ \text{value}) \le Z$$

Z can be configured/updated by RRC configuration or MAC CE signaling or L1 control (DCI) signaling.

In one example 5.6, when the UE is transmitting on a first beam with a TA of TA1, and the UE switches to a second beam with a TA of TA2, the change is $T_A$ is Delta_TA=TA2−TA1. In one example, the beam application time or TA switching time can depend on the value of Delta_TA or on the absolute value of Delta_TA. In one example, the beam application time and TA switching time are the same. In one example, the beam application time and the TA switching can be different. For example, the relation between the value of Delta_TA and the beam application time or TA switching time can be as described in TABLE 3.

TABLE 3

| Delta_TA = X or abs(Delta_TA) = X | Beam application time or TA switching time |
|---|---|
| X < $X_1$ or X ≤ $X_1$ | $T_1$ |
| $X_1$ ≤ X < $X_2$ or $X_1$ < X ≤ $X_2$ | $T_2$ |
| $X_2$ ≤ X < $X_3$ or $X_2$ < X ≤ $X_3$ | $T_3$ |
| ... | ... |

In one example $X_1$, $X_2$, . . . and $T_1$, $T_2$, . . . are configured/updated by RRC configuration or MAC CE signaling or L1 control (DCI) signaling.

In some embodiments, TA updates may be network-controlled. In one embodiment, a TA offset or TA value can be configured or determined for a TCI state, or an entity. When the UE transmits using a spatial transmit filter (beam) determined by or associated with the TCI state or the entity, the UE uses the corresponding TA offset or TA value. An entity can be one of: TRP index, PCI, CORESETPOOL index, SSB index, TA group (TAG), a TA value in a TAG, e.g., TAG has more than one TA value. A TA offset can be given by: TA of TCI state minus TA of reference TCI state, or TA of entity minus TA of reference entity. Where, the reference TCI state or reference entity is configured or determined by the UE. When the UE is signaled the TA value of the reference TCI state or the TA value of the reference entity and the UE determines the TA of a TCI state or the TA of an entity, by adding the TA of the reference TCI state to the TA offset of the TCI state, or by adding the TA of the reference entity to the TA offset of the entity. If a TA value is associated with the TCI state or a TA value is associated with an entity, the TA value may be used directly for the TCI state or for the entity.

In this embodiment, the UE can be signaled multiple TA values (e.g., two TA values). In one example, the multiple (e.g., two) TA values are in one Timing Advance Group (TAG). The first TA value in the TAG is associated with a first entity. The second TA value in the TAG is associated with a second entity. An entity can be: TRP index, PCI, CORESETPOOL index, SSB index. In one example, the association of a first value to an entity and a second value to another entity can be RRC configuration. In one example, the multiple (e.g., two) TA values are each in a separate Timing Advance Group (TAG). The first TAG is associated with a first entity. The second TAG is associated with a second entity. As above, an entity can be: TRP index, PCI, CORESETPOOL index, SSB index. In one example, the association of a first TAG to an entity and a second TAG to another entity can be RRC configuration.

Alternatively, the UE can be signaled a single TA value (e.g., for a first TRP). The UE measures the downlink differential propagation delay to a second TRP, and the UE determines the corresponding TA value of the second TRP.

In one example 6.1, a network configures a list (or array) of time alignment offsets (TA offsets). A TCI state is linked or associated to an element of the List or array of time alignment offset (TA offset) or TA value. The list of TA offsets can correspond to different TAs in the same TAG. Or it can correspond to multiple TAGs each with one TA value, or it can correspond to one signaled TA value and one or more calculated TA values based on DL propagation delay measurements.

In another example 6.1.1, the network configures a list or array of UL parameters, e.g. PO or alpha or CL index or TA offset as illustrated in TABLE 4.

TABLE 4

| TA_ID | TA Offset or TA value or TAG ID |
|---|---|
| TA_ID0 | TA Offset0 or TA value0 or TAG ID0 |
| TA_ID1 | TA Offset1 or TA value1 or TAG ID1 |
| ... | ... |

In one example 6.1.2, TABLE 4, as applicable, can be common to all uplink channels and signals (e.g. PUSCH, PUCCH and SRS).

In one example 6.2, the network configures a TA_ID or TAG ID, as described in TABLE 4, in the TCI state or QCL info.

Figure 37:
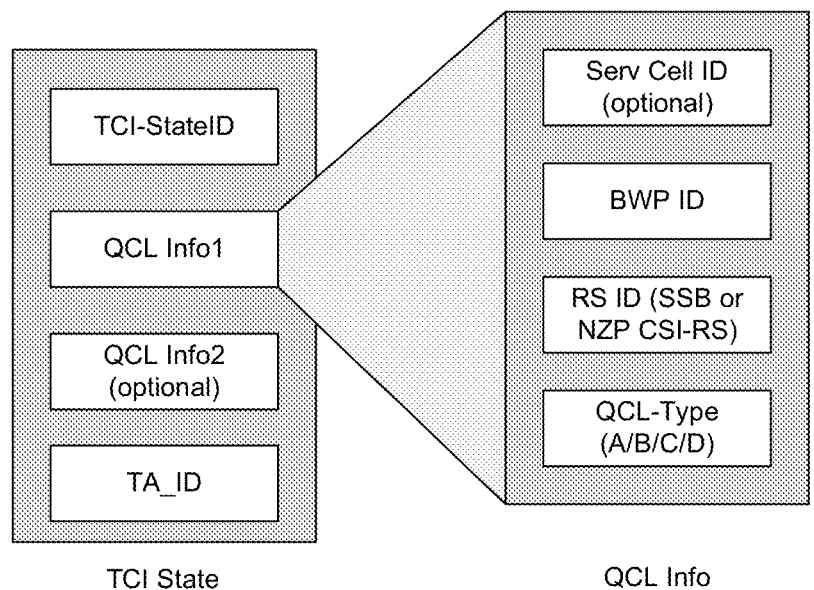
FIG. 37 illustrates an example of a TA_ID or TAG ID included in a TCI state according to embodiments of the present disclosure.

In one example 6.2.1, the TA_ID or TAG ID is included in the TCI state as indicated in FIG. 37.

Figure 38:
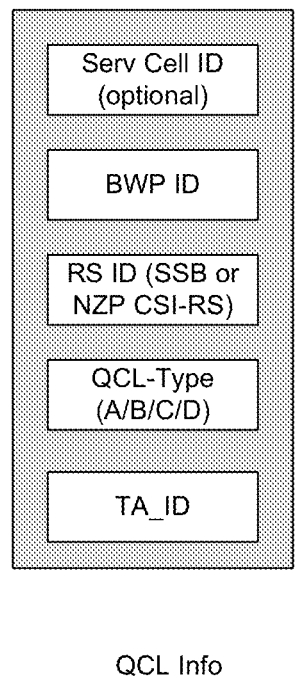
FIG. 38 illustrates an example of a TA_ID or TAG ID included in QCL info according to embodiments of the present disclosure.

In another example 6.2.2, the TA_ID or TAG ID is included in the QCL info as indicated in FIG. 38. In further example, the TA_ID or TAG ID is included in QCL info of QCL TypeD or QCL with a spatial relationship RS.

In one example 6.3, the network configures a TA_ID or TAG ID, as described in TABLE 4, by MAC CE signaling associated with the activated TCI states.

Figure 39:
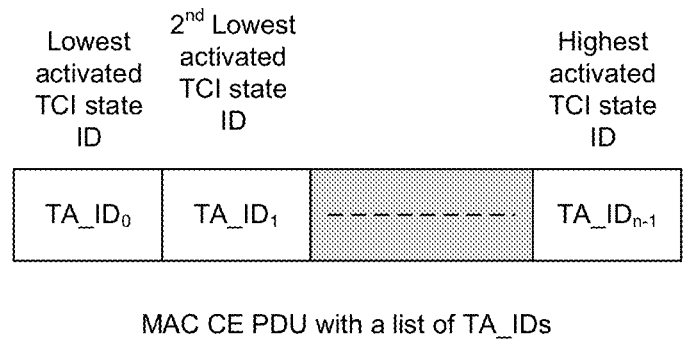
FIG. 39 illustrates an example of a list of TA_IDs or TAG IDs included in a MAC CE according to embodiments of the present disclosure.

In one example 6.3.1, a list of TA_IDs or TAG IDs is included in the MAC CE, wherein a first TA_ID or TAG ID is associated with a first TCI state ID (e.g. lowest activated TCI State ID), a next second TA_ID or TAG ID is associated with a second TCI state ID (e.g. a second lowest activated TCI State ID). This is illustrated in FIG. 39. In a variant example 6.3.1.1, the list of TA_IDs or TAG IDs is included in a DCI Format.

Figure 40:
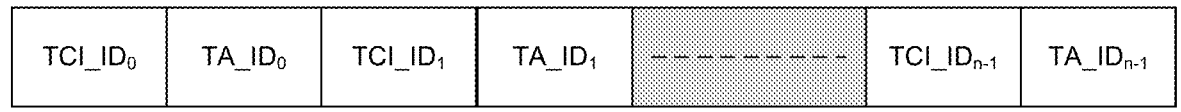
FIG. 40 illustrates an example of a list of TA_IDs or TAG IDs and activated TCI state IDs included in a MAC CE according to embodiments of the present disclosure.

In one example 6.3.2, a list of TA_IDs or TAG IDs and activated TCI state IDs is included in the MAC CE. This is illustrated in FIG. 40. In a variant example 6.3.2.1, the list of TA_IDs or TAG IDs and TCI state IDs is included in a DCI Format.

In another example 6.4, the network configures the association between a TA_ID, wherein TA_ID is as described in TABLE 4, and the activated TCI states by RRC signaling. This is described in TABLE 5.

TABLE 5

| Activated TCI state (codepoint) | TA_ID or TAG ID |
|---|---|
| 0 | TA_ID0 or TAG ID0 |
| 1 | TA_ID1 or TAG ID1 |
| ... | ... |

In one example 6.4.1, TABLE 4 and TABLE 5, as applicable, can be common to all uplink channels and signals (e.g. PUSCH, PUCCH and SRS) and hence a common ID(s) are determined for each active TCI state.

In another example 6.5, the network configures the association between a TA_ID, wherein TA_ID is as described in TABLE 4, and the configured TCI states by RRC signaling. This is described in TABLE 6.

TABLE 6

| Configured TCI State | TA_ID |
|---|---|
| 0 | TA_ID0 |
| 1 | TA_ID1 |
| ... | ... |

In one example 6.5.1, TABLE 4 and TABLE 6, as applicable, can be common to all uplink channels and signals (e.g. PUSCH, PUCCH, and SRS) and hence a common ID is determined for each configured TCI state.

In one example 6.6, the indication of a TCI state to the UE is an indication of the TA offset or TA value included in or associated with the TCI state. The indication of the TCI state can be by a DCI Format that includes a beam indication—e.g., DL related DCI format (DCI Format 1_0 or DCI Format 1_1 or DCI Format 1_2 with or without a DL assignment), UL related DCI format (DCI Format 0_0 or DCI Format 0_1 or DCI Format 0_2 with or without a UL grant), or a purpose designed DCI Format for beam indication—or by a MAC CE that includes a beam indication. The UE applies the TA in response to the TCI state indication.

In one example 6.6.1, the beam application time of the source RS of the UL or DL spatial filter and the application time of the TA are the same. Wherein the application time can be measured from one of the channel (DCI Format or MAC CE) containing the TCI state indication, or the acknowledgment (HARQ-ACK) to the channel (DCI Format or MAC CE) containing the TCI state indication. In a further example, the application time can be configured or updated by RRC signaling or MAC CE signaling or L1 control signaling. The application time can further depend on a UE capability. The application time can further depend on the sub-carrier spacing of the channel including the TCI states or the channels to which the TCI states are being applied or the UL BWP to which TA is being applied or the associated DL BWP (e.g., based on the smallest (or largest) sub-carrier spacing among these channels or signals or a subset of them).

In another example 6.6.2, the beam application time of the source RS of the UL or DL spatial filter and the application time of the TA are different. Wherein the application times can be measured from one of the channel (DCI Format or MAC CE) containing the TCI state indication, or the acknowledgment (HARQ-ACK) to the channel (DCI Format or MAC CE) containing the TCI state indication. In a further example, the application times can be configured or updated by RRC signaling or MAC CE signaling or L1 control signaling. The application times can further depend on a UE capability. The application times can further depend on the sub-carrier spacing of the channel including the TCI states or the channels to which the TCI states are being applied or the UL BWP to which TA is being applied or the associated DL BWP (e.g., based on the smallest (or largest) sub-carrier spacing among these channels or signals or a subset of them).

In one example 6.7, the indication of a TCI state to the UE is an indication of the TA included in or associated with the TCI state, and is applied to multiple component carriers. The indication of the TCI state can be by a DCI Format that includes a beam indication—e.g., DL related DCI format (DCI Format 1_0 or DCI Format 1_1 or DCI Format 1_2 with or without a DL assignment), UL related DCI format (DCI Format 0_0 or DCI Format 0_1 or DCI Format 0_2 with or without a UL grant), or a purpose designed DCI Format for beam indication—or by a MAC CE that includes a beam indication. The UE applies the TA in response to the TCI state indication.

In one example 6.7.1, a common source RS of the UL or DL spatial filter is determined for all component carriers.

In another example 6.7.2, a source RS of the UL or DL spatial filter is determined for each component carrier.

In another example 6.7.3, the component carriers are partitioned into subsets and a source RS of the UL or DL spatial filter is determined for each subset.

In one example 6.7.4, a common TA is determined for all component carriers.

In another example 6.7.5, a TA is determined for each component carrier.

In another example 6.7.6, the component carriers are partitioned into subsets and a TA is determined for each subset.

In one example 6.7.7, the beam application time of the source RS of the UL or DL spatial filter and the application time of the TA are the same. In one example 6.7.7.1, the beam application time of the source RS of the UL or DL spatial filter and the application time of the TA are the same across all component carriers. In one example 6.7.7.2, the beam application time of the source RS of the UL or DL spatial filter and the application time of the TA are the same for each component carrier, but can be different for different component carriers. In one example 6.7.7.3, the beam application time of the source RS of the UL or DL spatial filter and the application time of the TA are the same across a subset of component carriers but can be different for different subsets of component carriers. The application time can be measured from one of the channel (DCI Format or MAC CE) containing the TCI state indication, or the acknowledgment (HARQ-ACK) to the channel (DCI Format or MAC CE) containing the TCI state indication.

In a further example, the application time can be configured or updated by RRC signaling or MAC CE signaling or L1 control signaling. The application time can further depend on a UE capability. The application time can further depend on the sub-carrier spacing of the channel including the TCI states or the channels to which the TCI states are being applied or the UL BWP to which TA is being applied or the associated DL BWP (e.g., based on the smallest (or largest) sub-carrier spacing among these channels or signals or a subset of them).

In a further example, when the application time is the same across all component carriers or across a subset of component carriers, the application time is the maximum time across all component carriers or across a subset of component carriers respectively. For example, the application time can be determined for each component carrier (e.g. based on sub-carrier spacing of the component carrier and other characteristics of the component carrier), the maximum application time is then determined across all component carriers or across a subset of component carriers, respectively, and is used as a common time for beam application and TA application across all the component carriers or across a subset of the component carriers respectively.

In another example 6.7.8, the beam application time of the source RS of the UL or DL spatial filter and the application time of the TA are different. In one example 6.7.8.1, the beam application time of the source RS of the UL or DL spatial filter is the same across all component carriers. In one example 6.7.8.2, the beam application time of the source RS of the UL or DL spatial filter can be different for each component carrier. In one example 6.7.8.3, the beam application time of the source RS of the UL or DL spatial filter is the same across a subset of component carriers but can be different for different subsets of component carriers. In one example 6.7.8.4, the application time of the TA is the same across all component carriers. In one example 6.7.8.5, the application time of the TA can be different for each component carrier. In one example 6.7.8.6, the application time of the TA is the same across a subset of component carriers but can be different for different subsets of component carriers. The application times can be measured from one of the channel (DCI Format or MAC CE) containing the TCI state indication, or the acknowledgment (HARQ-ACK) to the channel (DCI Format or MAC CE) containing the TCI state indication.

In a further example, the application times can be configured or updated by RRC signaling or MAC CE signaling or L1 control signaling. The application times can further depend on a UE capability. The application times can further depend on the sub-carrier spacing of the channel including the TCI states or the channels to which the TCI states are being applied or the UL BWP to which TA is being applied or the associated DL BWP (e.g., based on the smallest (or largest) sub-carrier spacing among these channels or signals or a subset of them).

In a further example, when the application time is the same across all component carriers or across a subset of component carriers, the application time is the maximum time across all component carriers or across a subset of component carriers respectively. For example, the application time can be determined for each component carrier (e.g., based on sub-carrier spacing of the component carrier and other characteristics of the component carrier), the maximum application time is then determined across all component carriers or across a subset of component carriers, respectively, and is used as a common time for beam application or TA application across all the component carriers or across a subset of the component carriers respectively.

In one example 6.8, the network configures a TA_ID (where a TA_ID is as described in TABLE 4) by MAC CE signaling associated with an entity index, wherein the entity index can be: TRP index, PCI, CORESETPOOL index, SSB index, TA group (TAG), a TA value in a TAG, e.g., the TAG has more than one TA value. A TCI state is associated with the entity index. For example, a TCI state index is associated with a TRP index based on the source RS of TCI state (e.g., QCL Type D source RS or spatial relationship source RS). TRP index can be the TRP transmitting the source RS. For example, a TCI state index is associated with a PCI index based on the source RS of TCI state (e.g., QCL Type D source RS or spatial relationship source RS). TRP can be the TRP transmitting the source RS. For example, CORESET-POOL index can be included in or associated with the TCI state. For example, a TCI state index is associated with a SSB on the source RS of TCI state (e.g., QCL Type D source RS or spatial relationship source RS). SSB can be the SSB that is a direct or indirect QCL source of the source RS. For example, TAG index can be included in or associated with the TCI state. For example, the TA index in a TAG can be included in or associated with the TCI state.

Figure 41:
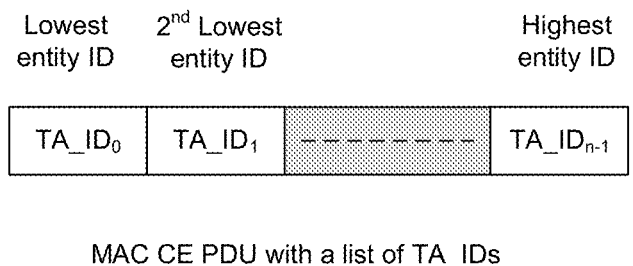
FIG. 41 illustrates an example of a list of TA_IDs or TAG IDs included in a MAC CE according to embodiments of the present disclosure.

In one example 6.8.1, a list of TA_IDs is included in the MAC CE, wherein a first TA_ID is associated with a first entity ID (e.g., the lowest entity ID), a next TA_ID is associated with a second TCI state ID (e.g., the second lowest entity ID), and so on. This is illustrated in FIG. 41.

In a variant example 6.8.1.1, the list of TA_IDs is included in a DCI Format.

Figure 42:
FIG. 42 illustrates an example of a list of TA_IDs or TAG IDs and activated TCI state IDs included in a MAC CE according to embodiments of the present disclosure.

In one example 6.8.2, a list of TA_IDs and activated TCI state IDs is included in the MAC CE. This is illustrated in FIG. 42.

In a variant example 6.8.2.1, the list of TA_IDs and TCI state IDs is included in a DCI Format.

In one example 6.9, when more than one TA is active, e.g., TAs that correspond to active TCI states, or TAs that correspond to entities associated with beams the UE can use, the delay between the earliest TA value (or TA offset) and the latest TA value (or TA offset) is limited to be less than (or less than or equal to) Z, as represented by:

$$\max(TA \text{ offset}) < Z \text{ or } \max(TA \text{ offset}) \leq Z$$

$$\text{abs}(\min(TA \text{ offset}) < Z) \text{ or abs }(\min(TA \text{ offset}) \leq Z)$$

$$\max(TA \text{ offset}) - \min(TA \text{ offset}) <$$
$$Z \text{ or } \max(TA \text{ offset}) - \min(TA \text{ offset}) \leq Z$$

$$\max(TA \text{ value}) - \min(TA \text{ value}) <$$
$$Z \text{ or } \max(TA \text{ value}) - \min(TA \text{ value}) \leq Z$$

Z can be configured/updated by RRC configuration or MAC CE signaling or L1 control (DCI) signaling.

In one example 6.10, when the UE is transmitting on a first beam with a TA of TA1, and the UE switches to a second beam with a TA of TA2, the change is TA is Delta_TA=TA2−TA1. In one example, the beam application time or TA switching time can depend on the value of Delta_TA or on the absolute value of Delta_TA. In one example, the beam application time and TA switching time are the same. In one example, the beam application time and the TA switching time can be different. For example, the relationship between the value of Delta_TA and the beam application time or TA switching time can be as illustrated in TABLE 3.

In one example 6.11, a TAG includes multiple (e.g., two) TA values. In one example 6.11.1, each TA value within a TAG is initialized based on a random access procedure triggered towards the corresponding entity. $N_{TA}(i)$ can be indicated via a timing advance command in the random access response (RAR) of a Type 1 random access procedure towards entity i or MSGB response of a Type 2 random access procedure towards entity i. In which case, the timing advance command can signal an absolute value, $T_A(i)$, which is 12-bits, and $N_{TA}(i)$ is calculated as:

$$N_{TA}(i) = \frac{T_A(i) \cdot 16 \cdot 64}{2^\mu} \quad (23)$$

In one example 6.11.2, each TA value within a TAG is initialized based on an absolute timing advance MAC CE command. In which case, the timing advance command can signal an absolute value, $T_A(i)$, which is 12-bits for entity i. $N_{TA}(i)$ is calculated according to equation (23). In one example, the absolute timing advance command includes a timing advance command for each entity as illustrated in FIG. 43. In one example, the absolute timing advance command includes a timing advance command for one entity along with the index of the entity. If there are two TAs in a TAG, the index of the entity can be one bit, as illustrated in FIG. 44.

In one example 6.11.3, the change in value of the TA for each TA in the TAG can be indicated in a Timing Advance MAC CE command. For example, the Timing Advance MAC CE indicates a $T_A(i)$ value in the range of 0 to 63 (e.g., a 6-bit value) for each entity i. The updated (new) $N_{TA}(i)$ value relative to the previous (old) $N_{TA}(i)$ value, for entity i, is given by:

$$N_{TA,new}(i) = N_{TA,old}(i) + \frac{(T_A(i) - 31) \cdot 16 \cdot 64}{2^\mu} \quad (24)$$

In one example, the timing advance command includes a timing advance command for each entity as illustrated in FIG. 45. In one example, the timing advance command includes a timing advance command for one entity along with the index of the entity. If there are two TAs in a TAG, the index of the entity can be one bit, as illustrated in FIG. 46.

In one example 6.12, a TAG includes one TA value and there are multiple (e.g., two) TAGs each with a TAG ID. In one example 6.12.1, the $T_A$ value of each TAG is initialized based on a random access procedure triggered towards the corresponding entity. $N_{TA}(i)$ can be indicated in the random access response (RAR) of a Type 1 random access procedure towards entity i or MSGB response of a Type 2 random access procedure towards entity i. In which case, the timing advance command can signal an absolute value, $T_A(i)$, which is 12-bits, and $N_{TA}(i)$ is calculated according to equation (23).

Figure 47:
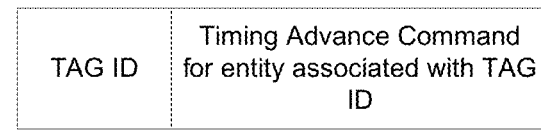
FIG. 47 illustrates an example absolute timing advance MAC CE command that includes a timing advance command for one entity and its associated TAG ID according to embodiments of the present disclosure.
Figure 48:
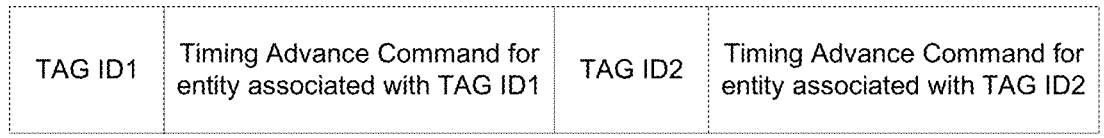
FIG. 48 illustrates an example absolute timing advance MAC CE command that includes a timing advance command for more than one entity and their associated TAG IDs according to embodiments of the present disclosure.

In one example 6.12.2, the TA value of each TAG is initialized based on an absolute timing advance MAC CE command. The absolute timing advance MAC CE command can include the corresponding TAG ID. In which case, the timing advance command can signal an absolute value, $T_A(i)$, which is 12-bits for entity i. $N_{TA}(i)$ is calculated according to equation (23). In one example, the absolute timing advance command includes a timing advance command for one entity and its associated TAG ID as illustrated in FIG. 47. In one example, the absolute timing advance command includes a timing advance command for more than one entity and their associated TAG IDs (i.e., for more than one TAG ID) as illustrated in FIG. 48.

Figure 49:
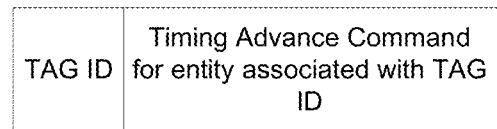
FIG. 49 illustrates an example timing advance MAC CE command that includes a timing advance command for one entity and its associated TAG ID according to embodiments of the present disclosure.
Figure 50:
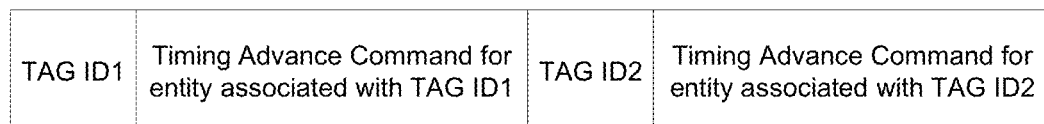
FIG. 50 illustrates an example timing advance MAC CE command that includes a timing advance command for more than one entity and their associated TAG IDs according to embodiments of the present disclosure.

In one example 6.12.3, the change in value of the TA in each TAG can be indicated in a Timing Advance MAC CE command. For example, the Timing Advance MAC CE indicates a $T_A(i)$ value in the range of 0 to 63 (e.g., a 6-bit value) for each entity i. The updated (new) $N_{TA}(i)$ value relative to the previous (old) $N_{TA}(i)$ value, for entity i, is given by equation (24). In one example, the timing advance command includes a timing advance command for the one entity and its associated TAG ID as illustrated in FIG. 49. In one example, the timing advance command includes a timing advance command for more than one entity and their associated TAG IDs (i.e., for more than one TAG ID) as illustrated in FIG. 50.

In one example 6.13, a UL channel (e.g., a PUSCH) is scheduled by a DCI Format (e.g., UL related DCI Format, such as DCI Format 0_0 or DCI Format 0_1 or DCI Format 0_2). The DCI Format schedules a single PUSCH. In one example 6.13.1, the TAG ID to determine the TA of the PUSCH is determined based on the UL TCI state used for the PUSCH. There is an association between the TAG ID or TA and the UL TCI state. In one example 6.13.2, the TAG ID to determine the TA of the PUSCH is determined based on a UL spatial relation used for the PUSCH. There is an association between the TAG ID or TA and the spatial relation information. In one example 6.13.3, the TAG ID to determine the TA of the PUSCH is determined based on a field in the DCI Format. For example, in the case of N TAG IDs, the size of the field can be $[\log_2 N]$ bits. For example, in the case of 2 TAG IDs, the size of the field can be 1 bit, wherein a value of "0" indicates the TA of the first TAG ID, and a value of "1" indicates the TA of the second TAG ID.

In one example 6.14, a UL channel (e.g., a PUSCH) is scheduled by a DCI Format (e.g., UL related DCI Format, such as DCI Format 0_0 or DCI Format 0_1 or DCI Format 0_2). The DCI Format schedules multiple (e.g., M) PUSCHs. In one sub-example, M=2, i.e., the DCI Format schedules 2 PUSCHs. In one example 6.14.1, the TAG ID to determine the TA of a PUSCH is determined based on the UL TCI state used for the corresponding PUSCH. There is an association between the TAG ID or TA and the UL TCI state. In one example 6.14.2, the TAG ID to determine the TA of a PUSCH is determined based on a UL spatial relation used for the corresponding PUSCH. There is an association between the TAG ID or TA and the spatial relation information. In one example 6.14.3, the TAG ID to determine the TA of the PUSCH is determined based on M fields in the DCI Format, wherein the DCI format schedules M PUSCHs. There is one field for each PUSCH. For example, in the case of N TAG IDs, the size of each field can be $[\log_2 N]$ bits. In variant example, a single field of size M×$[\log_2 N]$ bits is used. In a variant example, in the case of 2 TAG IDs, the size of each field can be 1 bit, wherein a value of "0" indicates the TA of the first TAG ID, and a value of "1" indicates the TA of the second TAG ID. In a variant example, in the case of 2 TAG IDs, a single field of size M bits is used. In one example 6.14.4, the TAG ID to determine the TA of the PUSCH is determined based on 2 fields in the DCI Format, wherein the DCI format schedules 2 PUSCHs. There is one field for each PUSCH. For example, in the case of N TAG IDs, the size of each field can be $[\log_2 N]$ bits. In variant example, a single field of size 2×N bits is used. In a variant example, in the case of 2 TAG IDs, the size of each field can be 1 bit, wherein a value of "0" indicates the TA of the first TAG ID, and a value of "1" indicates the TA of the second TAG ID. In a variant example, in the case of 2 TAG IDs, a single field of size 2 bits is used. In one example 6.14.5, the TAG ID to determine the TA of the PUSCH is determined based on a one-bit field in the DCI Format, wherein the DCI format schedules 2 PUSCHs. There are two TAG IDs. In one example, (1) a value of "0" can indicate that the first TAG ID is used for the first PUSCH and the second TAG ID is used for the second PUSCH, and (2) a value of a value of "1" can indicate that the second TAG ID is used for the first PUSCH and the first TAG ID is used for the second PUSCH. In another example, (1) a value of "0" can indicate that the second TAG ID is used for the first PUSCH and the first TAG ID is used for the second PUSCH, and (2) a value of a value of "1" can indicate that the first TAG ID is used for the first PUSCH and the second TAG ID is used for the second PUSCH. In one example 6.14.6, the TAG ID to determine the TA of the PUSCH is determined based on a field in the DCI Format, wherein the DCI format schedules M PUSCHs. The field can determine the TA value of all M PUSCHs, i.e., using the same TA value for the M PUSCHs. For example, in the case of N TAG IDs, the size of the field can be $[\log_2 N]$ bits. In a variant example, in the case of 2 TAG IDs, the size of each field can be 1 bit, wherein a value of "0" indicates the TA of the first TAG ID, and a value of "1" indicates the TA of the second TAG ID. In one example 6.14.7, the TAG ID to determine the TA of the PUSCH is determined based on a field in the DCI Format, wherein the DCI format schedules two PUSCHs. The field can determine the TA value of both PUSCHs, i.e., using the same TA value for the two PUSCHs. For example, in the case of N TAG IDs, the size of the field can be $[\log_2 N]$ bits. In a variant example, in the case of 2 TAG IDs, the size of each field can be 1 bit, wherein a value of "0" indicates the TA of the first TAG ID, and a value of "1" indicates the TA of the second TAG ID.

In one example 6.15, a DL channel (e.g., a PDSCH) is scheduled by a DCI Format (e.g., DL related DCI Format, such as DCI Format 1_0 or DCI Format 1_1 or DCI Format 1_2). The DCI Format schedules a single PDSCH. In response to the PDSCH, a UL HARQ is transmitted in a UL channel. In one example 6.15.1, the TAG ID to determine the TA of the UL channel carrying the HARQ-ACK (e.g., PUSCH or PUCCH) is determined based on the UL TCI state used for the UL channel. There is an association between the TAG ID or TA and the UL TCI state. In one example 6.15.2, the TAG ID to determine the TA of the UL channel carrying the HARQ-ACK (e.g., PUSCH or PUCCH) is determined based on the spatial relation used for the UL channel. There is an association between the TAG ID or TA and the spatial relation information. In one example 6.15.3, the TAG ID to determine the TA of the UL channel carrying the HARQ-ACK (e.g., PUCCH or PUSCH) is determined based on a field in the DCI Format. For example, in the case of N TAG IDs, the size of the field can be $[\log_2 N]$ bits. For example, in the case of 2 TAG IDs, the size of the field can be 1 bit, wherein a value of "0" indicates the TA of the first TAG ID, and a value of "1" indicates the TA of the second TAG ID. In one example 6.15.4, the TAG ID to determine the TA of the UL channel carrying the HARQ-ACK (e.g., PUCSH) is determined as described earlier for PUSCH. In one example 6.15.4, the HARQ-ACK field is for "joint" indication based on higher layer parameter ackNackFeedbackMode-r16. In one example 6.15.5, the HARQ-ACK field is for "separate" indication based on higher layer parameter ackNackFeedbackMode-r16.

In one example 6.16, a DL channel (e.g., a PDSCH) is scheduled by a DCI Format (e.g., DL related DCI Format, such as DCI Format 1_0 or DCI Format 1_1 or DCI Format 1_2). The DCI Format schedules multiple (e.g., M) PDSCHs, and each PDSCH has HARQ-ACK feedback in separate HARQ-ACK codebook. In one sub-example, M=2, i.e., the DCI Format schedules 2 PDSCHs. In one example 6.16.1, the TAG ID to determine the TA of a UL channel carrying the HARQ-ACK (e.g., PUSCH or PUCCH) is determined based on the UL TCI state used for the corresponding UL channel. There is an association between the TAG ID or TA and the UL TCI state. In one example 6.16.2, the TAG ID to determine the TA of a UL channel carrying the HARQ-ACK (e.g., PUSCH or PUCCH) is determined based on a UL spatial relation used for the corresponding UL channel. There is an association between the TAG ID or TA and the spatial relation information. In one example 6.16.3, the TAG ID to determine the TA of a UL channel carrying the HARQ-ACK (e.g., PUCCH or PUSCH) is determined based on M fields in the DCI Format, wherein the DCI format schedules M PDSCHs. There is one field for each UL channel corresponding to a PDSCH. For example, in the case of N TAG IDs, the size of each field can be $[\log_2 N]$ bits. In variant example, a single field of size $M \times [\log_2 N]$ bits is used. In a variant example, in the case of 2 TAG IDs, the size of each field can be 1 bit, wherein a value of "0" indicates the $T_A$ of the first TAG ID, and a value of "1" indicates the $T_A$ of the second TAG ID. In a variant example, in the case of 2 TAG IDs, a single field of size M bits is used. In one example 6.16.4, the TAG ID to determine the TA of a UL channel carrying the HARQ-ACK (e.g., PUCCH or PUSCH) is determined based on 2 fields in the DCI Format, wherein the DCI format schedules 2 PDSCHs. There is one field for each UL channel corresponding to a PDSCH. For example, in the case of N TAG IDs, the size of each field can be $[\log_2 N]$ bits. In variant example, a single field of size $2 \times N$ bits is used. In a variant example, in the case of 2 TAG IDs, the size of each field can be 1 bit, wherein a value of "0" indicates the TA of the first TAG ID, and a value of "1" indicates the TA of the second TAG ID. In a variant example, in the case of 2 TAG IDs, a single field of size 2 bits is used. In one example 6.16.5, the TAG ID to determine the TA of a UL channel carrying the HARQ-ACK (e.g., PUCCH or PUSCH) is determined based on a one-bit field in the DCI Format, wherein the DCI format schedules 2 PDSCHs. There are two TAG IDs. In one example, (1) a value of "0" can indicate that the first TAG ID is used for the first UL channel corresponding to the first PDSCH and the second TAG ID is used for the second UL channel corresponding to the second PDSCH, and (2) a value of a value of "1" can indicate that the second TAG ID is used for the first UL channel corresponding to the first PDSCH and the first TAG ID is used for the second UL channel corresponding to the second PDSCH. In another example, (1) a value of "0" can indicate that the second TAG ID is used for the first UL channel corresponding to the first PDSCH and the first TAG ID is used for the second UL channel corresponding to the second PDSCH, and (2) a value of a value of "1" can indicate that the first TAG ID is used for the first UL channel corresponding to the first PDSCH and the second TAG ID is used for the second UL channel corresponding to the second PDSCH. In one example 6.16.6, the TAG ID to determine the TA of a UL channel carrying the HARQ-ACK (e.g., PUCCH or PUSCH) is determined based on a field in the DCI Format, wherein the DCI format schedules M PDSCHs. The field can determine the TA value of all M UL channels corresponding to PDSCHs, i.e., using the same TA value for the M UL channels corresponding to the M PDSCHs. For example, in the case of N TAG IDs, the size of the field can be $[\log_2 N]$ bits. In a variant example, in the case of 2 TAG IDs, the size of each field can be 1 bit, wherein a value of "0" indicates the TA of the first TAG ID, and a value of "1" indicates the TA of the second TAG ID. In one example 6.16.7, the TAG ID to determine the TA of a UL channel carrying the HARQ-ACK (e.g., PUCCH or PUSCH) is determined based on a field in the DCI Format, wherein the DCI format schedules two PDSCHs. The field can determine the TA value of both UL channels corresponding to the two PDSCHs, i.e., using the same TA value for the two UL channels corresponding to the two PDSCHs. For example, in the case of N TAG IDs, the size of the field can be $[\log_2 N]$ bits. In a variant example, in the case of 2 TAG IDs, the size of each field can be 1 bit, wherein a value of "0" indicates the TA of the first TAG ID, and a value of "1" indicates the TA of the second TAG ID. In one example 6.16.8, the TAG ID to determine the TA of the UL channel carrying the HARQ-ACK (e.g., PUCSH) is determined as described earlier for PUSCH.

In one example 6.17, a DL channel (e.g., a PDSCH) is scheduled by a DCI Format (e.g., DL related DCI Format, such as DCI Format 1_0 or DCI Format 1_1 or DCI Format 1_2). The DCI Format schedules multiple (e.g., M) PDSCHs, and each PDSCH has HARQ-ACK feedback in a joint HARQ-ACK codebook in a UL channel. In one sub-example, M=2, i.e., the DCI Format schedules 2 PDSCHs. In one example 6.17.1, the TAG ID to determine the TA of the UL channel carrying the HARQ-ACK (e.g., PUSCH or PUCCH) is determined based on the UL TCI state used for the UL channel. There is an association between the TAG ID or TA and the UL TCI state. In one example 6.17.2, the TAG ID to determine the TA of the UL channel carrying the HARQ-ACK (e.g., PUSCH or PUCCH) is determined based on the spatial relation used for the UL channel. There is an association between the TAG ID or TA and the spatial relation information. In one example 6.17.3, the TAG ID to determine the TA of the UL channel carrying the HARQ-ACK (e.g., PUCCH or PUSCH) is determined based on a field in the DCI Format. For example, in the case of N TAG IDs, the size of the field can be $[\log_2 N]$ bits. For example, in the case of 2 TAG IDs, the size of the field can be 1 bit, wherein a value of "0" indicates the TA of the first TAG ID, and a value of "1" indicates the TA of the second TAG ID. In one example 6.17.4, the TAG ID to determine the TA of the UL channel carrying the HARQ-ACK (e.g., PUCSH) is determined as described earlier for PUSCH.

Figure 51:
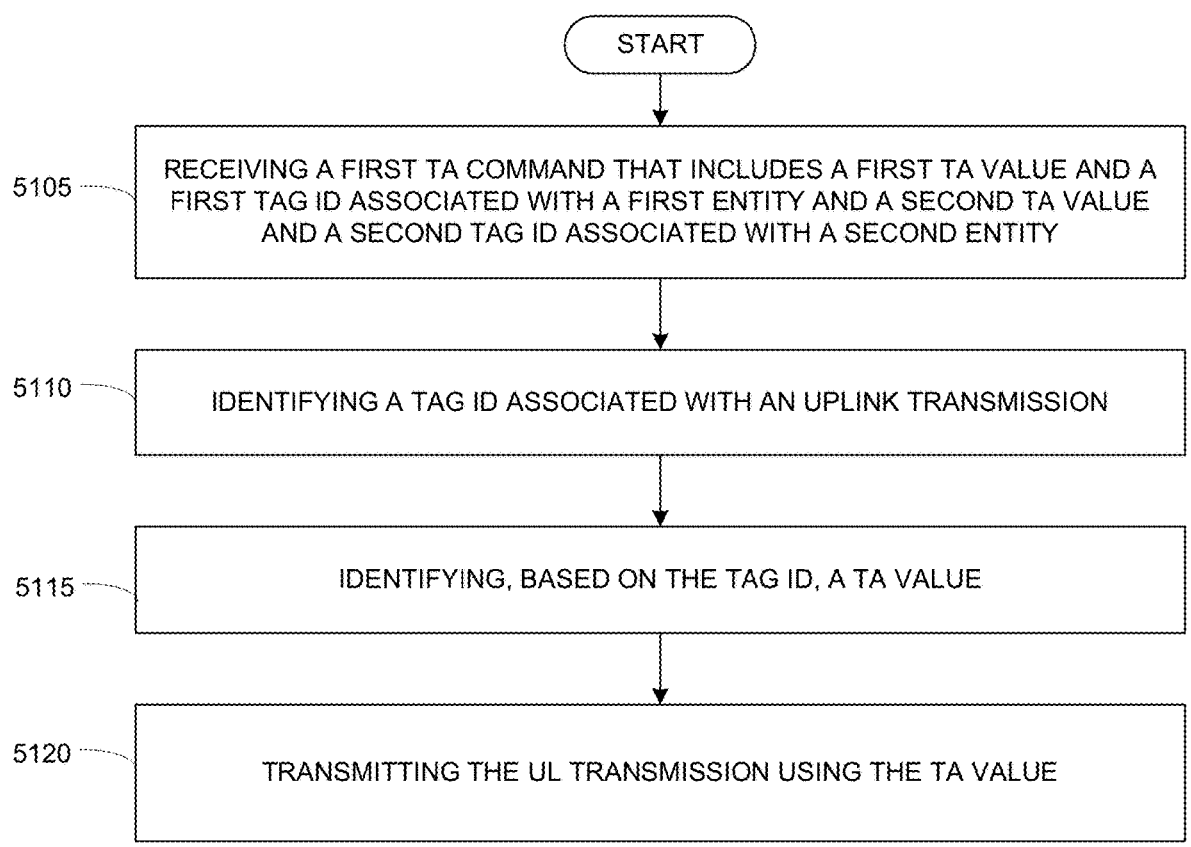
FIG. 51 illustrates an example process for signaling of multiple TA values to a UE and facilitating the use of multiple TA values by the UE for communication with multiple TRPs according to embodiments of the present disclosure.

FIG. 51 illustrates an example process for signaling of multiple TA values to a UE and facilitating the use of multiple TA values by the UE for communication with multiple TRPs according to embodiments of the present disclosure. The process of FIG. 51 is discussed as being performed by a UE, but it is understood that a corresponding BS (such as gNB 102) performs a corresponding process. Additionally, for convenience the process of FIG. 51 is discussed as performed by a UE (such as UE 116), however, it is understood that that any suitable wireless communication device could perform these processes.

Beginning at step S105, the UE receives a first TA command that includes a first TA value and a first TAG ID associated with a first entity, and a second TA value and a second TAG ID associated with a second entity. In some embodiments, the first TA value is an absolute TA value and the second TA value is a differential value relative to the first TA value. In some embodiments, the first TA value, associated with the first TAG ID, is sent one TA command and the second TA value, associated with the second TAG ID, is sent in another TA command.

Next, the UE identifies a TAG ID associated with a UL transmission (step S110). In some embodiments, the first entity is associated with a first CORESETPOOL index and the second entity is associated with a second CORESETPOOL index, and the UL transmission is associated with the first or second CORESETPOOL index. In such embodiments, the UE identifies the TAG ID based on the first or second CORESETPOOL index. In other embodiments, the first entity is associated with a first PCI of a first cell and the second entity is associated with a second PCI of a second cell. In such embodiments, the UE identifies the TAG ID based on the first or second PCI.

In some embodiments, the UE additionally receives a TCI state associated with or applied to or used for the UL transmission, and the TAG ID is associated with the TCI state. In such embodiments, at step S110 the UE identifies the TAG ID based on the TCI state associated with the UL transmission, and the TCI state is a UL TCI state or a joint TCI state.

The UE then identifies, based on the TAG ID, a TA value (step S115).

In some embodiments, the UE additionally measures a first difference in time of arrival between a first SS/PBCH block and a second SS/PBCH block, where the first SS/PBCH block is associated with a first SS/PBCH index that is associated with the first TAG ID, and the second SS/PBCH block is associated with a second SS/PBCH index that is associated with the second TAG ID). The UE in such cases receives a second TA command including a third TA value associated with the first TAG ID, and additionally measures a second difference in time of arrival between the first SS/PBCH block and the second SS/PBCH block, and determines a fourth TA value associated with the second TAG ID based on the third TA value associated with the first TAG ID, the first difference in time of arrival, and the second difference in time of arrival.

Finally, the UE transmits the UL transmission using the TA value (step S120).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to receive a transmission configuration indication (TCI) state including a first timing advance (TA) identifier indicating one of a first TA group (TAG) identifier (ID) or a second TAG ID, wherein the first and the second TAG ID are associated with an uplink (UL) transmission; and
   a processor operably coupled to the transceiver, the processor configured to identify, based on the first TAG ID or the second TAG ID, a TA value in a first TAG or a second TAG,
   wherein the transceiver is further configured to transmit the UL transmission using the TA value,
   wherein a first TA value in the first TAG is associated with a first transmission and reception point (TRP) and a second TA value in the first TAG is associated with a second TRP, and
   wherein a difference between the first TA value and the second TA value is configured to be less than a specific value.

2. The UE of claim 1, wherein the TCI state is a UL TCI state or a joint TCI state.

3. The UE of claim 1, wherein the first TA value in the first TAG is associated with a first control resource set (CORESET) pool index and the second TA value in the first TAG is associated with a second CORESET pool index.

4. The UE of claim 1, wherein the first TA value in the first TAG is associated with a first physical cell identity (PCI) and the second TA value in the first TAG is associated with a second PCI.

5. The UE of claim 1, wherein TA values in the first TAG and the second TAG are indicated in a random access response (RAR) received in a random access procedure.

6. The UE of claim 1, wherein the transceiver is further configured to receive, from a base station, an absolute timing advance command medium access control (MAC) control element (CE) including a timing advance command and a TAG ID associated with the timing advance command.

7. A base station (BS), comprising:
   a transceiver configured to transmit a transmission configuration indication (TCI) state including a first timing advance (TA) identifier indicating one of a first TA group (TAG) identifier (ID) or a second TAG ID, wherein the first and the second TAG ID are associated with an uplink (UL) transmission; and
   a processor operably coupled to the transceiver, the processor configured to identify, based on the first TAG ID or the second TAG ID, a TA value in a first TAG or a second TAG,
   wherein the transceiver is further configured to receive the UL transmission using the TA value,
   wherein a first TA value in the first TAG is associated with a first transmission and reception point (TRP) and a second TA value in the first TAG is associated with a second TRP, and
   wherein a difference between the first TA value and the second TA value is configured to be less than a specific value.

8. The BS of claim 7, wherein the TCI state is a UL TCI state or a joint TCI state.

9. The BS of claim 7, wherein the first TA value in the first TAG is associated with a first control resource set (CORESET) pool index and the second TA value in the first TAG is associated with a second CORESET pool index.

10. The BS of claim 7, wherein the first TA value in the first TAG is associated with a first physical cell identity (PCI) and the second TA value in the first TAG is associated with a second PCI.

11. The BS of claim 7, wherein TA values in the first TAG and the second TAG are indicated in a random access response (RAR) received in a random access procedure.

12. The BS of claim 7, wherein the transceiver is further configured to transmit, to a user equipment (UE), an absolute timing advance command medium access control (MAC) control element (CE) including a timing advance command and a TAG ID associated with the timing advance command.

13. A method of operating a user equipment (UE), the method comprising:
   receiving a transmission configuration indication (TCI) state including a first timing advance (TA) identifier indicating one of a first TA group (TAG) identifier (ID) or a second TAG ID, wherein the first and the second TAG ID are associated with an uplink (UL) transmission;
   identifying, based on the first TAG ID or the second TAG ID, a TA value in a first TAG or a second TAG; and
   transmitting the UL transmission using the TA value, wherein a first TA value in the first TAG is associated with a first transmission and reception point (TRP) and a second TA value in the first TAG is associated with a second TRP, and wherein a difference between the first TA value and the second TA value is configured to be less than a specific value.

14. The method of claim 13, wherein the TCI state is a UL TCI state or a joint TCI state.

15. The method of claim 13, wherein the first TA value in the first TAG is associated with a first control resource set (CORESET) pool index and the second TA value in the first TAG is associated with a second CORESET pool index.

16. The method of claim 13, wherein the first TA value in the first TAG is associated with a first physical cell identity (PCI) and the second TA value in the first TAG is associated with a second PCI.

17. The method of claim 13, wherein TA values in the first TAG and the second TAG are indicated in a random access response (RAR) received in a random access procedure.

18. The method of claim 13, further comprising receiving, from a base station, an absolute timing advance command medium access control (MAC) control element (CE) including a timing advance command and a TAG ID associated with the timing advance command.

* * * * *